United States Patent
Rich (12)

(10) Patent No.: US 6,452,927 B1
(45) Date of Patent: *Sep. 17, 2002

(54) METHOD AND APPARATUS FOR PROVIDING A SERIAL INTERFACE BETWEEN AN ASYNCHRONOUS TRANSFER MODE (ATM) LAYER AND A PHYSICAL (PHY) LAYER

(75) Inventor: Craig S. Rich, Monte Sereno, CA (US)

(73) Assignee: Cypress Semiconductor Corporation, San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/581,242

(22) Filed: Dec. 29, 1995

(51) Int. Cl.$^7$ ............................ H04L 12/24; H04L 12/56
(52) U.S. Cl. .................. 370/395.1; 370/469; 370/395.6; 370/466
(58) Field of Search .............................. 370/395, 412, 370/366, 463; 341/100, 101; 364/916.1, 926.2, 926.5, 934, 934.1, 939, 939.5, 949.7, 950, 950.1, 950.2; 395/891

(56) References Cited

U.S. PATENT DOCUMENTS

| 4,885,584 A | 12/1989 | Dalrymple | 341/101 |
| 4,975,829 A | 12/1990 | Clarey et al. | 364/200 |

(List continued on next page.)

OTHER PUBLICATIONS

Roger L. Freeman, "Practical Data Communications", A Wiley–Interscience Publication, John Wiley & Sons, Inc., 1995, pp. 16–17, 121–163, 165–170, 391–398, 501–511, 514–519, 602–603, 622 and 625.

Des Young, et al., "UTOPIA, An ATM–PHY Interface Specification", *The ATM Forum*, pp. 1–19, Level 1, Ver. 2.01, (Mar. 1994).

*Cypress Semiconductor Data Book Memories DataCom FCT Logic PC Products*, Hotlink Data Sheet (CY7B923, CY7B933), Doc. No. 38–00189–F, pp. 7:8–34 (1995).

(List continued on next page.)

*Primary Examiner*—Ajit Patel
(74) *Attorney, Agent, or Firm*—Wagner, Murabito & Hao LLP

(57) ABSTRACT

An extender circuit provides a serial communication interface between an ATM layer and a PHY layer. The extender circuit includes a first circuit serially coupled to a second circuit. The first circuit communicates in parallel with the ATM layer, and the second circuit communicates in parallel with the PHY layer. The extender circuit additionally includes a serial link which serially transmits signals between the first and second circuits. The serial link includes a first serial link for transmitting a first serial signal from the first circuit to the second circuit, and a second serial link transmitting a second serial signal from the second circuit to the first circuit. The first circuit and the second circuit include similar architecture. The first circuit includes a parallel interface circuit for communicating in parallel with the ATM layer and a serial interface circuit coupled to the parallel interface circuit for serially communicating with the second circuit. The parallel interface circuit includes control circuitry, such as a programmable logic device, and memory circuitry, such as a first-in-first-out (FIFO) memory device. The serial interface circuit includes serializing/deserializing circuitry which includes serializing circuitry for serializing a plurality of parallel signals received from the parallel interface circuit and outputting a plurality of serial output signals. The serializing/deserializing circuitry further includes deserializing circuitry for deserializing a plurality of serial input signals to form a plurality of deserialized signals and providing the deserialized signals to the parallel interface circuit.

30 Claims, 30 Drawing Sheets

U.S. PATENT DOCUMENTS

| | | | |
|---|---|---|---|
| 5,134,702 A | * 7/1992 | Charych et al. | 395/500 |
| 5,206,946 A | 4/1993 | Brunk | 395/500 |
| 5,233,692 A | 8/1993 | Gajjar et al. | 395/325 |
| 5,251,239 A | 10/1993 | Turban et al. | 375/114 |
| 5,274,783 A | 12/1993 | House et al. | 395/325 |
| 5,333,277 A | 7/1994 | Searls | 395/325 |
| 5,400,324 A | 3/1995 | Eriksson et al. | |
| 5,400,337 A | 3/1995 | Munter | |
| 5,412,783 A | * 5/1995 | Skokan | 395/325 |
| 5,418,786 A | * 5/1995 | Loyer et al. | 375/377 |
| 5,444,702 A | 8/1995 | Burnett et al. | |
| 5,448,640 A | 9/1995 | Kim et al. | 380/48 |
| 5,452,330 A | 9/1995 | Goldstein | 375/257 |
| 5,485,456 A | * 1/1996 | Shtayer et al. | 370/395 |
| 5,491,812 A | 2/1996 | Pisello et al. | 395/500 |
| 5,497,371 A | 3/1996 | Ellis et al. | |
| 5,530,806 A | 6/1996 | Condon et al. | 395/185.02 |
| 5,537,626 A | 7/1996 | Kraslavsky et al. | 395/828 |
| 5,557,607 A | 9/1996 | Holden | |
| 5,568,470 A | * 10/1996 | Ben-Nun et al. | 370/395 |
| 5,574,946 A | 11/1996 | Sala | 395/825 |
| 5,577,207 A | 11/1996 | Pauget et al. | 395/200.02 |
| 5,583,861 A | 12/1996 | Holden | 370/395 |
| 5,596,169 A | 1/1997 | Baker et al. | 174/33 |
| 5,600,653 A | 2/1997 | Chitre et al. | 370/474 |
| 5,606,673 A | 2/1997 | Chounan | 395/309 |
| 5,610,921 A | 3/1997 | Christensen | 370/395 |
| 5,619,499 A | 4/1997 | Nakabayashi | 370/469 |
| 5,623,700 A | 4/1997 | Parks et al. | 395/873 |
| 5,629,928 A | 5/1997 | Calvignac et al. | 370/237 |
| 5,636,140 A | 6/1997 | Lee et al. | 364/514 |
| 5,640,541 A | 6/1997 | Bartram et al. | 395/500 |

OTHER PUBLICATIONS

*Cypress Semiconductor Data Book Memories DataCom FCT Logic PC Products*, 512x9 Cascadable Clocked and 2K x 9 Cascadable Clocked Data Sheet (CY7C451, CY7C453), Doc. 38–00125–E, pp. 5:115–137 (1995).

*Cypress Semiconductor Programmable Logic Databook*, 32–Macrocell Flash CPLD (CY7C371), pp. 3:99–106 (1994/1995).

J. Bellamy, *Digital Telephony*, John Wiley & Sons, Inc, Second Ed., pp. 22.

Craig Rich, et al., Cypress Semiconductor Design SuperCon '95, Digital Communications Design Conference, "Extending the UTOPIA Interface in ATM Applications", (1995).

DAVIC Specification, "Description of DAVIC Functionalities", Part 1,2,3,4,6,7,8,9, (Jun. 1995).

* cited by examiner

METHOD AND APPARATUS FOR PROVIDING A SERIAL INTERFACE BETWEEN AN ASYNCHRONOUS TRANSFER MODE (ATM) LAYER AND A PHYSICAL (PHY) LAYER

BACKGROUND OF THE INVENTION

1. Field of the Invention

The present invention relates to a bus communication architecture, more particularly, the present invention relates to serializing a parallel bus interface between an asynchronous transfer mode (ATM) layer and a physical (PHY) layer in an ATM system.

2. Art Background

ATM is a network protocol and switch-based method of communication which breaks down a communication process into several sub processes arranged in a stack. Each layer of the protocol stack provides services to the layer above it which allows the top most processes to communicate. Each layer communicates with another layer over defined interfaces enabling two different devices, using hardware and software from different manufacturers, but still conforming to the ATM model, to communicate over an ATM network. Using ATM, information sent over a network is segmented into a fixed length cell. The ATM cell has a fixed length of 53 bytes comprising 5 bytes of header information and 48 bytes of data information (e.g. voice, data, or video information).

Two layers in the protocol stack are the asynchronous transfer mode (ATM) layer and the physical (PHY) layer. The PHY layer interfaces directly to network media (e.g. fiber optics, twisted pair, etc.) and also handles transmission convergence (extracting ATM cells from the transport encoding scheme). The ATM layer and the PHY layer communicate over a parallel bus termed the Universal Test and Operations PHY Interface for ATM (UTOPIA) developed by the ATM forum. The UTOPIA bus is a bidirectional bus which transmits and receives ATM cells simultaneously. The UTOPIA bus is defined to support numerous transmission rates defined for ATM, including transmission rates as high as 622 Mbps. The UTOPIA bus defines two interface signal groups: Transmit and Receive. As illustrated in FIG. 1a, the Transmit interface 16 moves data information from ATM layer 12 to PHY layer 14, while the Receive interface 18 moves information from ATM layer 12 to PHY layer 14.

As illustrated in FIG. 1b, the Transmit interface comprises a parallel transmit data bus TxData 20 which may be, for example, 8-bits or 16-bits wide, and a number of control signals which may be utilized in the Octet Level Handshaking (OLH) mode or the Cell Level Handshaking (CLH) mode. In CLH mode data is moved between ATM layer 12 and PHY layer 14 as an entire uninterrupted cell. The transmit control signals include: transmit enable signal TxEnb* 22 which when asserted low by ATM layer 12 indicates that TxData 20 contains valid cell data; transmit start of cell signal TxSOC 24 which is asserted high by ATM layer 12 when TxData 20 contains the first valid byte of cell data; transmit full/cell available signal TxFull*/TxClav 26 which in CLH mode is asserted high by PHY layer 14 when it can accept a full cell of data, and is asserted low by PHY layer 14 when it is "full" and cannot accept a full cell of data; and transmit clock signal TxClk 28 which is provided by ATM layer 12 for synchronization of the data transfer from ATM layer 12 to PHY layer 14.

Transmitting data from ATM layer 12 to PHY layer 14 in the CLH mode of operation is generally as follows. PHY layer 14 indicates to ATM layer 12 that it can accept a complete cell of data (53 bytes) by asserting TxFull*/TxClav to a high logic level. When ATM layer 12 has a complete cell to transfer to PHY layer 14, it asserts TxEnb* to a low logic level and places the first byte of data onto data bus TxData 20. Additionally, ATM layer 12 asserts TxSOC 24 to a high logic level along with the first byte of data. TxSOC 24 remains at a high logic level for the first cycle only. Each of the remaining 52 bytes of cell data are then transferred to PHY layer 14 at one byte per dock cycle of TxClk 28.

In like manner, FIG. 1b also illustrates the Receive interface comprising a parallel receive bus RxData 30 which may be, for example, 8-bits or 16 bits wide, and a number of control signals similar to the those described with respect to the Transmit interface. The receive control signals include: receive enable signal RxEnb* 32 which when asserted low by ATM layer 12 indicates that RxSOC 34 is valid and that RxData contains valid data; receive start of cell signal RxSOC 34 which is asserted by PHY layer 14 when RxData 30 contains the first valid byte of cell data; receive empty/cell available signal RxEmpty*/RxClav 36 which in CLH mode is asserted high by PHY layer 14 when it has a full cell of data to send to ATM layer 12, and is asserted low by PHY layer 14 when it is "empty" and does not have a full cell of data to send to ATM layer 12; and receive clock signal RxClk 38 which is provided by ATM layer 12 for synchronization of the data transfer from PHY layer 14 to ATM layer 12.

Receiving data from PHY layer 14 at ATM layer 12 in the CLH mode of operation is generally as follows. PHY layer 14 indicates to ATM layer 12 that it has a complete cell of data (53 bytes) to send by asserting RxEmpty*/RxClav to a high logic level. When ATM layer 12 can receive a complete cell, it asserts RxEnb* to a low logic level. In the next clock cycle, PHY layer 14 places the first byte of data onto the data bus RxData 30 and asserts RxSOC 34 to a high logic level along with the first byte of data. RxSOC 34 remains at a high logic level for one cycle only. Each of the remaining 52 bytes of cell data are then transferred to ATM layer 12 at one byte per clock cycle of RxClk 38.

Typical applications using UTOPIA include Network Interface Cards (NICs) and ATM switches. ATM switches typically are built using a rack mounted architecture which include individual shelves supporting PHY layer circuits or ATM layer circuits. Typically, the interconnect between the PHY layer circuits and the ATM layer circuits comprise wide parallel ribbon cables. The parallel ribbon cables may comprise as many as 40 conductors to accommodate the Transmit and Receive interfaces when the UTOPIA bus operates in a 16-bit mode. The use of wide ribbon cables to interconnect the ATM layer circuits and PHY layer circuits physically clutters the ATM switch. Additionally, the wide parallel ribbon cables connecting the various UTOPIA ports on a switch can extend to as much as a foot or more in length, depending on the distance between the PHY and ATM layer circuit shelves. The length of the ribbon cable poses a limitation on the ATM system as parallel ribbon cables, which operate reliably at one frequency over a given distance, may not operate reliably if that distance is increased.

UTOPIA ports generally operate at high frequencies (e.g. 25 MHz). Appreciably long ribbon cables operating at high speeds introduce undesirable problems such as cross-talk between conductors and voltage reflections due to the uncontrolled impedance of the ribbon cable. These problems cause degradation of signal integrity and skew problems in which the timing relationships of the signals transmitted between the ATM layer and the PHY layer are altered. Skew problems can result in the violation of set-up and hold timing parameters resulting in corruption of data.

One approach to address the signal integrity and skew problem is to employ specialized ribbon cable for transmitting differential signals, such as twisted pair conductors. However, this approach does not resolve the skew problem since skew can still result from differences in propagation delays for each signal through its respective differential driver, cable and receiver. Additionally, this approach doubles the number of conductors required for the parallel cable because each signal requires two conductors. Thus the already bulky ribbon cable further clutters the area between the ATM and PHY layer circuits.

Another approach is to use ribbon cables interconnected with repeater circuits. The repeater circuits would operate as a bridge to reliably increase the effective length of the ribbon cable. However, this approach also compounds the problem of cluttering the space around the ATM switch, as well as, significantly increasing the cost of the system as the effective length of the ribbon cable grows.

Thus, what is needed is a method and apparatus for implementing the parallel architecture of the UTOPIA bus which does not have undesirable effects, such as, degrading signal integrity, creating timing skew problems, encountering physical space constraints, or employing high cost solutions. Additionally, what is needed is a method and apparatus for extending the distance over which ATM and PHY layer circuits may reliably operate.

SUMMARY OF THE INVENTION

A novel method and apparatus for providing a serial interface between an asynchronous transfer mode (ATM) layer and a physical (PHY) layer is disclosed.

In one embodiment of the present invention, an extender circuit is disclosed. The extender circuit provides a serial communication interface between an ATM layer and a PHY layer. The extender circuit includes a first circuit serially coupled to a second circuit. The first circuit for communicating in parallel with the ATM layer, and the second circuit for communicating in parallel with the PHY layer. The extender circuit additionally includes a serial link which serially transmits signals between the first and second circuits. The serial link may comprise a first serial link for transmitting a first serial signal from the first circuit to the second circuit, and a second serial link transmitting a second serial signal from the second circuit to the first circuit.

The first circuit and the second circuit comprise similar architecture. The first circuit comprises a parallel interface circuit for communicating in parallel with the ATM layer and a serial interface circuit coupled to the parallel interface circuit for serially communicating with the second circuit. The parallel interface circuit may comprise control circuitry, such as a programmable logic device, and memory circuitry, such as a first-in-first-out (FIFO) memory device. The serial interface circuit may comprise serializing/deserializing circuitry which comprises serializing circuitry for serializing a plurality of parallel signals received from the parallel interface circuit and for outputting a plurality of serial output signals. The serializing/deserializing circuitry further comprises deserializing circuitry for deserializing a plurality of serial input signals to form a plurality of deserialized signals which are provided to the parallel interface circuit.

In another embodiment of the present invention, an interface circuit for interfacing an ATM layer to a serial bus is described. The serial bus is operative to be coupled to a PHY layer. The interface circuit includes a parallel interface circuit communicating in parallel with the ATM layer, and a serial interface circuit coupled to the parallel interface circuit and serially coupled to the serial bus. The parallel interface circuit comprises control circuitry, such as a programmable logic device, and memory circuitry, such as a first-in-first-out (FIFO) memory device. The serial interface circuit may comprise serializing/deserializing circuitry which comprises serializing circuitry for serializing a plurality of parallel signals received from the parallel interface circuit and for outputting a plurality of serial output signals. The serializing/deserializing circuitry further comprises deserializing circuitry for deserializing a plurality of serial input signals to form a plurality of deserialized signals which are provided to the parallel interface circuit.

In another embodiment of the present invention, an interface circuit for interfacing a PHY layer to a serial bus is described. The serial bus is operative to be coupled to an ATM layer. The interface circuit includes a parallel interface circuit communicating in parallel with the PHY layer, and a serial interface circuit coupled to the parallel interface circuit and serially coupled to the serial bus. The parallel interface circuit comprises control circuitry, such as a programmable logic device, and memory circuitry, such as a first-in-first-out (FIFO) memory device. The serial interface circuit may comprise serializing/deserializing circuitry which comprises serializing circuitry for serializing a plurality of parallel signals received from the parallel interface circuit and for outputting a plurality of serial output signals. The serializing/deserializing circuitry further comprises deserializing circuitry for deserializing a plurality of serial input signals to form a plurality of deserialized signals which are provided to the parallel interface circuit.

In another embodiment of the present invention, a novel method is described for serially transmitting a plurality of signals between an ATM layer and a PHY layer via an extender circuit. The method comprises: generating a first plurality of parallel signals; serializing the first plurality of parallel signals to form a first plurality of serial signals; transmitting the first plurality of serial signals between the ATM layer and the PHY layer; and deserializing the first plurality of serial signals to form a second plurality of parallel signals. The second plurality of parallel signals are equivalent to the first plurality of parallel signals. The extender circuit includes a memory circuit for storing the second plurality of parallel signals. The method further provides the second plurality of parallel signals to the memory circuit and outputs the second plurality of parallel signals from the memory circuit. A first flag condition is signaled when the memory circuit contains a first predetermined number of the second plurality of parallel signals. A first control code is generated in response to the memory circuit signaling the first flag condition. The first control code is serialized to form a first serialized control code which is transmitted between the ATM layer and the PHY layer. The first control signal disables the transmission of the first plurality of signals between the ATM layer and the PHY layer. A second flag condition is signaled when the memory circuit contains a second predetermined number of the second plurality of parallel signals. A second control code is generated in response to the memory circuit signaling the second flag condition. The second control code is serialied to form a second serialized control code which is transmitted between the ATM layer and the PHY layer. The second control signal enables the transmission of the first plurality of data signals between the ATM layer and the PHY layer.

Other features and advantages of the present invention will be apparent from the accompanying drawings and from the detailed description that follows.

BRIEF DESCRIPTION OF THE WINGS

The features and advantages of the present invention are illustrated by way of example and are by no means intended to limit the scope of the present invention to the particular embodiments shown.

FIG. 14 illustrates one embodiment of the present invention for generating TxFull*/TxClav at an ATM layer in accordance with FIG. 13a.

FIG. 19 illustrates one embodiment of the present invention for generating PHY_FIFO_Half_Full of FIG. 13a.

FIG. 21 illustrates one embodiment of the present invention for generating Tx_FIFO_SOC of FIG. 13a.

FIG. 22 illustrates one embodiment of the present invention for generating the write enable input of FIFO 1306 of FIG. 13a.

FIG. 23 illustrates one embodiment of the present invention for generating RxEmpty*/RxClav at a PHY layer in accordance with FIG. 13a.

FIG. 24 illustrates one embodiment of the present invention for generating ATM_FIFO_ENR of FIG. 13a.

FIG. 25 illustrates one embodiment of the present invention for generating ATM_HL_Tx_ENA, ATM_HL_Tx_SC_D and ATM_HL_Tx_Data of FIG. 13a.

DETAILED DESCRIPTION

A method and apparatus for providing a serial interface between an asynchronous transfer mode (ATM) layer and a physical (PHY) layer is described. In the following description, for purposes of explanation, specific nomenclature is set forth to provide a thorough understanding of the present invention. However, it will be apparent to one skilled in the art that these specific details are not required to practice the present invention. In other instances, well known circuits and devices are shown in block diagram form to avoid obscuring the present invention unnecessarily. An asterisk symbol, "*", is utilized with signal names to indicate that the signal is an active low signal. The present invention is described throughout with respect to the UTOPIA bus interface between an ATM layer and a PHY layer. However, it will be appreciated that the scope of the invention extends, in general, to providing a serial communication interface between the parallel bus interfaces provided by ATM layers and PHY layers.

The present invention describes an extender circuit, including a serial link, which serializes the parallel bus interface of the ATM layer and the PHY layer. The serialization of the parallel bus maintains signal integrity of signals serially communicated between the ATM layer and the PHY layer, and eliminates cross-talk and skew problems associated with operating a high speed parallel bus. By eliminating the skew problems present in high speed parallel busses, a serial link can be extended to virtually any length. Additionally, the speed of the parallel bus, now operating over the serial link, can be increased by any factor within the operating range of the extender circuit. The extender circuit also significantly reduces the size of the interface media from the wide parallel cables to a serial link, thus decreasing the amount of clutter introduced to an ATM switch.

The extender circuit provides a seamless serial interface between an ATM layer and a PHY layer, that is, the ATM layer and the PHY layer transmit and receive data information and control signals between each other without knowing, or having a need to know, that the extender circuit is present. The extender circuit accomplishes this task by reproducing the ATM layer interface at the PHY layer and reproducing the PHY layer interface at the ATM layer. Thus, the extender circuit communicates in parallel with the ATM and PHY layers, but transmits data information between the two layers in a serial fashion. Additionally, the extender circuit optimizes the bandwidth of the serial transfer by not transferring the control signals across the serial link, rather, the extender circuit regenerates the control signals at the ATM and PHY layers. It will be appreciated by one skilled in the art, however, that the spirit and scope of the present invention can be extended to serializing and communicating one or more of the UTOPIA control signals between the ATM and PHY layers.

Figure 1A:
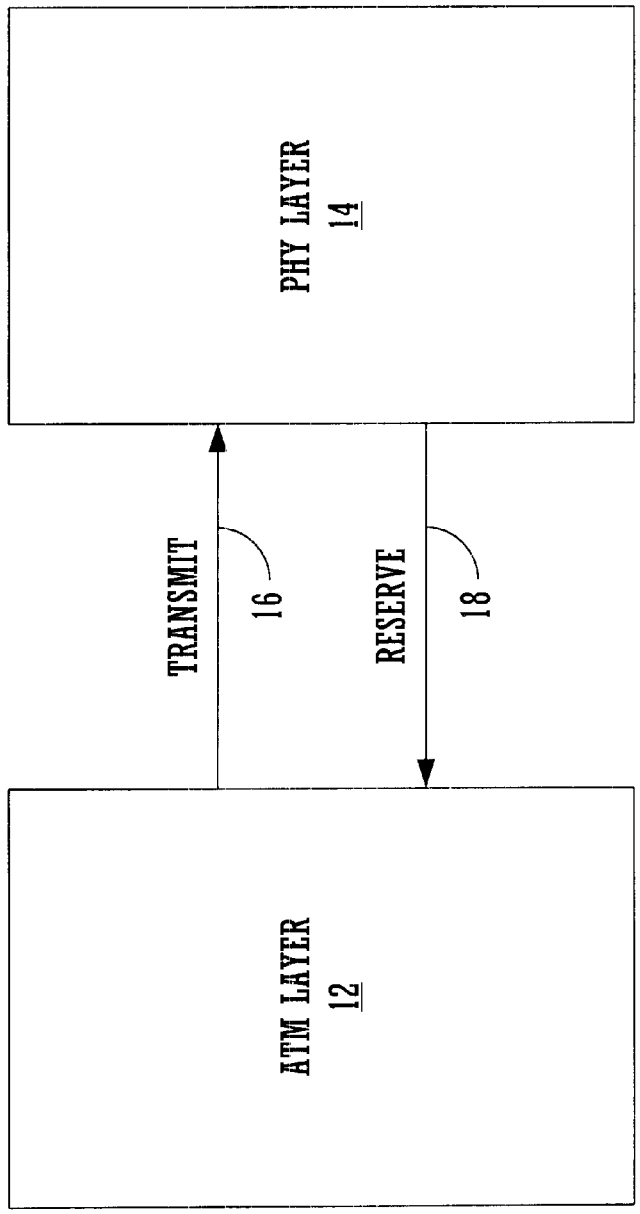
FIG. 1a illustrates a prior art asynchronous transfer mode (ATM) layer communicating in parallel with a physical (PHY) layer.
Figure 1B:
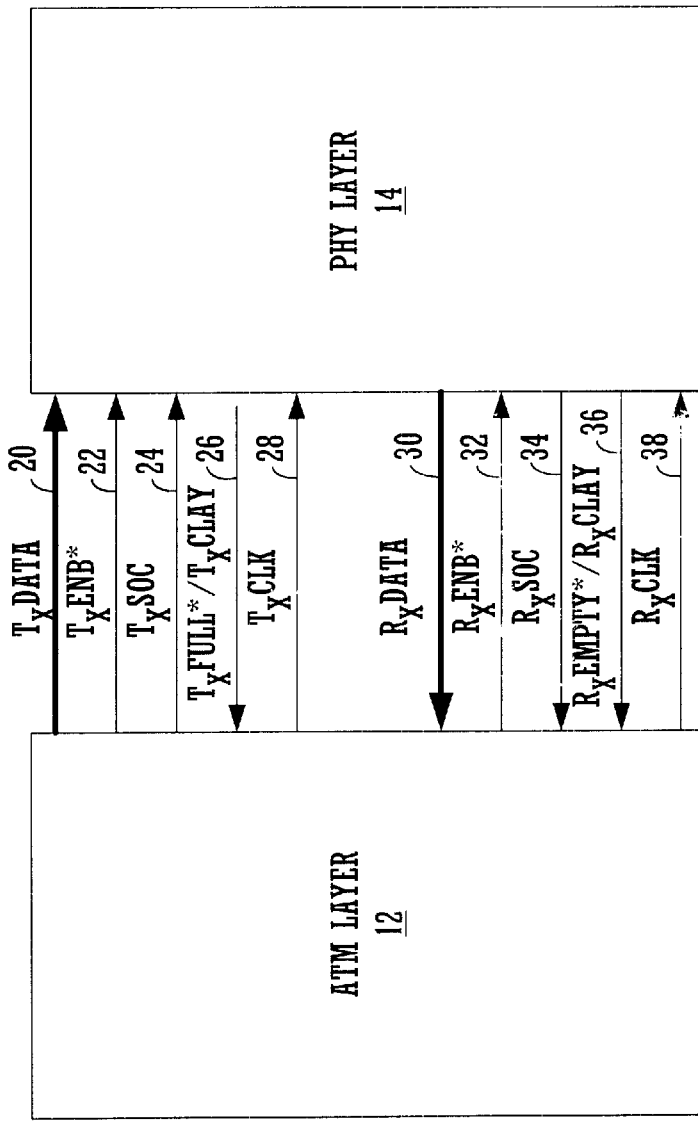
FIG. 1b illustrates the transmit and receive signals of a prior art ATM layer communicating in parallel with a PHY layer.
Figure 2:
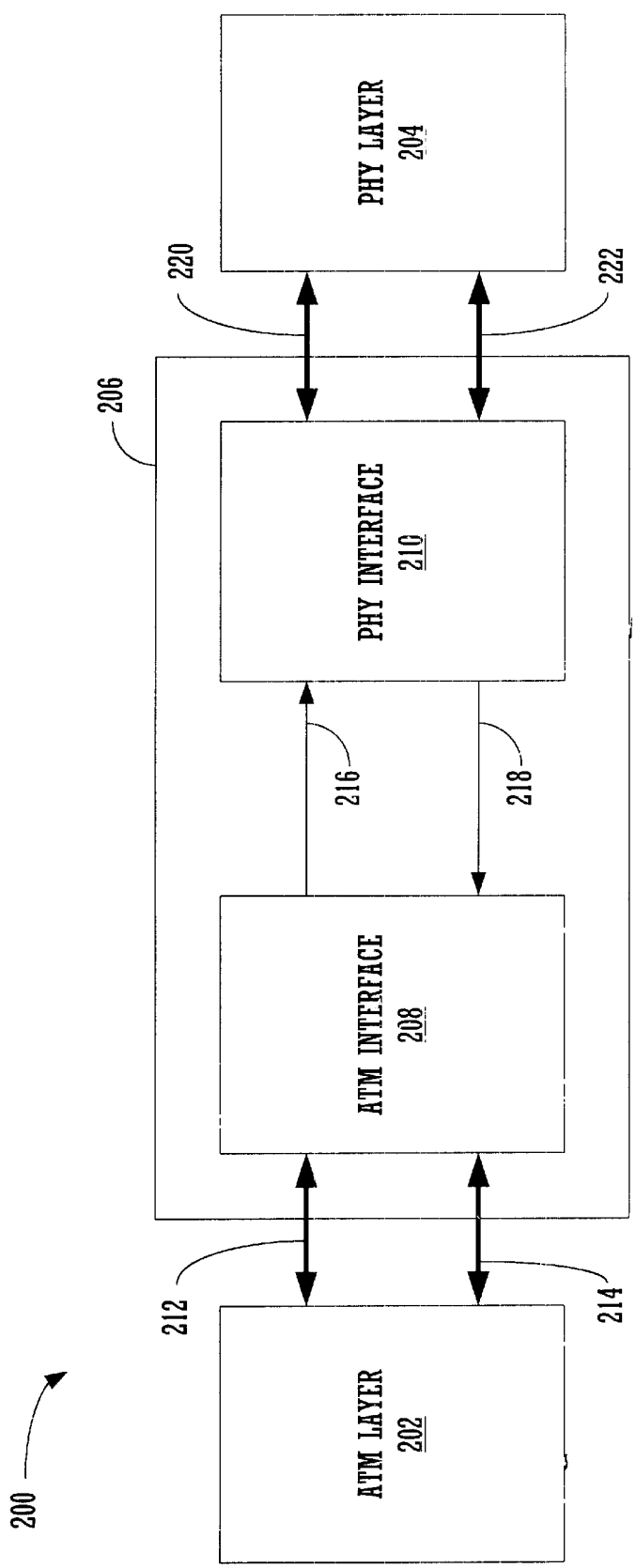
FIG. 2 illustrates one embodiment of the present invention.

One embodiment of the present invention is illustrated in FIG. 2. FIG. 2 shows a communication system 200 comprising ATM layer 202, PHY layer 204 and extender circuit 206. Extender circuit 206 provides a serial communication interface between ATM layer 202 and PHY layer 204. ATM layer 202 communicates in parallel with extender circuit 206 via a UTOPIA bus comprising transmit interface 212 and receive interface 214. PHY layer 204 communicates in parallel with extender circuit 206 via a UTOPIA bus comprising transmit interface 220 and receive interface 222. Transmit interfaces 212 and 220 each comprise the UTOPIA transmit data and control signals, that is, TxData, TxEnb*, TxSOC, TxClk and TxFull*/TxClav. Receive interfaces 214 and 222 each comprise the UTOPIA receive data and control signals, that is, RxData, RxEnb*, RxSOC, RxClk and RxEmpty*/RxClav.

Extender circuit 206 includes ATM interface 208 and PHY interface 210. ATM interface 208 is coupled to, and communicates in parallel with, ATM layer 202 via transmit interface 212 and receive interface 214. Similarly, PHY interface 210 is coupled to, and communicates in parallel with, PHY layer 204 via transmit interface 220 and receive interface 222. ATM interface 208 is coupled serially to, and communicates serially with, PHY interface 210 via serial links 216 and 218. Serial links 216 and 218 may comprise any serial media including, for example, single-conductor media, coaxial cable, fiber optic media, or differential media. Additionally, serial links 216 and 218 may comprise only one serial media simultaneously transmitting signals between ATM interface 208 and PHY interface 210.

Figure 28:
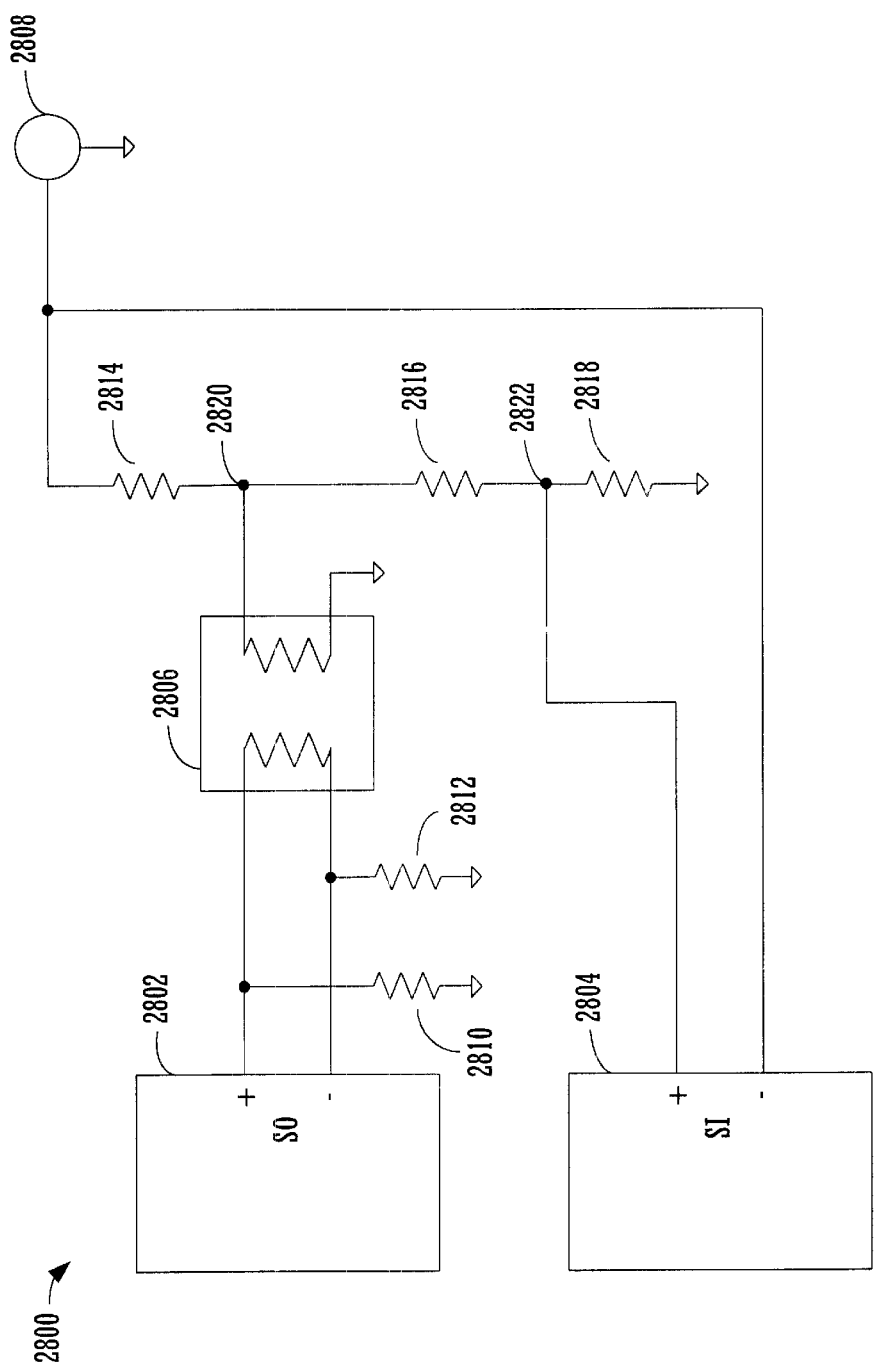
FIG. 28 illustrates one embodiment of a serial media interface circuit.

One embodiment of a single serial medium which may simultaneously transmit signals between an ATM interface and a PHY interface is illustrated in FIG. 28. FIG. 28 shows serial media interface circuit 2800 including a serializer 2802 having differential serial outputs coupled to the primary side of transformer 2806. The secondary side of transformer 2806 has one terminal coupled to a low logic level, such as a ground source, and the other terminal coupled to resistors 2814 and 2816 at node 2820. The differential serial outputs of serializer 2802 are coupled to termination resistors 2810 and 2812 which may comprise 270 ohms each in one embodiment. Other termination schemes may also be used. Resistor 2814 is also coupled to coaxial cable 2808. Resistor 2816 is coupled to resistor 2818 and to one differential input of deserializer 2804 at node 2822. Resistors 2814 and 2816 comprise equivalent resistor values, and in one embodiment comprise 50 ohms. The other differential input of deserializer 2804 is coupled to coaxial cable 2808. Resistor 2818 and coaxial cable 2808 comprise equivalent resistance values. In one embodiment, resistor 2818 and coaxial cable 2808 comprise 75 ohms.

A serial media interface circuit 2800 may be incorporated into each of ATM interface 208 and PHY interface 210. Coaxial cable 2808 provides a serial link for transmitting serial signals between the ATM and PHY interfaces. The differential nature of serializer 2802 and deserializer 2804 allows a first serial signal to be transmitted from serializer 2802 and across coaxial cable 2808, while a second serial signal is simultaneously received from coaxial cable 2808 into deserializer 2804.

It will be appreciated that other serial media interface circuits may be incorporated into ATM interface 208 and PHY interface 210 within the scope of the present invention, including hybrids circuits generally employed in telephone systems which use special transformers coupled to media matching networks.

Extender circuit 206 provides a seamless interface between ATM layer 202 and PHY layer 204. That is, extender circuit 206 receives and transmits data between ATM layer 202 and PHY layer 204 without either layer knowing, or having a need to know, that extender circuit 206 is present. In order to perform this function, extender circuit 206 must also receive and provide the handshaking control signals TxEnb*, TxSOC, TxClk, TxFull*/TxClav, RxEnb*, RxSOC, RxClk and RxEmpty*/RxClav. This is accomplished by ATM interface 208 and PHY interface 210 and will be described in greater detail below.

When a parallel cell of data (TxData) is to be transmitted from ATM layer 202 to PHY layer 204, PHY layer 204 asserts TxFull*/TxClav to a high logic level. ATM interface 208 regenerates TxFull*/TxClav having a high logic level at ATM layer 202. If there is data ready for the PHY layer, ATM layer 202 responds by asserting a low logic level on TxEnb*, placing the cell data on transmit interface 212 and asserting TxSOC together with the first byte of cell data. ATM interface 208 receives and processes TxEnb* and TxSOC, serializes the parallel cell data and serially transmits the cell data across serial link 216 to PHY interface 210. PHY interface 210 deserializes the cell data and provides the deserialized cell data to PHY layer 204. Transmit control signals TxEnb* and TxSOC are not transmitted from ATM interface 208 to PHY interface 210, rather, they are regenerated by PHY interface 210. In an alternative embodiment, TxSOC may not be processed by ATM interface 208, but is still regenerated by PHY interface 210.

Cell data is sent from PHY layer 204 to ATM layer 202 in a similar manner. If there is data ready for the ATM layer, PHY layer 204 generates the signal RxEmpty*/RxClav having a high logic level, and provides this signal to PHY interface 210 via receive interface 222. PHY interface 210 responds by asserting a low logic level on RxEnb*. PHY layer 204 then provides cell data (RxData) to PHY interface 210 via receive interface 222, and asserts RxSOC together with the first byte of cell data. PHY interface 210 receives and processes RxSOC, serializes the parallel cell data and serially transmits the cell data across serial link 218 to ATM interface 208. ATM interface 208 deserializes the cell data and provides the deserialized cell data to ATM layer 202. RxSOC is not transmitted from PHY interface 210 to ATM interface 208, rather, it is regenerated by ATM interface 208. In an alternative embodiment, RxSOC may not be processed by PHY interface 210, but is still regenerated by ATM interface 208. ATM interface 208 additionally regenerates RxEmpty*/RxClav and receives RxEnb* from ATM layer 202 to ensure proper operation of the UTOPIA bus interface.

Figure 3:
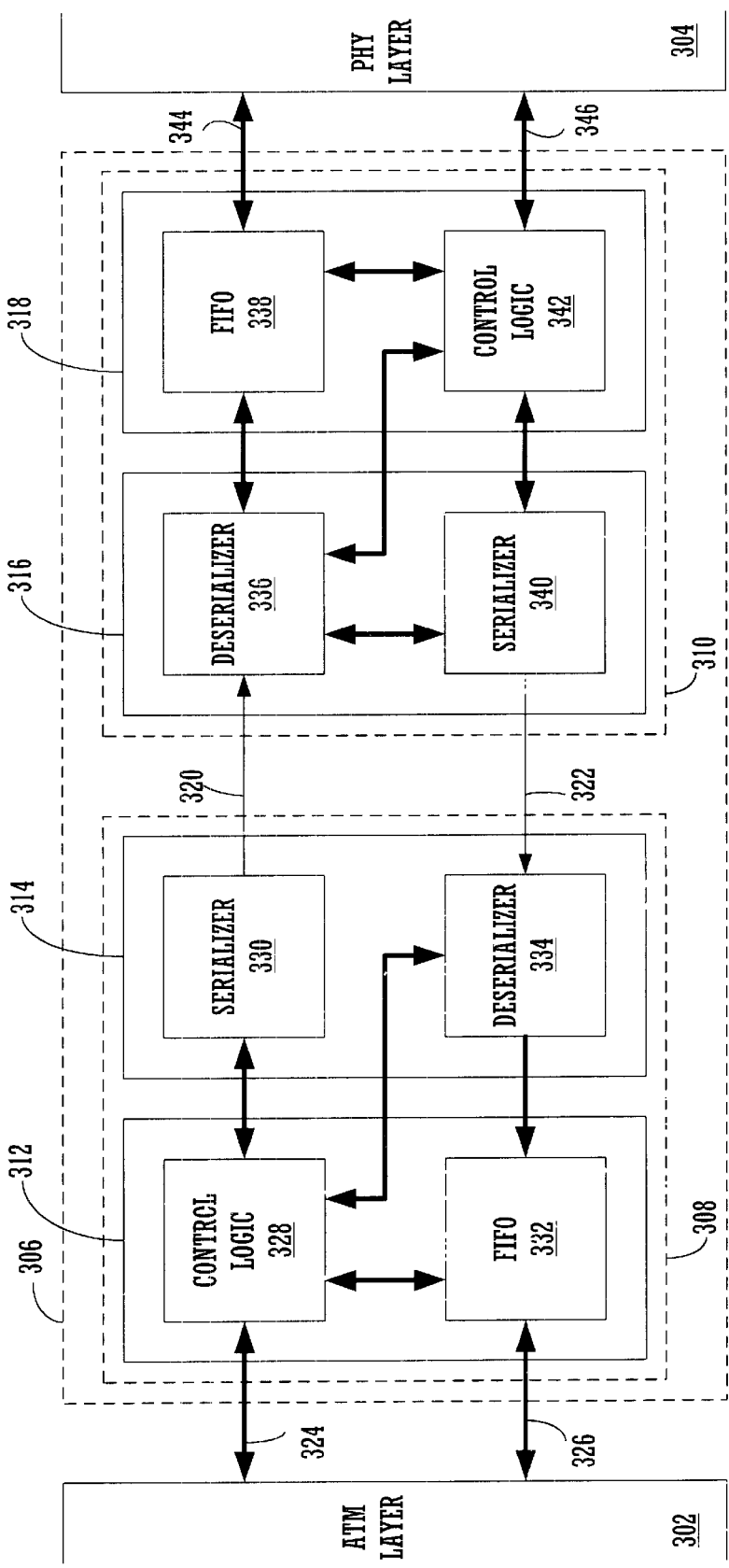
FIG. 3 illustrates another embodiment of the present invention.

FIG. 3 illustrates another embodiment of the present invention. FIG. 3 shows a communication system 300 comprising ATM layer 302, PHY layer 304 and an extender circuit 306. Extender circuit 306 comprises ATM interface 308, PHY interface 310 and serial links 320 and 322. ATM interface 308 comprises parallel interface circuit 312 and serial interface circuit 314. Parallel interface circuit 312 is coupled to, and communicates in parallel with, ATM layer 302 and serial interface circuit 314. Serial interface circuit 314 is additionally serially coupled to PHY interface 310 via serial links 320 and 322. Serial links 320 and 322 may also comprise only one serial link for simultaneously transmitting serial signals between ATM interface 308 and PHY interface 310 (such as illustrated in FIG. 28). Parallel interface circuit 312 includes control logic 328 coupled to FIFO 332. FIFO 332 is a first-in-first-out memory circuit which is utilized for queuing data. Control logic 328 is coupled to ATM layer 302 via parallel bus 324, and FIFO 332 is coupled to ATM layer 302 via parallel bus 326. Parallel bus 324 and parallel bus 326 comprise a UTOPIA bus. Serial interface circuit 314 includes serializer 330 coupled to control logic 328 and serial link 320, and deserializer 334 coupled to control logic 328, FIFO 332 and serial link 322.

In a similar manner, PHY interface 310 comprises parallel interface circuit 318 and serial interface circuit 316. Parallel interface circuit 318 is coupled to, and communicates in parallel with, PHY layer 304 and serial interface circuit 316. Serial interface circuit 316 is additionally serially coupled to ATM interface 308 via serial links 320 and 322. Parallel interface circuit 318 includes control logic 342 coupled to FIFO 338. FIFO 338 is a first-in-first-out memory circuit which is utilized for queuing data. Control logic 342 is coupled to PHY layer 304 via parallel bus 346, and FIFO 338 is coupled to PHY layer 304 via parallel bus 344. Parallel bus 344 and parallel bus 346 comprise a UTOPIA bus. Serial interface 316 includes serializer 340 coupled to control logic 342 and serial link 322, and deserializer 336 coupled to control logic 342, FIFO 338 and serial link 320. It will appreciated that FIFOs 332 and 338 may comprise other types of memory devices (e.g. dual-port RAM) which are capable of performing a queuing function with or without external logic.

In one embodiment of the present invention illustrated in FIG. 3, control logic 328 and control logic 342 may comprise dedicated logic or may be implemented by programmable logic devices (e.g. CPLDs, FPGAs, etc.) including, for example, CY7C371 32 Macrocell Complex Programmable Logic devices provided by Cypress Semiconductor Corporation. Additionally, FIFOs 332 and 338 may comprise synchronous or asynchronous FIFO devices, or may comprise any type of memory device capable of storing data for retrieval by ATM layer 302 or PHY layer 304 (e.g. single-port memories, dual-port memories, etc.) including, for example CY7C451 512x9 Clocked First In First Out (FIFO) memories provided by Cypress Semiconductor Corporation. Serializers 330 and 340 may comprise any type of serializing circuitry which is capable of converting parallel data into a serial stream of data, including, for example, CY7B923 HOTLink™ Transmitters provided by Cypress Semiconductor Corporation. Additionally, deserializers 334 and 336 may comprise any type of deserializing circuitry which is capable of converting a serial stream of data into parallel data, including, for example, CY7B933 HOTlink™ Receivers provided by Cypress Semiconductor Corporation. HOTLink™ Transmitters and Receivers comprise differential serial output and input signals and may be coupled to media interface circuits to enable interconnections to serial media.

FIFOs 332 and 338 solve a potential latency problem in serializing the parallel UTOPIA bus architecture between ATM layer 302 and PHY layer 304. The latency problem may exist when the receive and transmit control signals are serialized and transmitted between ATM layer 302 and PHY layer 304 along with data signals TxData and RxData. For example, when cell data is transmitted from ATM layer 302 to PHY layer 304, TxFull*/TxClav is first asserted to a high logic level by PHY layer 304. TxFull*/TxClav is then serialized by serializer 340, transmitted via serial link 322 to deserializer 334, deserialized by deserializer 334 and provided to ATM layer 304 by control logic 328. ATM layer 302 responds by asserting TxEnb* to a low logic level and placing transmit data TxData on parallel bus 324 to be serialized by serializer 330 and transmitted, via serial link 320, to PHY layer 304. Whenever TxFull*/TxClav is asserted to a low logic level by PHY layer 304, the transfer of TxData from ATM layer 302 to PHY layer 304 must stop at the end of the current cell of data in CLH mode. However, there is a latency delay for transmitting TxFull*/TxClav from PHY layer 304 to ATM layer 302 comprising the delay through serializer 340, serial link 322 and deserializer 334. A similar latency delay exists for TxData and TxEnb* transmitted through serializer 330, serial link 320 and deserializer 336. Due to this latency in the system, it is possible that TxFull*/TxClav may be asserted to a low logic level by PHY layer 304 but not reach ATM layer 302 until after another cell of data has commenced transmission to PHY layer 304. Therefore, data may be lost due to the latency. With the inclusion of FIFOs 332 and 338 the latency issue is resolved. When PHY layer 304 indicates that it has no more room for cell data by asserting TxFull*/TxClav to a low logic level, FIFO 338 can store the bytes of cell data which were transmitted from ATM layer 304 before it receives the TxFull*/TxClav comprising a low logic level. The cell data can then be read out of FIFO 338 when PHY layer 304 is ready to accept it. FIFO 332 resolves a similar problem for RxData sent from PHY layer 304 to ATM layer 302.

As described previously, the main characteristic of CLH mode is that once a cell transmission begins, all 53 bytes of cell data are sent in uninterrupted succession. While cells may be sent consecutively per the UTOPIA architecture, control logic 328 and control logic 342 introduce a gap between cells. During the cell gap, serializers 330 and 340 do not transmit cell data across serial links 320 and 322, rather, serializers 330 and 340 are designed to transmit predefined sequences of data. For example, when serializers 330 and 340 comprise HOTLink™ Transmitters, serializers 330 and 340 will be disabled during the cell gap and will transmit K28.5 or "idle characters." The predefined sequence of data will be hereafter referred to as an idle character regardless of the composition of serializers 330 and 340 and without limiting the scope of the present invention. The cell gap may be designed to be of any duration, but a two byte time gap will have the least amount of impact on system bandwidth. The cell gap is utilized by PHY interface 310 and ATM interface 308 in order to communicate that a memory flag condition has occurred. This is analogous to passing TxFull*/TxClav and RxEnb* between the interfaces. The cell gap may also be utilized to reframe or synchronize deserializers 334 and 336 after power or a reset function has been applied to communication system 300 and/or extender circuit 306, or there has been some other interruption of the operation of extender circuit 306 including breaks in serial links 320 and 322. Additionally, the cell gap is utilized to regenerate the start of cell signals TxSOC and RxSOC at PHY layer 304 and ATM layer 302 respectively as will be described in greater detail below.

Extender circuit 306 has two modes of operation for implementing CLH mode for the UTOPIA bus, namely: a steady state mode and a FIFO state update mode. Extender circuit 306 operates in the steady state mode when neither FIFO 332 nor FIFO 338 contain a predetermined amount of cell data. In the steady state mode cell data is transmitted and received between ATM layer 302 and PHY layer 304 via serial links 320 and 322 with a minimum amount of control. Extender circuit 306 enters the FIFO state update mode when one of FIFOs 332 or 338 contains a predetermined amount of cell data. This mode is analogous to TxFull*/TxClav or RxEnb* being asserted to a low and high logic level respectively, indicating that either PHY layer 304 or ATM layer 302 cannot accept any more cell data. The operation of the steady state mode and the FIFO state update mode are described in more detail below.

Figure 4:
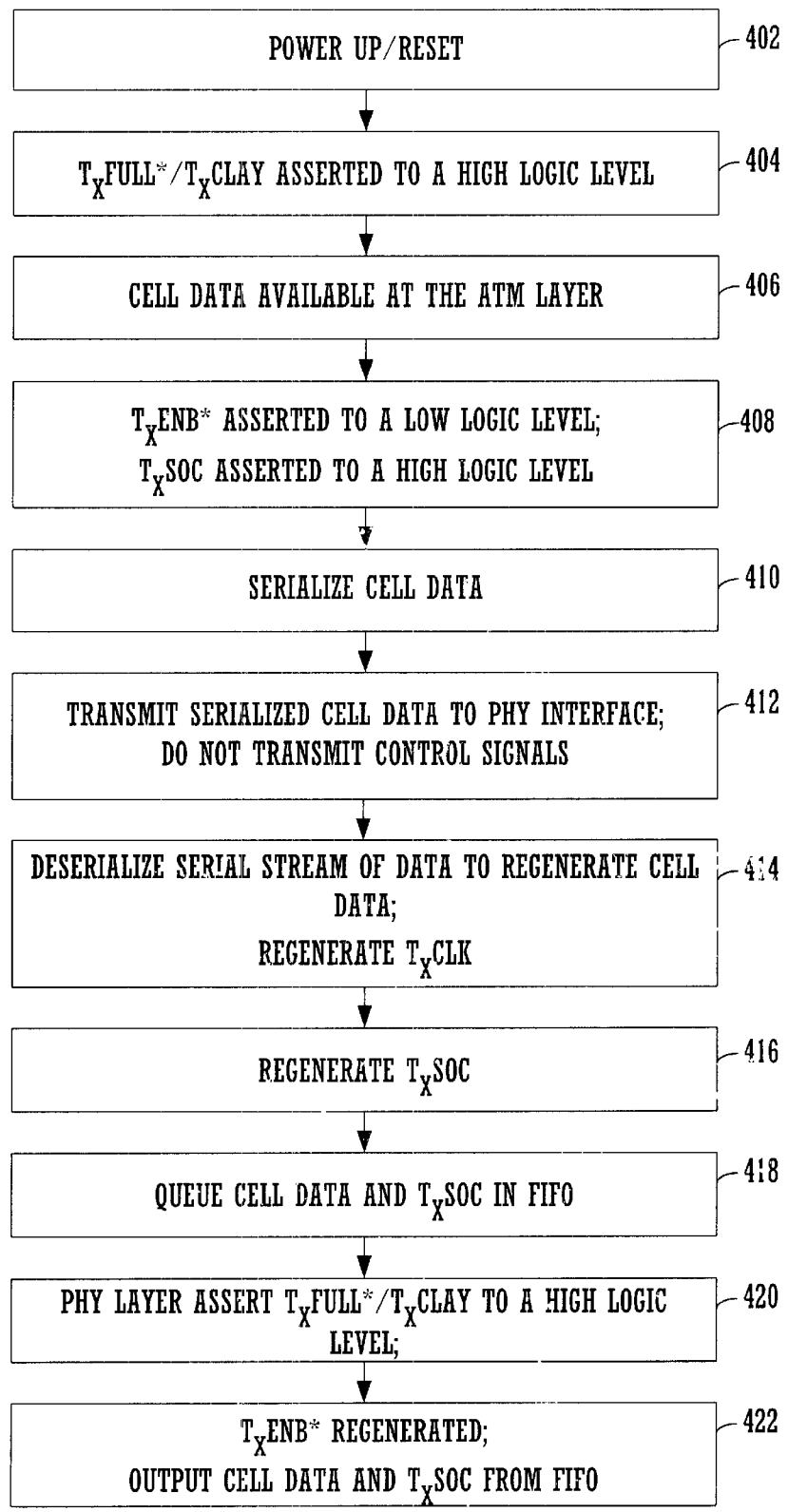
FIG. 4 illustrates the steady state mode of operation of the present invention for transmitting a cell of data from the ATM layer to the PHY layer.

FIG. 4 illustrates the steady state mode of operation of extender circuit 306 in CLH mode and transmitting parallel cell data from ATM layer 302 to PHY layer 304. At step 402, communication system 300 and/or extender circuit 306 receive power or a reset function. At step 404, control logic 328 asserts TxFull*/TxClav to a high logic level and provides this signal to ATM layer 302 via parallel bus 324. At step 406, parallel cell data (TxData) becomes available at ATM layer 302 to be sent to PHY layer 304. At step 408, ATM layer 302 asserts TxEnb* to a low logic level, places parallel cell data on parallel bus 324 and asserts TxSOC to a high logic level coincident with the first byte of cell data only. TxSOC is not processed by ATM interface 308. At step 410, control logic 328 transmits the cell data to serializer 330, which converts the parallel cell data into a serial stream of data. Alternatively, the parallel cell data may be provided directly to serializer 330 instead of passing through control logic 328. At step 412, serializer 330 transmits the serial stream of data to deserializer 336 via serial link 320, and further embeds the UTOPIA transmit clock, TxClk, in the serial stream of data. The control signals TxSOC, TxEnb*, and TxFull*/TxClav are not serialized and transmitted to deserializer 336. In another embodiment of the present invention they may be serialized and transmitted to deserializer 336.

At step 414, deserializer 336 converts the serial stream of data back into the parallel cell data, and regenerates the embedded transmit clock TxClk. The regenerated TxClk may also be used for receive dock RxClk. At step 416 the transmit start of cell signal TxSOC is regenerated by deserializer 336, FIFO 338 and control logic 342 as will be described in more detail with reference to FIGS. 6–7. At step 418, the parallel cell data and regenerated TxSOC are queued in FIFO 338 until PHY layer 304 is ready to accept the cell data via parallel bus 344. In an alternative embodiment of the present invention, the parallel cell data and TxSOC may be taken by PHY layer 304 directly from deserializer 336 and control logic 342 without being queued in FIFO 338. At step 420, PHY layer 304 indicates that it is ready to accept a cell of data from ATM layer 302 and asserts TxFull*/TxClav to a high logic level. Control logic 342 receives TxFull*/TxClav from PHY layer 304. At step 422, TxEnb* is regenerated by FIFO 338 and/or control logic 342, and the cell data and TxSOC are output from FIFO 338. The remaining 52 bytes of cell data are then output to PHY layer 304.

Figure 5:
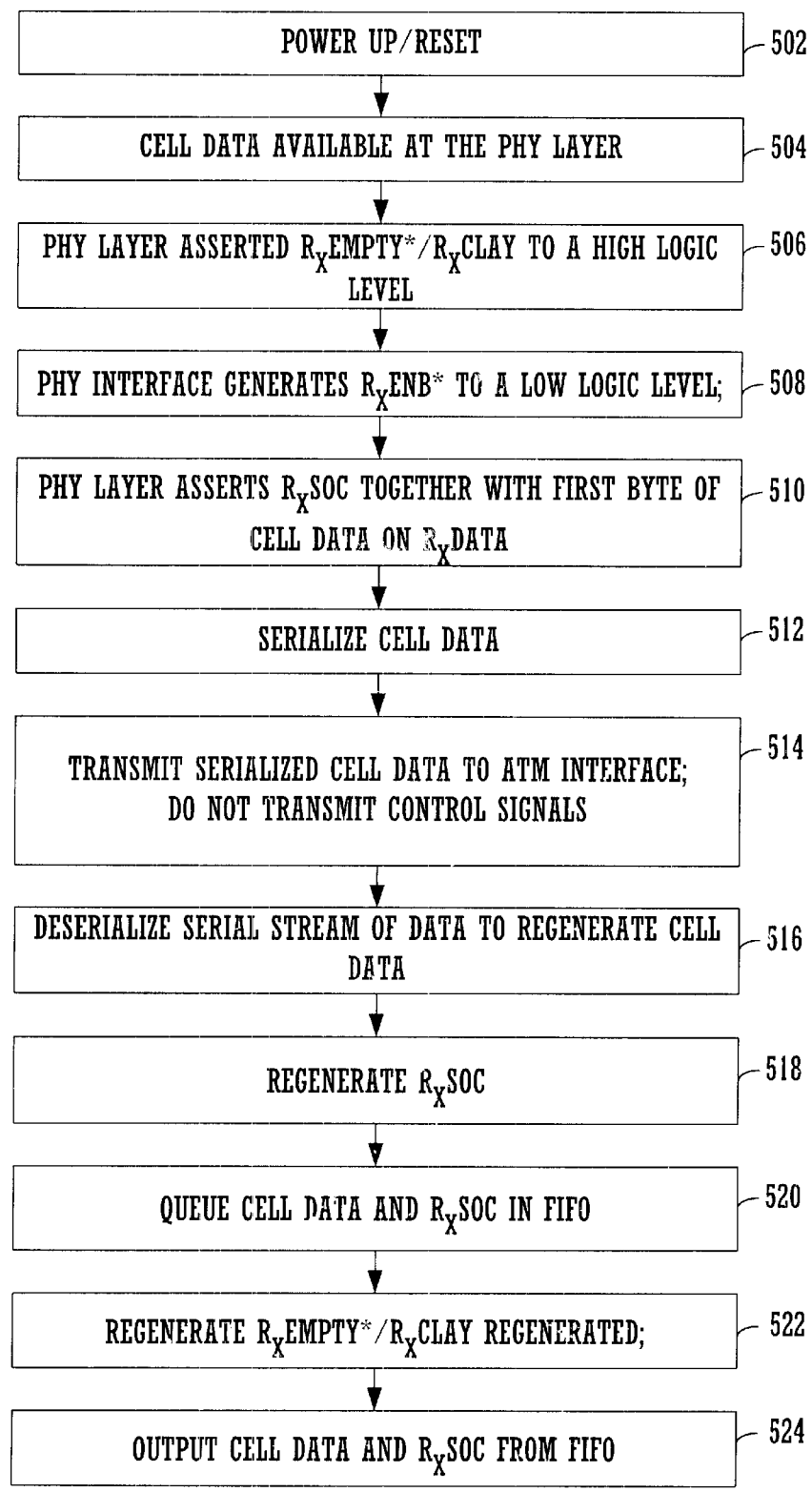
FIG. 5 illustrates the steady state mode of operation of the present invention for transmitting a cell of data from the PHY layer to the ATM layer.

FIG. 5 illustrates the steady state mode of operation of extender circuit 306 in CLH mode and transmitting parallel cell data from PHY layer 304 to ATM layer 302. At step 502, communication system 400 and/or extender circuit 306 receive power or a reset function. At step 504, parallel cell data (RxData) becomes available at PHY layer 304 to be sent to ATM layer 302. At step 506, PHY layer 304 asserts RxEmpty*/RxClav to a high logic level and is provided to control logic 342 via parallel bus 346. At step 508, control logic 342 of PHY interface 310 asserts RxEnb* to a low logic level indicating that PHY layer 304 may send RxData to ATM layer 302. At step 510, PHY layer 304 provides parallel cell data RxData and asserts RxSOC to a high logic level coincident with the first byte of cell data. RxData and RxClk are provided to control logic 342 via parallel bus 346. RxSOC is not processed by PHY interface 310. At step 512, control logic 342 transmits the cell data to serializer 340, which converts the parallel cell data into a serial stream of data. Alternatively, the parallel cell data may be provided directly to serializer 340. At step 514, serializer 340 transmits the serial stream of data to deserializer 334 via serial link 322. The control signals RxSOC, RxEnb*, and RxEmpty*/RxClav are not serialized and transmitted between PHY interface 310 and ATM interface 308. In another embodiment of the present invention, the control signals may be serialized and transmitted between PHY interface 310 and ATM interface 308.

At step 516, deserializer 334 converts the serial stream of data back into the parallel cell data. At step 518, the receive start of cell signal RxSOC is regenerated by deserializer 334, FIFO 332 and control logic 328 as will be described in more detail with reference to FIGS. 8 and 9. At step 520, the parallel cell data and the regenerated RxSOC are queued in FIFO 332 until ATM layer 302 is ready to accept the cell data via parallel bus 326. In an alternative embodiment of the present invention, the parallel cell data and regenerated RxSOC may be taken by ATM layer 302 directly from deserializer 334 and control logic 328 without being queued in FIFO 332. At step 522, RxEmpty*/RxClav is regenerated to a high logic level by ATM interface 308 and provided to ATM layer 302. RxEmpty*/RxClav may be regenerated by FIFO 332 and/or control logic 328. When ATM layer 302 receives a high logic level on RxEmpty*/RxClav, it will assert RxEnb* when it is ready to read the cell data. At step 524, RxEnb* is asserted. Cell data and RxSOC are then output from FIFO 332 to ATM layer 302 via parallel bus 326. The remaining 52 bytes of cell data are then output to ATM layer 302.

As previously described, serializers 330 and 340 convert the parallel cell data into serial streams of data to be transmitted across serial links 320 and 322 respectively. The transmit and receive clock signals TxClk and RxClk are used to clock cell data into serializers 330 and 340. Serializers 330 and 340 additionally embed TxClk and RxClk into the serial stream of data via encoding schemes, such as, the 8B/10B encoding/decoding scheme utilized by the HOT-Link™ Transmitters and Receivers. Deserializers 334 and 336 convert the serial stream of data back into the parallel cell data and additionally utilize the encoding/decoding scheme to recover or generate a dock of the same frequency and phase, with respect to the serial stream of data, as clock TxClk and RxClk. Thus, the skew problems associated with parallel bus communication are eliminated in the present invention thus enabling the distance over which serial links 320 and 322 may be operated to be significantly longer than can be reliably implemented on a parallel bus, and enabling the transfer rate of the communication between ATM interface 308 and PHY interface 310 to be scaled up to the Limits of the transfer rates of serializers 330 and 340 and deserializers 334 and 336. It will be appreciated from the foregoing, that the "embedding" of the clock signals TxClk and RxClk is a term of art. TxClk and RxClk are not physically transmitted across serial links 320 and 322. It will also be appreciated that TxClk and RxClk may be physically transmitted across serial links 320 and 322, or additional serial links without deviating from the scope of the present invention. Additionally, the control signals TxEnb*, TxSOC, TxFull*/TxClav, RxEnb*, RxSOC and RxEmpty*/RxClav may be serialized and transmitted between ATM layer 302 and PHY layer 304 without deviating from scope and spirit of the present invention. However, utilizing only one serial link in each of the Transmit and Receive directions and not passing the control codes results in increased data transmission rates.

Figure 6:
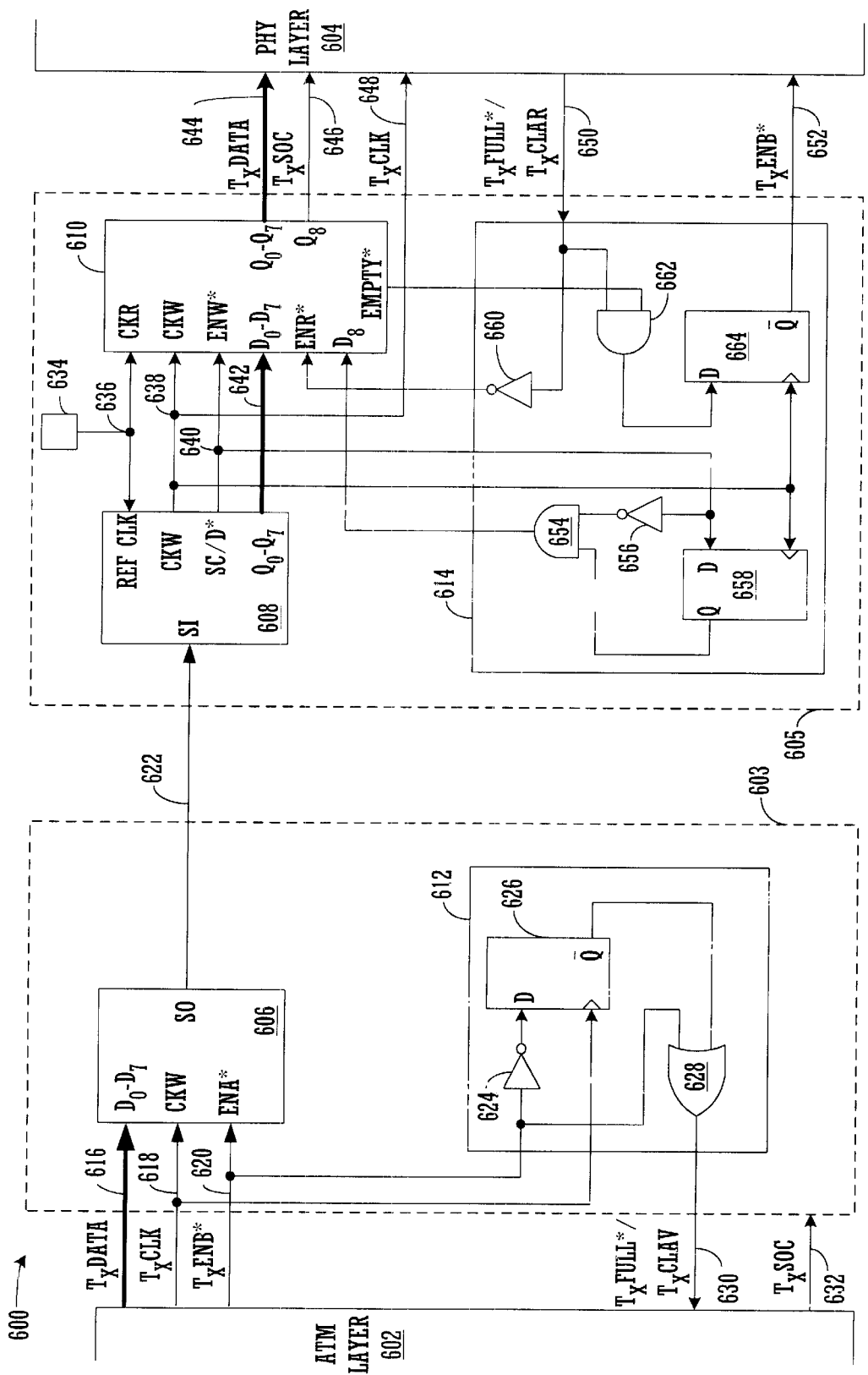
FIG. 6 illustrates an 8-bit embodiment of the present invention implementing the method of operation described in FIG. 4.

FIG. 6 illustrates another embodiment of the present invention which implements transmitting cell data from an ATM layer to a PHY layer in the steady state mode and CLH mode as described in FIG. 4. FIG. 6 shows a communication system 600 comprising ATM layer 602, PHY layer 604 and an extender circuit comprising ATM interface 603, PHY interface 605 and serial link 622. ATM layer 602 coupled to ATM interface 603, and PHY layer 604 coupled to PHY interface 605. ATM interface 603 is serially coupled to PHY interface 605 via serial link 622. ATM interface 603 includes serializer 606 which may comprise any serializing circuitry such as HOTLink™ Transmitter, and control logic 612 which may comprise separate logic elements or a programmable logic device such as CY7C371 32 Macrocell Flash PLD. Inputs D0–D7 of serializer 606 receive 8-bit parallel cell data TxData at node 616, write dock input CKW of serializer 606 receives TxClk at node 618, and enable input ENA* of serializer 606 receives TxEnb* at node 620. Serializer 606 further couples serial output SO to serial link 622. Control logic 612 includes D-type flip-flop 626 and OR gate 628. The D input of D-type flip-flop 626 is coupled to TxEnb* at node 620. The clock input of D-Type flip-flop 626 is coupled to TxClk at node 618. OR gate 628 receives the output of D-type flip-flop 626 and TxEnb*, and provides TxFull*/TxClav at node 630. In this embodiment, TxSOC at node 632 is not processed by ATM interface 603, rather, it is regenerated by PHY interface 605.

PHY interface 605 includes deserializer 608 coupled to FIFO 610 and control logic 614. FIFO 610 is further coupled to control logic 614 and PHY layer 604. Control logic 614 is also coupled to PHY layer 604. PHY interface 605 also includes oscillator 634 coupled to reference clock input REFCLK of deserializer 608 and read dock input CKR of FIFO 610 at node 636. Oscillator 634 docks data out of deserializer 608 and out of FIFO 610. Deserializer 608 provides output read clock CKR to control logic 614, read clock input CKR of FIFO 610 at node 638 and to write clock input CKW of FIFO 610 at node 638. Deserializer 608 outputs special character/data select SC/D* to write enable input ENW* of FIFO 610 and to control logic 614 at node 640. Deserializer 608 further provides parallel data outputs Q0–Q7 to inputs D0–D7 of FIFO 610 at node 642. FIFO 610 outputs to PHY layer 604 parallel data TxData from outputs Q0–Q7 at node 644, and TxSOC from Q8 at node 646. FIFO 610 also couples empty flag output Empty* to control logic 614. Control logic 614 receives TxFull*/TxClav from PHY layer 604 at node 650, and provides TxEnb* to PHY layer 604 at node 652. Control logic 614 comprises D-type flip-flops 658 and 664, AND gate 662, and inverter 660. D-type flip-flop 658 has its D input coupled to node 640 and its clock input coupled to node 638. The output of D-type flip-flop 658 is coupled to the D8 input of FIFO 610. D-type flip-flop 664 has its D input coupled to the output of AND gate 662, and its dock input coupled to node 638. The inverted output of D-type flip-flop 664 provides TxEnb* at node 652 AND gate 662 receives Empty* from FIFO 610 and TxFull*/TxClav at node 650. TxFull*/TxClav at node 650 is also coupled to the input of inverter 660. The output of inverter 660 is coupled to the read enable input ENR* of FIFO 610.

In operation, a cell of data is transmitted from ATM layer 602 to PHY layer 604 in the steady state mode and CLH mode in accordance with FIG. 4 as follows. At step 402, communication system 600 and/or the extender circuit receive power or a reset function. At step 404, TxEnb* is asserted to a high logic level by ATM layer 602 causing OR gate 628 of control logic 612 to assert TxFull*/TxClav to a high logic level. This indicates to ATM layer 602 that it may transmit a cell of data to PHY layer 604 when a cell is available. The system can do this after power up or reset since FIFO 610 will be empty and can store the cell data sent across serial link 622 until PHY layer 604 is ready to accept it. As long as there is no cell data to transmit from ATM layer 602 to PHY layer 604, TxEnb* remains in a high logic state disabling serializer 606. In this state, serializer 606 will generate idle characters and send these idle characters across serial link 622 to PHY interface 605. At step 406, ATM layer 602 has a cell of data ready to be transmitted to PHY layer 604. At step 408, ATM layer 602 asserts TxEnb* to a low logic level which enables serializer 606 to accept parallel cell data TxData at node 616 on each clock cycle of TxClk. TxSOC at node 632 is also asserted to a high logic level for the first byte of cell data, however, TxSOC is not sent to PHY interface 605, rather, it is regenerated by PHY interface 605 as will be described in greater detail below. Additionally, when TxEnb* is at a low logic level, control logic 612 will cause TxFull*/TxClav at node 630 to comprise a low logic level on the next rising edge of TxClk. Given that the embodiment of FIG. 6 is operating in the CLH mode, the entire cell data will be sent even though TxFull*/TxClav has been subsequently driven to a low logic level.

At step 410, serializer 606 serializes the parallel cell data to form a serial stream of data. At step 412, the serial stream of data is output from output SO and serially transmitted across serial link 622 to deserializer 608. At step 414, deserializer 608 receives the serial stream of valid cell data and converts it into parallel cell data. The parallel cell data is provided from outputs Q0–Q7 of deserializer 608 to inputs D0–D7 of FIFO 610. When valid cell data is output from serializer 608, read clock CKR is enabled and functions as regenerated TxClk at node 638, write clock input CKW and read clock input CKR of FIFO 610. One byte of parallel cell data is written into FIFO 610 on each dock cycle of write clock CKW. At step 416, TxSOC is regenerated as described below with reference to FIG. 7. At step 418, cell data is queued in FIFO 610 until PHY layer 604 is ready to accept it. When the first byte of cell data is written into FIFO 610, the empty flag output Empty* will transition to a high level and be provided to one input of AND gate 662. At step 420, PHY layer 604 indicates that it is ready to accept the cell data by asserting TxFull*/TxClav to a high logic level at node 650. At step 422, TxFull*/TxClav is inverted by inverter 660 and provided to read enable input ENR* of FIFO 610. Additionally, TxFull*/TxClav is provided to AND gate 662 and, together with Empty*, cause TxEnb* to transition to a low logic level at node 652 on the next rising dock edge of CKR at node 638. This indicates to PHY layer 604 that valid cell data is provided at node 644. Cell data is provided from FIFO 610 to PHY layer 604 at node 644, along with the regenerated TxSOC at node 646, on each clock pulse of TxClk at node 648.

Deserializer 608 operates in conjunction with control logic 614 and FIFO 610 to regenerate TxSOC and provide the regenerated TxSOC to PHY layer 604 together with the first byte of cell data output from FIFO 610. The regeneration of TxSOC by PHY interface 605 will be described with reference to FIG. 7.

Figure 7:
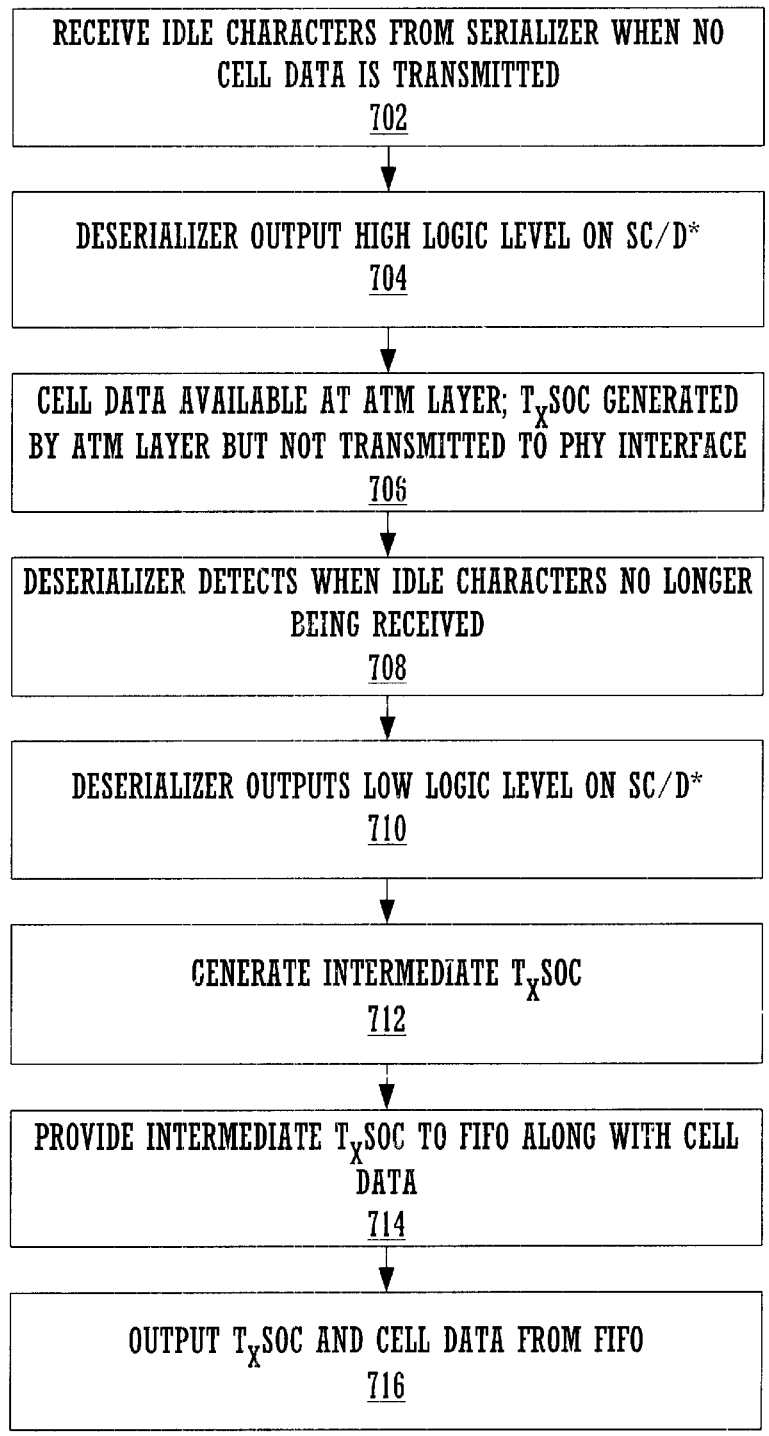
FIG. 7 illustrates a method of the present invention for regenerating the transmit start of cell signal TxSOC.

At step 702 of FIG. 7, and prior to receiving the serial stream of cell data, deserializer 608 receives the idle characters being transmitted from serializer 606. In response to receiving the idle characters at step 704, deserializer 608 outputs a high logic level on SC/D* to indicate that an idle character has been received and is being output on outputs Q0–7. Given that SC/D* is coupled to the write enable ENW* of FIFO 610, FIFO 610 is disabled so that the idle characters will not be written into FIFO 610. At step 706, ATM layer 602 indicates that it has a cell of data to send and asserts TxSOC to a high logic level coincident only with the first byte of cell data. TxSOC is not transmitted to PHY interface 605. The cell data is serialized by serializer 606 and sent to deserializer 608 via serial link 622 as described above. At step 708, deserializer 608 detects that the idle characters are no longer being transmitted by serializer 606. At step 710, deserializer 608 causes output SC/D* to transition to a low logic level during the same dock cycle that the first byte of cell data is provided at outputs Q0–Q7 at node 642. Therefore, deserializer 608 transitions SC/D* from a high logic level to a low logic level when it detects its receipt of valid cell data following idle characters.

At step 712, the low logic level on SC/D* is provided to the D-input of D-type flip-flop 658 of control logic 614 and enables write enable input ENW* of FIFO 610 at node 640. Before the next rising edge of read dock CKR at node 638 is provided to the clock input of D-type flip-flop 658, the Q output of D-type flip-flop 658 will still have a high logic level coupled to input D8 of FIFO 610. The Q output of D-type flip-flop 658 comprises an intermediate TxSOC control signal. On the rising edge of the CKR at step 714, the intermediate TxSOC comprises a high logic level which will be written into input D8 of FIFO 610 along with the first byte of cell data on inputs D0–D7. After the rising dock edge of CKR, the Q output of D-type flip-flop 658 will transition to a low logic level causing the Q output of D-type flip-flop 658 to comprise a low logic level. As a result, the remaining 52 bytes of cell data written into FIFO 610 for the active cell of data will have a corresponding D8 bit having a low logic level. Therefore, only the first byte of cell data will have D8 comprising a high logic level. At step 716, the first byte of cell data is read from FIFO 610 on outputs Q0–Q7, and the regenerated TxSOC is read from FIFO 610 on output Q8.

Figure 8:
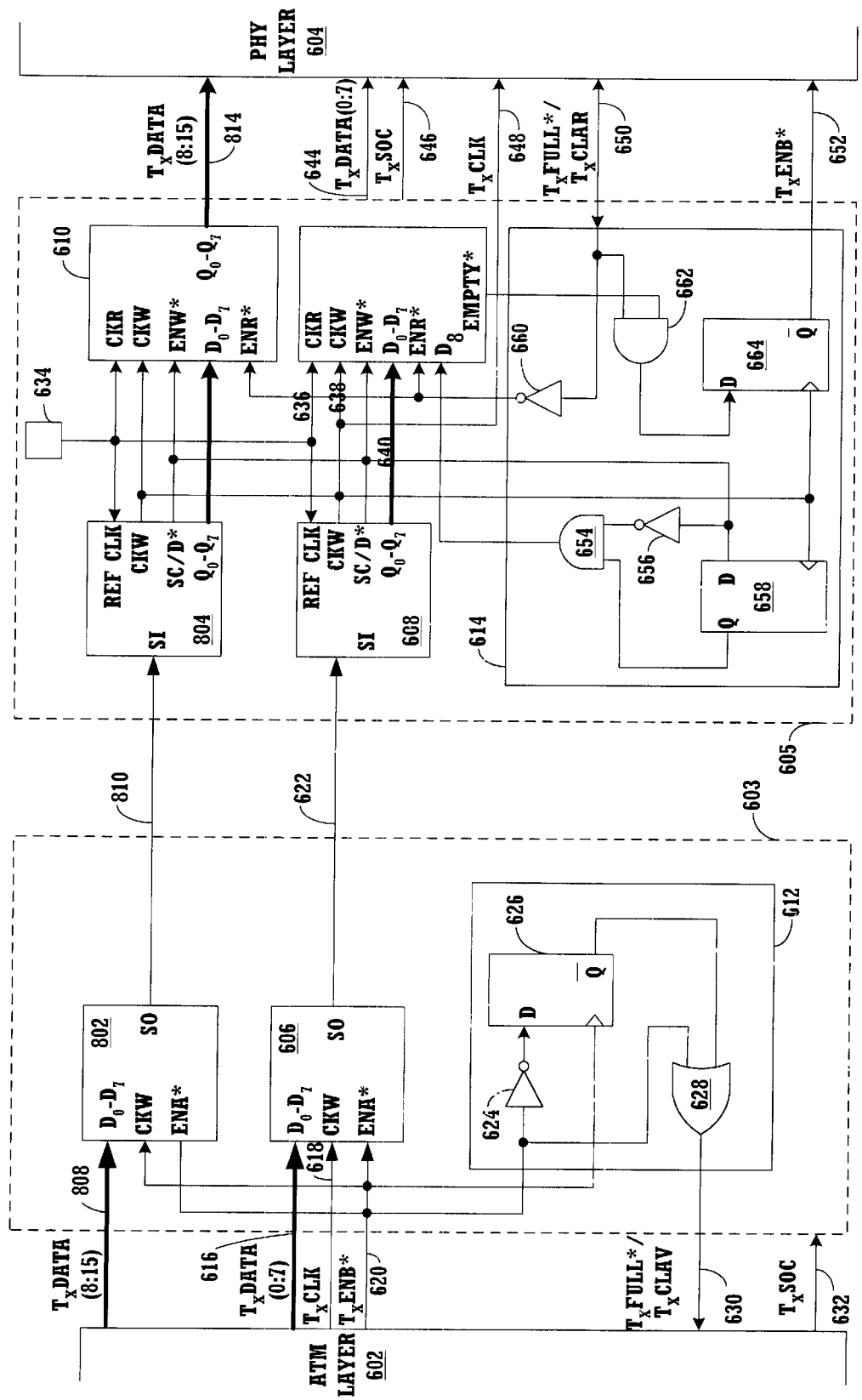
FIG. 8 illustrates 16-bit embodiment of the present invention implementing the method of operation described in FIG. 4.

FIG. 8 illustrates another embodiment of the present invention comprising the embodiment illustrated in FIG. 6 operating in a 16-bit mode of operation. The embodiment illustrated in FIG. 8 includes the same elements 602 through 664 as illustrated in FIG. 6, and operates in a like manner as the embodiment illustrated in FIG. 6. In order to increase the bus width from 8 bits to 16 bits, the embodiment of FIG. 8 employs an additional serializer 802, deserializer 804 and FIFO 806. Serializer 802 is coupled in parallel with serializer 606 sharing TxClk at node 618 and TxEnb* at node 620. The upper 8 bits of transmit data TxData (8:15) are provided to serializer 802 at node 808. Serializer 802 is serially coupled to deserializer 804 via serial link 810. Serial link 810 is similar to, and operates in accordance with, serial link 622. Deserializer 804 and FIFO 806 are coupled in accordance with, and operate in accordance with, deserializer 608 and FIFO 610. The outputs Q0–Q7 of FIFO 806 provided the upper 8 bits of data TxData (8:15) to PHY layer 604 at node 814 in a similar fashion as the lower 8 bits of data TxData (0:7) are provided to PHY layer 604 at node 644. The 16-bit embodiment of the present invention illustrated in FIG. 8 may also be accomplished without adding serializer 802, deserializer 804, FIFO 806 and serial link 810, by simply utilizing a serializer 606, deserializer 608 and FIFO 610 having widths of 16 bits rather than 8 bits.

Figure 9:
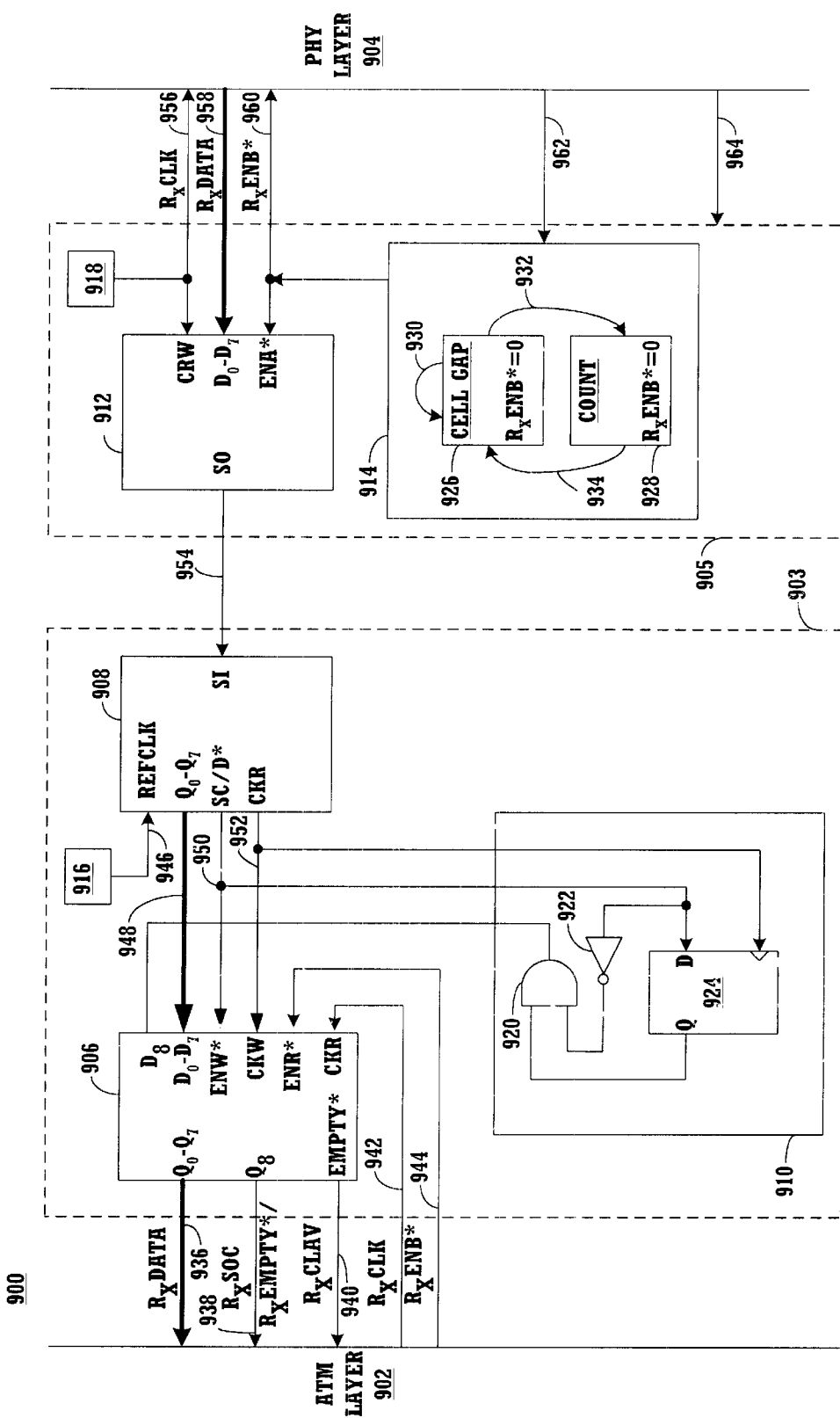
FIG. 9 illustrates an 8-bit embodiment of the present invention implementing the method of operation described in FIG. 5.

FIG. 9 illustrates another embodiment of the present invention which implements transmitting cell data from a PHY layer to an ATM layer in the steady state mode and CLH mode as described in FIG. 5. FIG. 9 shows a communication system 900 comprising ATM layer 902, PHY layer 904 and an extender circuit comprising ATM interface 903, PHY interface 905 and serial link 954. ATM layer 902 coupled to ATM interface 903 and PHY layer 904 coupled to PHY interface 905. ATM interface 903 and PHY interface 905 comprise an extender circuit according to the present invention. PHY interface 905 includes serializer 912 which may comprise any serializing circuitry such as the HOTLink™ Transmitter, and control logic 914 which may comprise separate logic elements or a programmable logic device such as the CY7C371 32 macrocell Flash PLD. Inputs D0–D7 of serializer 912 receive 8-bit parallel cell data RxData at node 958, write dock input CKW of serializer 912 is coupled to oscillator 918 and RxClk at node 956, and enable input ENA* of serializer 912 receives RxEnb* from control logic 914 at node 960. Serializer 912 further couples serial output SO to serial link 954. Control logic 914 receives RxEmpty*/RxClav at node 962 provides RxEnb* to serializer 912 and PHY layer 904 at node 960. Control logic 914 comprises a state machine which has two states: cell gap 926 and count 928 which will be described in detail below. In this embodiment, RxSOC is provided to PHY interface 905 by PHY layer 904, but is not processed or utilized by PHY interface 905.

ATM interface 903 includes deserializer 908 coupled to FIFO 906 and control logic 910. FIFO 906 is further coupled to control logic 910 and ATM layer 902. ATM interface 903 also includes oscillator 916 coupled to reference clock input REFCLC of deserializer 908 at node 946. Deserializer 908 provides output read clock CKR to control logic 910 and to the write dock input CKW of FIFO 906 at node 952, and output special character/data select SC/D* to write enable input ENW* of FIFO 906 and to control logic 910 at node 950. Deserializer 908 further provides parallel data outputs Q0–Q7 to inputs D0–D7 of FIFO 906 at node 948. FIFO 906 outputs to ATM layer 902 parallel data RxData from outputs Q0–Q7 at node 936, RxSOC from Q8 at node 938, and empty flag output Empty* comprising RxEmpty*/RxClav at node 940. Control logic 910 includes D-type flip-flop 924 which is configured to operate in a like manner as D-type flip-flop 658 described in FIG. 6.

In operation, a cell of data is transmitted from PHY layer 904 to ATM layer 902 in the steady state mode and CLH mode in accordance with FIG. 5, as follows. At step 502, communication system 900 and/or the extender circuit receive power or a reset function. At step 504, parallel cell data (RxData) becomes available at PHY layer 904 to be sent to ATM layer 902. At step 506, PHY layer 304 asserts RxEmpty*/RxClav to a high logic level at node 962. At step 508 control logic 914 asserts RxEnb* at node 964 to a low logic level according to the state machine. Control logic 914 utilizes RxEmpty*/RxClav provided by PHY layer 904 at node 964 to generate the appropriate signal state on RxEnb*. Control logic 914 comprises a state machine having two states: cell gap 926 and count 928. When no valid cell data is available to be transmitted from PHY layer 904 to ATM layer 902 (RxEmpty*/RxClav comprising a low logic level), the state machine is in cell gap state 926. When in the cell gap state 926, control logic 914 asserts RxEnb* to a high logic level. Since RxEnb* is coupled to the enable input ENA* of serializer 912, serializer 912 will be disabled and will transmit idle characters across serial link 954 to deserializer 908. Condition 930 indicates that so long as RxEmpty*/RxClav remains at a low logic level, the control logic will remain in cell gap state 926 and RxEnb* will remain at a high logic level.

Condition 932 indicates when a parallel cell of data becomes available to be transmitted to ATM layer 902, PHY layer 904 asserts RxEmpty*/RxClav at node 962 to a high logic level, and the state machine transitions to count state 928. Alternatively, the state machine may transition to count state one clock cycle after RxEmpty*/RxClav comprises a high logic level. Count state 928 asserts RxEnb* to a low logic level. This signal is provided at node 960 to PHY layer 904 to indicate that the parallel cell data can be transmitted at node 958 to serializer 912, and also enables serializer 912 at enable input ENA*. At step 510, the parallel cell data is then transmitted to serializer 912 and clocked into serializer 912 by oscillator 918 which also regenerates RxClk at node 956. RxSOC is asserted to a high logic level and provided by PHY layer 904 to PHY interface 905 together with the first byte of cell data. RxSOC is asserted to a low logic level for the remaining 52 bytes of cell data. In this embodiment, RxSOC is not processed by PHY interface 905, rather, it is regenerated by ATM interface 903 as will be described in greater detail with respect to FIG. 10. In count state 928, control logic 914 will count the 53 bytes of data comprising one cell of parallel data. As indicated by condition 934, when the count reaches the cell size of 53 bytes, the state machine transitions back to cell gap state 926. Once back in cell gap state 926, RxEnb* is reasserted to a high logic level disabling serializer 912 and causing idle characters to be transmitted to deserializer 908.

Figure 20:
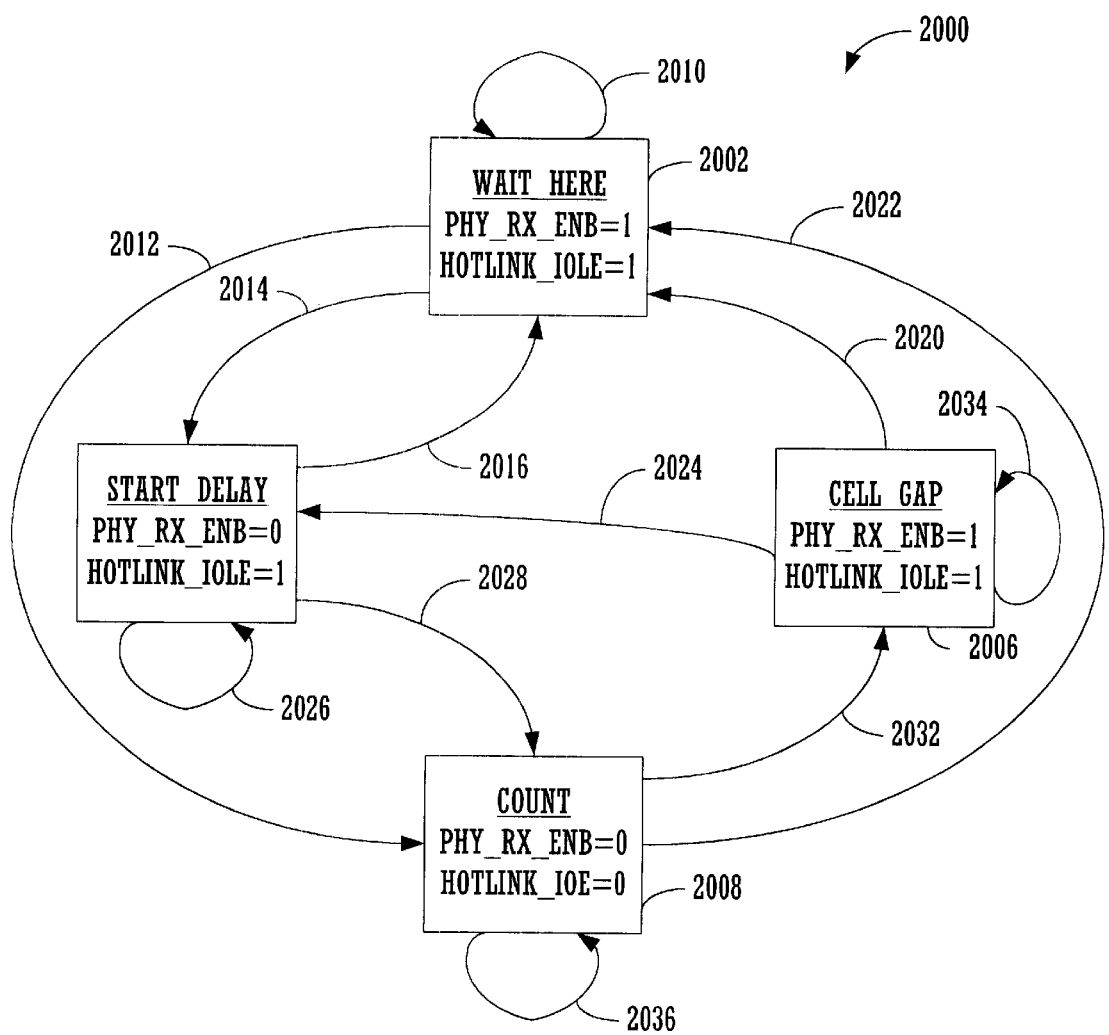
FIG. 20 illustrates a state diagram according to the present invention for generating RxEnb* and HOTLINK_IDLE in accordance with FIG. 13b.

In an alternative embodiment, control logic 914 may comprise a state machine as illustrated in FIG. 20. The state machine of FIG. 20 is described in greater detail below. In this embodiment, HOTLINK_IDLE is coupled to ENA* of serializer 912, and the state machine provides a separate signal to RxEnb* at node 960.

At step 512, serializer 912 converts the parallel cell data to a serial stream of data. At step 514, serializer 912 transmits the serial stream of data to deserializer 908 via serial link 954. The control signals RxEmpty*/RxClav, RxEnb*, and RxSOC are not transmitted to deserializer 908. At step 516, deserializer 908 receives the serial data sent by serializer 912 via serial link 908, and converts the serial data back to the parallel cell data. The parallel cell data is provided from outputs Q0–Q7 of deserializer 908 to inputs D0–D7 of FIFO 906. Serializer 908 provides output read clock CKR to write clock input CKW of FIFO 906. One byte of parallel cell data is written into FIFO 906 on each clock cycle of read clock CKR of deserializer 908. At step 518, RxSOC is regenerated as described below with reference to FIG. 10. At step 520, cell data is queued in FIFO 906 until ATM layer 902 is ready to accept it. At step 522, RxEmpty*/RxClav is regenerated by FIFO 906 at node 940. When the first byte of cell data is written into FIFO 906, empty flag output Empty* is asserted to a high logic level. Empty flag output Empty is provided to ATM layer 902 as RxEmpty*/RxClav. Therefore, when empty flag output Empty* is asserted to a high logic level, RxEmpty*/RxClav is asserted to a high logic level indicating to ATM layer 902 that a cell of data is available. When ATM layer 902 is ready to accept the cell of data at step 524, ATM layer 902 asserts RxEnb* to a low logic level at node 944 which is coupled to the read enable input ENR* of FIFO 906. The parallel cell data will then be read out of FIFO 906 from outputs Q0–Q7 on each clock of RxClk which is provided at node 942 to read clock CKR of FIFO 906. Additionally, control logic 910, deserializer 908 and FIFO 906 regenerate RxSOC such that output Q8 of FIFO 906 comprises RxSOC. The regeneration of RxSOC by ATM interface 903 will described in greater detail with reference to FIG. 10.

Figure 10:
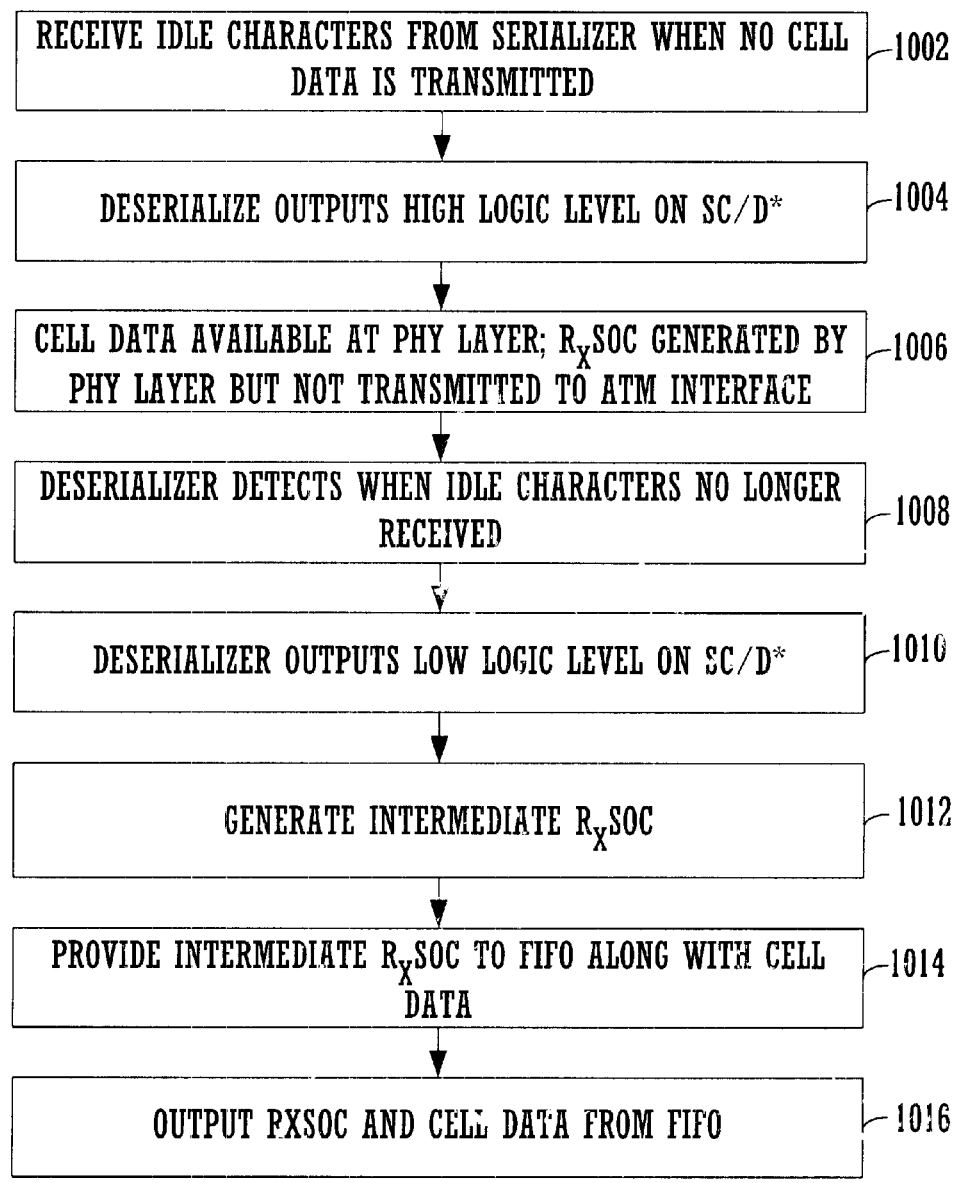
FIG. 10 illustrates a method of the present invention for regenerating the receive start of cell signal RxSOC.

At step 1002 of FIG. 10, and prior to receiving the serial stream of cell data, deserializer 908 receives the idle characters being transmitted from serializer 912. In response to receiving the idle characters at step 1004, deserializer 908 outputs a high logic level on SC/D* to indicate that an idle character has been received and is being output on outputs Q0–7. Given that SC/D* is coupled to the write enable ENW* of FIFO 906, FIFO 906 is disabled so that the idle characters will not be written into FIFO 906. At step 1006, PHY layer 904 indicates that it has a cell of data to send and asserts RxSOC to a high logic level coincident only with the first byte of cell data. RxSOC is not processed by PHY interface 905. The cell data is serialized by serializer 912 and sent to deserializer 908 via serial link 954 as described above. At step 1008, deserializer 908 detects that the idle characters are no longer being transmitted by serializer 912. At step 1010, deserializer 908 causes output SC/D* to transition to a low logic level during the same clock cycle that the first byte of cell data is provided at outputs Q0–Q7 at node 948. Therefore, deserializer 908 transitions SC/D* from high logic level to a low logic level when it detects its receipt of valid cell data following idle characters.

At step 1012, the low logic level on SC/D* is provided to the D-input of D-type flip-flop 924 of control logic 910 and enables write enable input ENW* of FIFO 906 at node 950. Before the next rising edge of read clock CKR at node 952 is provided to the clock input of D-type flip-flop 924, Q output of D-type flip-flop 924 outputs a high logic level to input D8 of FIFO 906. The Q output of D-type flip-flop 924 comprises an intermediate RxSOC control signal. On the rising edge of the CKR at step 1014, the intermediate RxSOC comprises a high logic level which will be written into input D8 of FIFO 906 along with the first byte of cell data on inputs D0–D7. After the rising clock edge of CKR, the Q output of D-type flip-flop 924 will transition to a low logic level causing intermediate RxSOC to comprise a low logic level. As a result, the remaining 52 bytes of cell data written into FIFO 906 for the active cell of data will have a corresponding D8 bit having a low logic level. Therefore, only the first byte of cell data will have D8 comprising a high logic level. At step 1016, the first byte of cell data is read from FIFO 906 on outputs Q0–Q7, and the regenerated RxSOC is read from FIFO 906 on output Q8.

Figure 11:
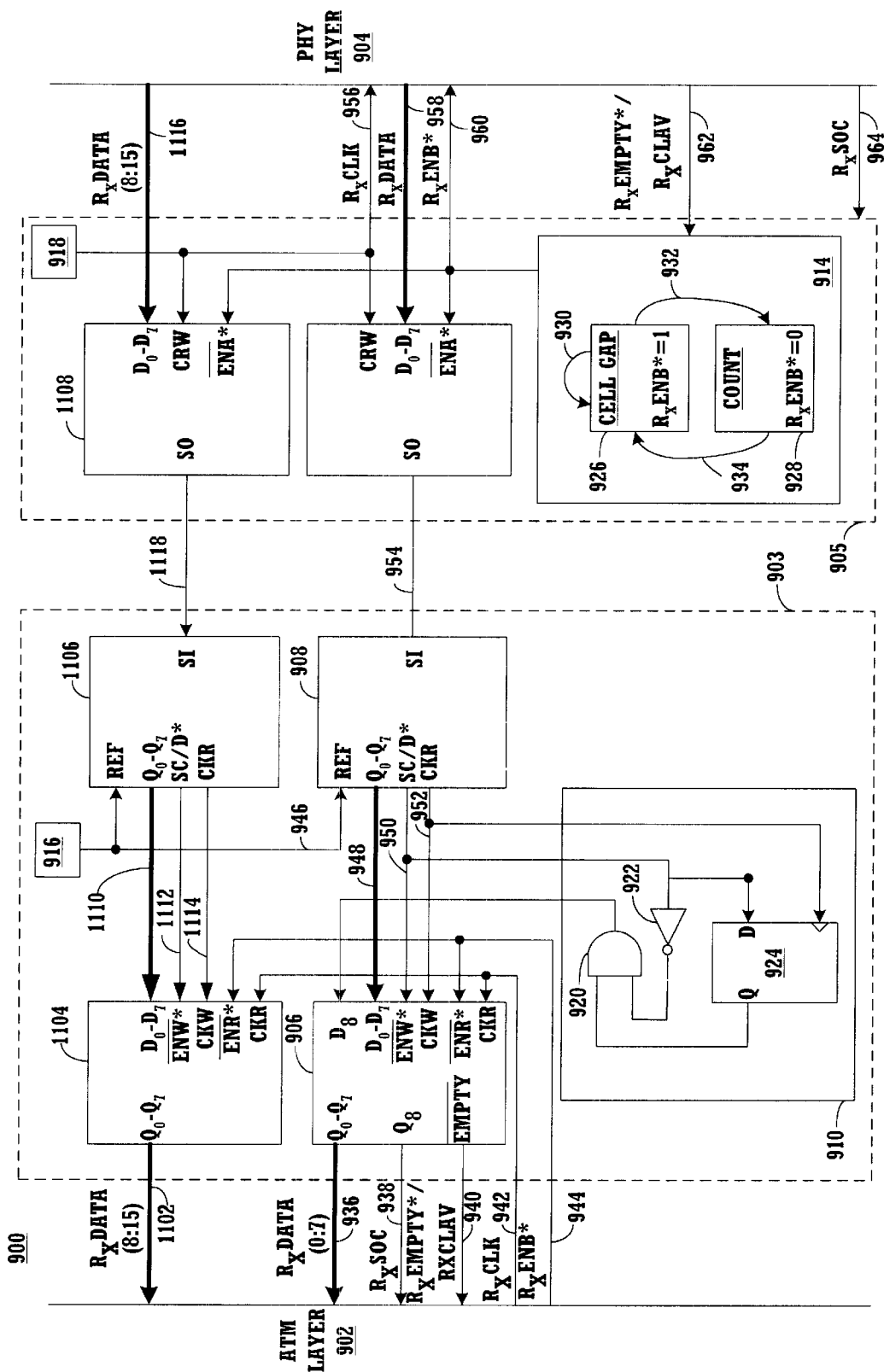
FIG. 11 illustrates 16-bit embodiment of the present invention implementing the method of operation described in FIG. 5.

FIG. 11 illustrates another embodiment of the present invention comprising the embodiment illustrated in FIG. 9 operating in a 16-bit mode of operation. The embodiment illustrated in FIG. 11 includes the same elements 902 through 964 as illustrated in FIG. 9, and operates in a like manner, including the regeneration of all control signals, as the embodiment illustrated in FIG. 9. In order to increase the bus width from 8 bits to 16 bits, the embodiment of FIG. 11 includes an additional serializer 1108, deserializer 1106 and FIFO 1104. Serializer 1108 is coupled in parallel with serializer 912 sharing RxClk at node 956 and RxEnb* at node 960. The upper 8 bits of receive data RxData (8:15) are provided to serializer 1108 at node 1116. Serializer 1108 is serially coupled to deserializer 1106 via serial link 1118. Serial link 1118 is similar to, and operates in accordance with, serial link 954. Deserializer 1106 and FIFO 1104 are coupled in accordance with and operate in a like manner as deserializer 908 and FIFO 906. The outputs Q0–Q7 of FIFO 1104 provide the upper 8 bits of data RxData (8:15) to ATM layer 902 at node 1102 in a similar fashion as the lower 8 bits of data RxData (0:7) are provided to ATM layer 902 at node 936. The 16-bit embodiment of the present invention illustrated in FIG. 11 may also be accomplished without adding serializer 1108, deserializer 1106, FIFO 114 and serial link 1118, by simply utilizing serializer 606, deserializer 608 and FIFO 610 having widths of 16 bits rather than 8 bits.

Figure 12:
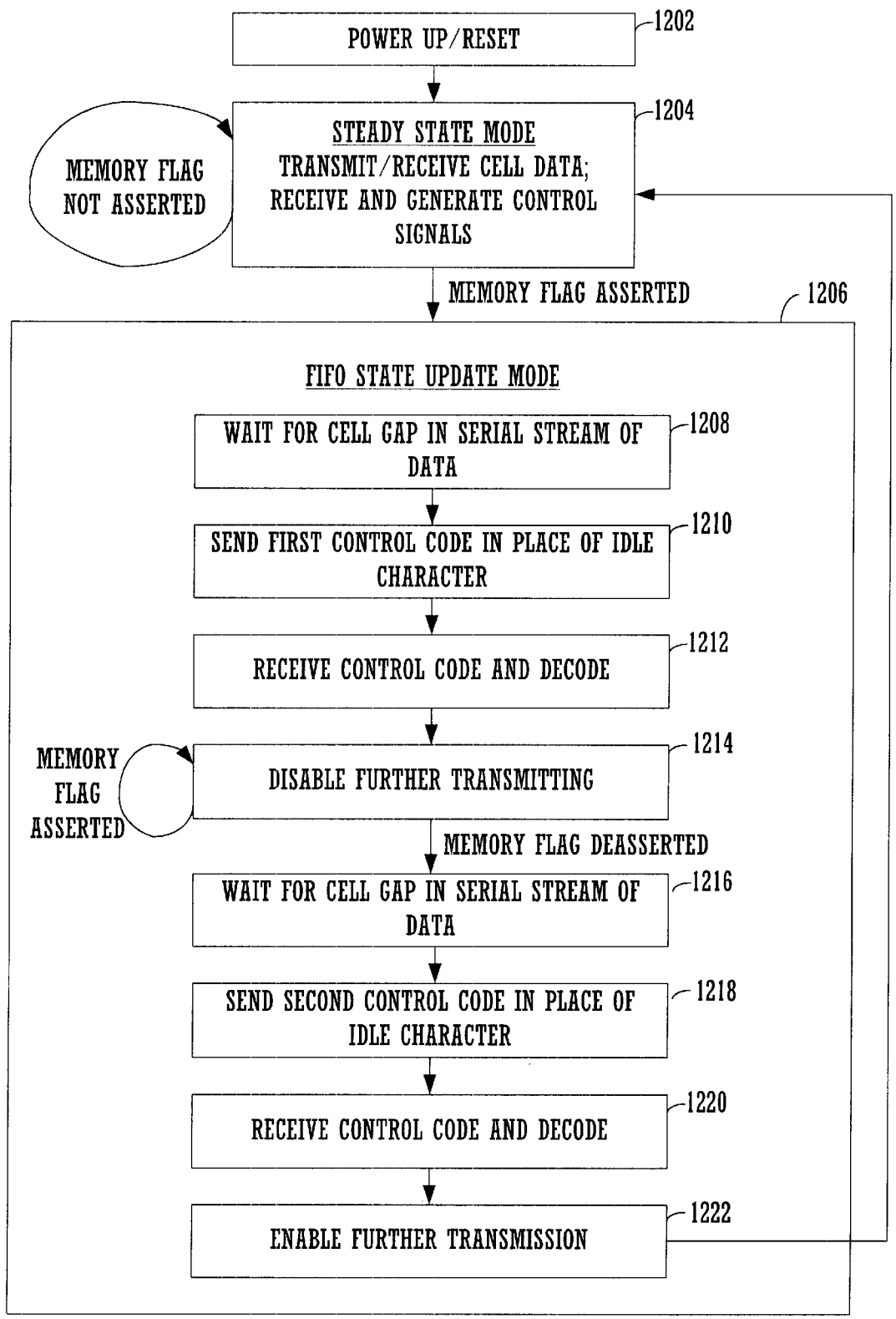
FIG. 12 illustrates the interaction of the steady state mode and the FIFO state update mode of the present invention.

FIG. 12 illustrates the interaction of the steady state mode and the FIFO state update mode. FIG. 12 will be described with reference to the embodiment of the present invention described in FIG. 3. At step 1202, either a reset function or power is applied to communication system 300 and/or extender circuit 306. Extender circuit 306 then enters the steady state mode at step 1204. In the steady state mode, extender circuit 306 will receive and transmit cell data between ATM layer 302 and PHY layer 304 via extender circuit 306 which will also receive and generate control signals TxEnb*, TxSOC, TxFull*/TxClav, RxEnb*, RxSOC, and RxEmpty*/RxClav with a minimum amount of control. Extender circuit 306 will remain in the steady state mode at step 1204 until either FIFO 332 or FIFO 338 contains a predetermined amount of cell data. With respect to FIFO 338, when FIFO 338 contains the predetermined amount of cell data it asserts a flag condition. The flag condition may indicate that FIFO 338 is either full, half-full, or contains another predefined number of bytes of cell data. The flag condition may be judiciously chosen based on the transfer rate of extender circuit 306 and the depth of the FIFO memory device utilized. When the memory flag is asserted, extender circuit 306 transitions into FIFO state update mode at step 1206.

In FIFO state update mode, extender circuit 306 interprets the memory flag asserted by either FIFO 338 or FIFO 332 as if TxFull*/TxClav and/or RxEnb* has been asserted to a low and high logic level respectively. This indicates that either PHY layer 304 or ATM layer 302 cannot accept any more cell data. Steps 1208 through 1222 describe the FIFO state update mode is more detail.

First, the operation of transmitting cell data from ATM layer 302 to PHY layer 304 is described with reference to CLH mode. As described above, in the steady state mode cell data is transmitted from ATM layer 302 to PHY layer 304 via extender circuit 306. The cell data is queued in FIFO 338 of PHY interface 310. When FIFO 338 queues a predetermined number of bytes of cell data, it asserts a memory flag (e.g. the half-full flag). At step 1208, once FIFO 338 asserts a memory flag, control logic 342 waits for cell gap in the serial stream of data being transmitted from PHY layer 304 to ATM layer 302 via serial link 322. When a cell gap is detected at step 1210, control logic 342 provides serializer 340 with a first control code which is sent in place of the idle character across serial link 322 to ATM interface 308. The first control code indicates that FIFO 338 has asserted the appropriate memory flag and functions as the TxFull*/TxClav being asserted to a low logic level. The first control code may comprise, for example, a HOTLink™ K28.0control code. At step 1212, deserializer 334 receives, and control logic 328 decodes, the first control code. At step 1214, control logic 328 disables the transmission of cell data from ATM layer 302 to PHY layer 304 by asserting TxFull*/TxClav to a low logic level and providing this signal, via parallel bus 324, to ATM layer 302. Transmission from ATM layer 302 to PHY layer 304 will remain disabled so long as the memory flag remains asserted by FIFO 338.

Once PHY layer 304 has read a sufficient amount of cell data from FIFO 338 such that the memory flag of FIFO 338 is no longer enabled (e.g. reads enough cell data such that FIFO 338 is less than half full), FIFO state update mode transitions to step 1216. At step 1216, control logic 342 waits for a cell gap in the serial stream of data being transmitted from PHY layer 304 to ATM layer 302 via serial link 322. When a cell gap is detected at step 1216, control logic 342 provides serializer 340 with a second control code at step 1218 which is sent in place of the idle character across serial link 322 to ATM interface 308. The second control code indicates that FIFO 324 has deasserted the appropriate memory flag and functions as the TxFull*/TxClav being asserted to a high logic level. The second control code may comprise, for example, a HOTLink™ K28.2 control code. At step 1220, deserializer 334 receives, and control logic 328 decodes, the second control code. At step 1222, control logic 328 enables the transmission of cell data from ATM layer 302 to PHY layer 304 by asserting TxFull*/TxClav to a high logic level and providing this signal, via parallel bus 324, to ATM layer 302. Operation of extender circuit then returns to steady state mode at step 1204.

The operation of transmitting cell data to from PHY layer 304 to ATM layer 302 will now be described with reference to the FIFO state update mode and CLH mode. As described above, in the steady state mode, cell data is transmitted from PHY layer 304 to ATM layer 302 via extender circuit 306. The cell data is queued in FIFO 332 of ATM interface 308. When FIFO 332 queues a predetermined number of cell data bytes it asserts a memory flag (e.g. the half-full flag). At step 1208, once FIFO 332 asserts a memory flag, control logic 328 waits for cell gap in the serial stream of data being transmitted from ATM layer 302 to PHY layer 304 via serial link 320. When a cell gap is detected at step 1210, control logic 328 provides serializer 330 with a first control code which is sent in place of the idle character across serial link 320 to PHY interface 310. The first control code indicates that FIFO 332 has asserted the appropriate memory flag and functions as RxEnb* being asserted to a high logic level. The first control code may comprise a HOTLink™ K28.0 control code. At step 1212, deserializer 336 receives, and control logic 342 decodes, the first control code. At step 1214, control logic 342 disables the transmission of cell data from PHY layer 304 to ATM layer 302 by asserting RxEnb* to a high logic level and providing this signal, via parallel bus 346, to PHY layer 304. Transmission from PHY layer 304 to ATM layer 302 will remain disabled so long as the memory flag remains asserted by FIFO 332.

Once ATM layer 302 has read a sufficient amount of cell data from FIFO 332 such that the memory flag of FIFO 332 is no longer enabled (e.g. reads enough cell data such that FIFO 332 is less than half full), FIFO state update mode transitions to step 1216. At step 1216, control logic 314 waits for a cell gap in the serial stream of data being transmitted from ATM layer 302 to PHY layer 304 via serial link 320. When a cell gap is detected at step 1216, control logic 328 provides serializer 330 with a second control code at step 1218 which is sent in place of the idle character across serial link 320 to PHY interface 310. The second control code indicates that FIFO 332 has deasserted the appropriate memory flag and functions as the RxEnb* being asserted to a low logic level. The second control code may comprise HOTLink™ K28.2 control code. At step 1220, deserializer 336 receives, and control logic 342 decodes, the second control code. At step 1222, control logic 342 enables the transmission of cell data from PHY layer 304 to ATM layer 302 by asserting RxEnb* to a low logic level and providing this signal, via parallel bus 346, to PHY layer 304.

Operation of extender circuit then returns to steady state mode at step 1204.

Figure 13A:
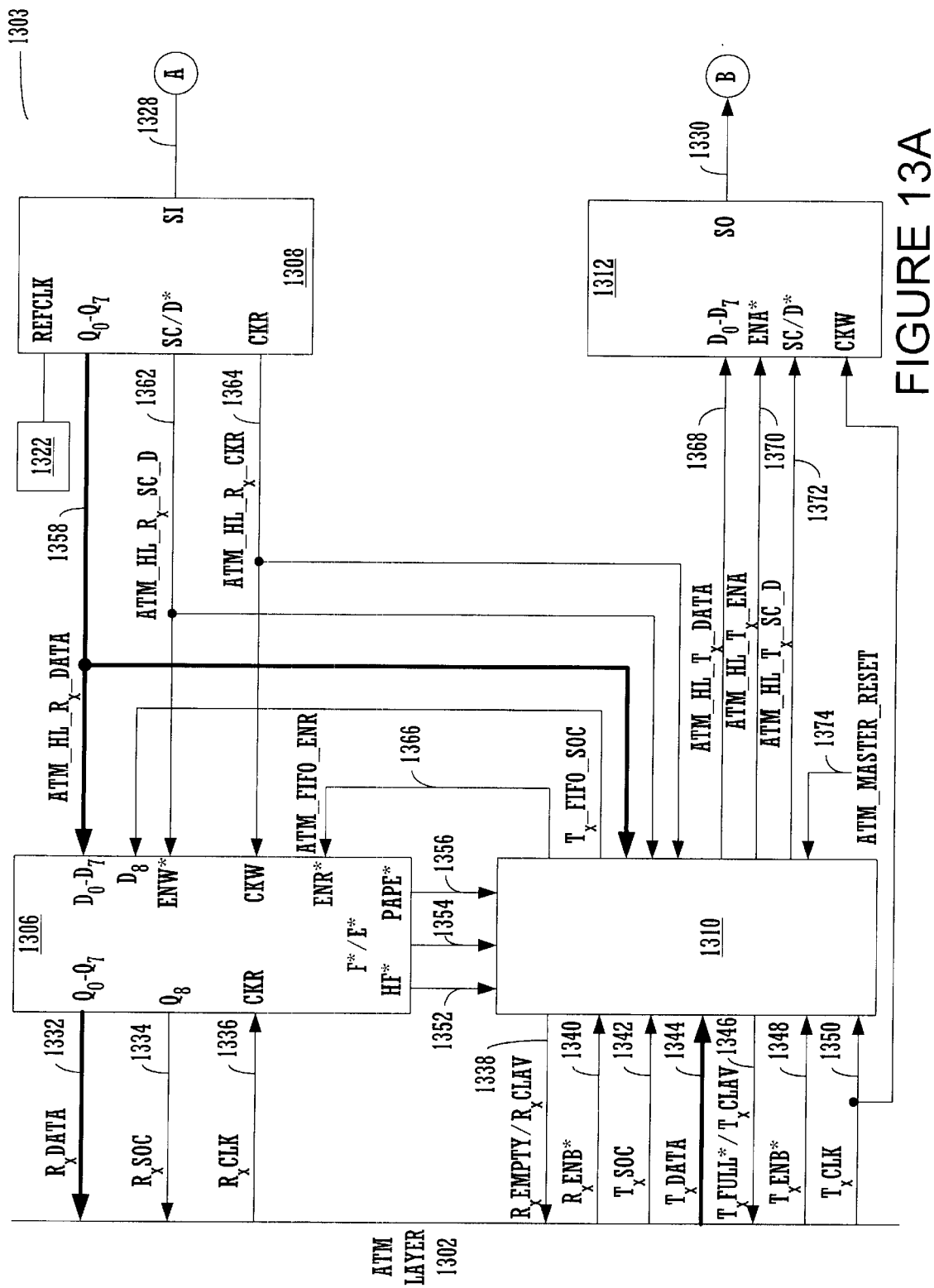
FIG. 13a illustrates an ATM interface embodiment of the present invention for implementing the steady state mode and the FIFO state update mode of FIG. 12.
Figure 13B:
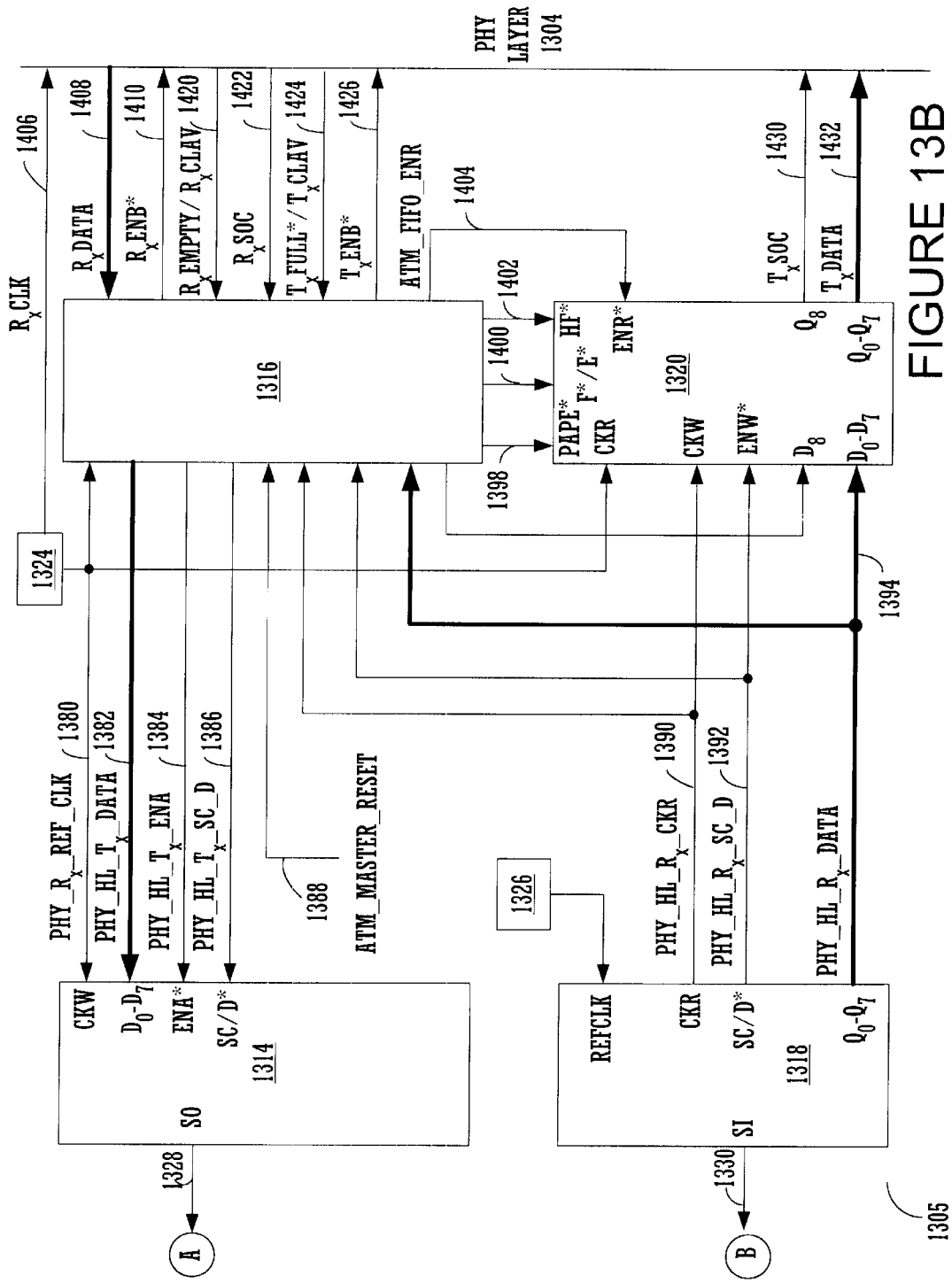
FIG. 13b illustrates a PHY interface embodiment of the present invention for implementing the steady state mode and the FIFO state update mode of FIG. 12.

FIGS. 13a and 13b illustrate another embodiment of the present invention implementing both the steady state mode and the FIFO state update mode for transmitting cell data between ATM and PHY layers in CLH mode. FIG. 13a illustrates ATM interface 1303 coupled to, and communicating in parallel with, ATM layer 1302. FIG. 13b illustrates PHY interface 1305 coupled to, and communicating in parallel with, PHY layer 1304. ATM interface 1303 is coupled to, and communicates serially with PHY interface 1305 via serial links 1328 and 1330. Serial links 1328 and 1330 may comprise only one serial link simultaneously transmitting serial signals between ATM interface 1303 and PHY interface 1305 (such as illustrated in FIG. 28). ATM interface 1303, PHY interface 1305 and serial links 1328 and 1330 comprise an extender circuit according to the present invention.

ATM interface 1302 comprises FIFO 1306, deserializer 1308, control logic 1310 and serializer 1312. Deserializer 1308 receives serial data at input SI from PHY interface 1305, converts the serial data to parallel data and provides the parallel data to FIFO 1306 and control logic 1310. Deserializer 1308 outputs the following signals: output SC/D* provides ATM_HL_Rx_SC_D to control logic 1310 and write enable input ENW* of FIFO 1306 at node 1362, read clock output CKR provides ATM_HL_Rx_CKR to control logic 1310 and write clock CKW of FIFO 1306 at node 1364, and parallel data outputs Q0–Q7 provide ATM_HL_Rx_Data to control logic 1310 and inputs D0–D7 of FIFO 1306 at node 1358. Oscillator 1322 provides a reference clock to input REFCLK of deserializer 1308. Oscillator 1322 is employed to synchronize deserializer 1308 and may comprise, for example, 19.44 MHz in one embodiment. Read enable input ENR* of FIFO 1306 receives ATM_FIFO_ENR at node 1366 from control logic 1310. FIFO 1306 couples three flag outputs to control logic 1310, namely: half-full flag output HF* provides ATM_FIFO_HF at node 1352, full/empty flag F*/E* provides ATM_FIFO_Empty at node 1354, and programmable full/empty flag PAFE* provides ATM_FIFO_PAFE at node 1356. Outputs Q0–Q7 of FIFO 1306 provide RxData to ATM layer 1302 at node 1332 and output Q8 provides RxSOC to ATM layer 1302 at node 1334. Read clock input CKR of FIFO 1306 receives RxClk from ATM layer 1302 at node 1336.

Control logic 1310 further receives the following signals from ATM layer 1302: RxEnb* at node 1340, TxSOC at node 1342, TxData at node 1344, TxEnb* at node 1348, and TxClk at node 1350. Control logic 1310 provides RxEmpty*/RxClav to ATM layer 1302 at node 1338, and TxFull*/TxClav at node 1346. Control logic 1310 further provides to serializer 1312, ATM_HL_Tx_Data to data inputs D0–D7 at node 1368, ATM_HL_Tx_ENA to enable input ENA* at node 1370, and ATM_HL_Tx_SC_D to input SC/D* at node 1372. Control logic 1310 also receives ATM_Master_Reset at node 1374. Write clock input CKW of serializer 1312 also receives TxClk at node 1350, and serializer 1312 outputs serial data from output SO to serial link 1330.

PHY interface 1305 comprises FIFO 1320, deserializer 1318, control logic 1316 and serializer 1314. Deserializer 1318 receives serial data from ATM interface 1303 at input SI, converts the serial data to parallel data and provides the parallel data to FIFO 1320 and control logic 1316. Deserializer 1318 outputs the following signals: output SC/D* provides PHY_HL_Rx_SC_D to control logic 1316 and write enable input ENW* of FIFO 1320 at node 1392; read clock output CKR provides PHY_$_{HL}$_Rx_CKR to control logic 1316, write clock CKW of FIFO 1320, and read clock CKR of FIFO 1320 at node 1390; and parallel data outputs Q0–Q7 provide PHY_HL_Rx_Data to control logic 1316 and inputs D0–D7 of FIFO 1320 at node 1394. PHY_HL_Rx_CKR also comprises regenerated TxClk provided to PHY layer 1304 at node 1428. Oscillator 1326 provides a reference clock to input REFCLK of deserializer 1308. Oscillator 1326 is employed to synchronize deserializer 1318 and may comprise 19.44 MHz in one embodiment. Read enable input ENR* of FIFO 1320 receives PHY_FIFO_ENR at node 1404 from control logic 1316. FIFO 1320 couples three flag outputs to control logic 1316, namely: half-full flag output HF* provides PHY_FIFO_HF at node 1402, full/empty flag F*/E* provides PHY_FIFO_Empty at node 1400, and programmable full/empty flag PAFE* provides PHY_FIFO_PAFE at node 1398. Outputs Q0–Q7 of FIFO 1320 provide TxData to PHY layer 1304 at node 1432 and output Q8 provides TxSOC to PHY layer 1304 at node 1430. Read clock input CKR of FIFO 1320 receives PHY_HL_Rx_CKR from deserializer 1318 at node 1390. Oscillator 1324 also provides PHY_Rx_Ref_Clk write clock input CKW of serializer 1314 and to control logic 1316. Additionally, oscillator 1324 regenerates RxClk and provides RxClk to PHY layer 1304 at node 1406.

Control logic 1316 further receives the following signals from PHY layer 1304: RxData at node 1408, RxEmpty*/RxClav at node 1420, RxSOC at node 1422 and TxFull*/TxClav at node 1424. Control logic 1316 also provides PHY layer 1304 with RxEnb* at node 1410 and TxEnb* at node 1426. Control logic 1316 further provides to serializer 1314, PHY_HL_Tx_Data to data inputs D0–D7 at node 1382, PHY_HL_Tx_ENA to enable input ENA* at node 1384, and PHY_HL_Tx_SC_D to input SC/D* at node 1386. Control logic also receives PHY_Master_Reset at node 1388. Also PHY_Master_Reset and ATM_Master_Reset may also be applied to serializers 1312 and 1314, deserializers 1308 and 1318, and FIFOs 1306 and 1320. Serializer 1314 also outputs serial data from output SO to serial link 1328. It will be appreciated that the extender circuit illustrated in FIGS. 13a and 13b, may comprise variable bus widths, such as 16-bit bus widths accomplished in the same spirit as described with respect to FIGS. 8 and 11.

Control logic 1310 and 1316 may comprise dedicated logic or may be implemented by programmable logic devices (e.g. CPLDs, FPGAs, etc.) including, for example, CY7C371 32 Macrocell Complex Programmable Logic devices provided by Cypress Semiconductor Corporation. Additionally, FIFOs 1306 and 1320 may comprise synchronous or asynchronous FIFO devices, or may comprise any type of memory device capable of storing data for retrieval by ATM layer 1302 or PHY layer 1304 (e.g. single-port memories, dual-port memories, etc.) including, for example CY7C451 512x9 Clocked First In First Out (FIFO) memories provided by Cypress Semiconductor Corporation. Serializers 1312 and 1314 may comprise any type of serializing circuitry which is capable of converting parallel data into a serial stream of data, including, for example, CY7B923 HOTLink™ Transmitters provided by Cypress Semiconductor Corporation. Additionally, deserializers 1308 and 1318 may comprise any type of deserializing circuitry which is capable of converting a serial stream of data into parallel data, including, for example, CY7B933 HOTLink™ Receivers provided by Cypress Semiconductor Corporation. HOTLink™ Transmitters and Receivers comprise differential serial output and input signals and may be coupled to media interface circuits to enable interconnections to serial media.

Figure 14:
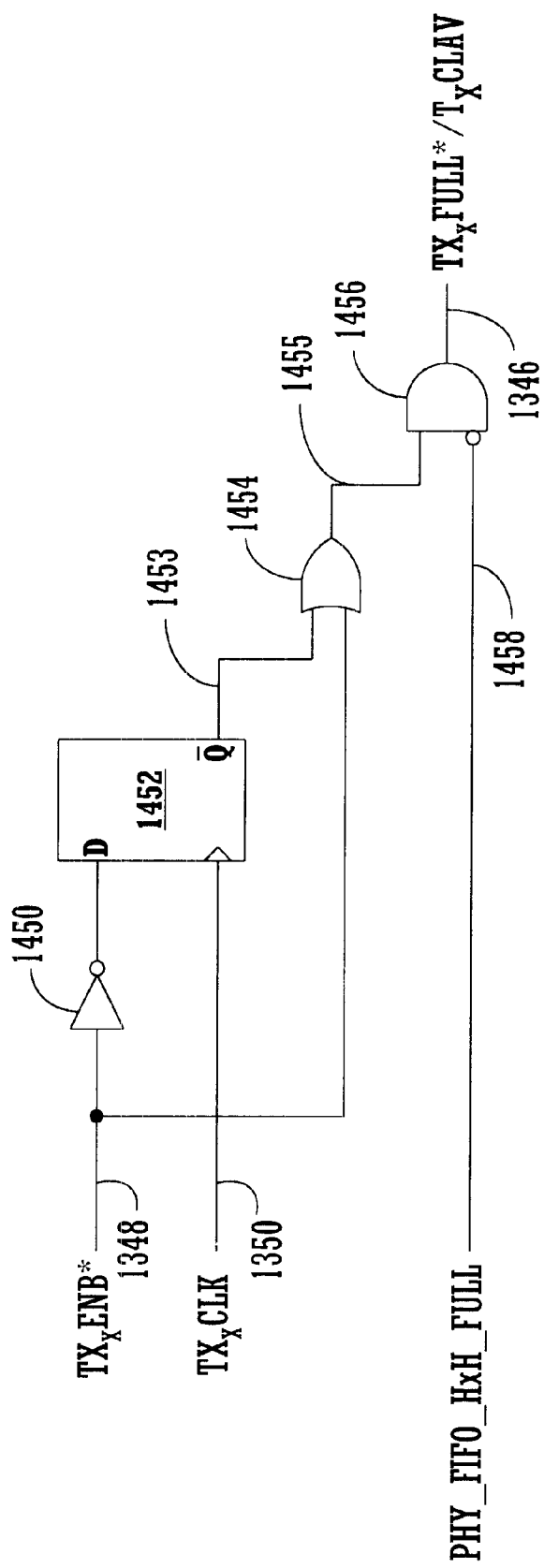

The operation of the FIGS. 13a and 13b will now be described. First, the operation of transmitting a cell of data in CLH mode from ATM layer 1302 to PHY layer 1304 will be described with reference to FIG. 12 and FIG. 4. At step 1202 of FIG. 12, the extender circuit comprising ATM interface 1302, PHY interface 1304 and serial links 1328 and 1330 receives power or a reset function applied from ATM_Master_Reset at node 1374 and/or PHY_Master_Reset at node 1388. Both ATM_Master_Reset and PHY_Master_Reset are active low signals. At step 1204, the extender circuit enters the steady state mode of operation, and will stay there so long as a memory flag is not asserted to a valid state by FIFO 1320. The steady state mode of operation will now be described with reference to FIG. 4 with step 402 already completed. At step 404, control logic 1310 asserts TxFull*/TxClav to a high logic level at node 1346 which indicates that ATM layer 1302 may transmit a cell of data to PHY layer 1304 when the cell is available. TxFull*/TxClav is generated by one embodiment of control logic 1310 as illustrated in FIG. 14. FIG. 14 shows D-type flip-flop 1452 having a D input coupled to TxEnb* at node 1348. TxEnb* is also coupled to one input of OR gate 1454. D-type flip-flop 1452 further is clocked by TxClk from node 1350 and has its Q output coupled to an input of OR gate 1454 at node 1453. FIG. 14 further shows AND gate 1456 receiving the output of OR gate 1454 at node 1455 and PHY_FIFO_Half_Full at node 1458. PHY_FIFO_Half_Full comprises the state of the half-full flag HF* of FIFO 1320 maintained by control logic 1310. When PHY_FIFO_Half_Full comprises a high logic level, HF* of FIFO 1320 comprises a low logic level. AND gate 1456 outputs TxFull*/TxClav at node 1346. After power up or reset TxEnb* will be asserted to a high logic level and PHY_FIFO_Half_Full will be asserted to a high logic level causing AND gate 1456 to drive TxFull*/TxClav to a high logic level. As long as there is no cell data to transmit from ATM layer 1302 to PHY layer 1304, TxEnb* remains in a high logic state, and TxFull*/TxClav remains in a high logic state.

At step 406, cell data becomes available. At step 408, ATM layer 1302 asserts TxEnb* at node 1348 to a low logic level, asserts TxSOC at node 1342 to a high logic level together with the first byte of cell data, and places parallel cell data on TxData at node 1344 which is passed by control logic 1310 to serializer 1312 at node 1368. The parallel cell data is written into serializer 1312 on each clock cycle of TxClk at node 1350. When TxEnb* is driven to a low logic level, the next rising edge of TxClk will cause the output of OR gate 1454 to be driven low thus causing TxFull*/TxClav at node 1346 to also be driven to a low logic level. TxFull*/TxClav will remain low during the transfer of the remaining 52 bytes of cell data from ATM layer 1302 to PHY layer 1304. Therefore, at the end of the transmission of the current cell, a cell gap will be forced by the embodiment of the control logic illustrated in FIG. 14. TxSOC at node 1342 is not serialized and transmitted to PHY layer 1304. At step 410, serializer 1312 converts the parallel cell data into a serial stream of data. At step 412, serializer 1312 transmits the serial stream of data from output SO to PHY interface 1305 via serial link 1330. No transmit control signals are physically sent by serializer 1330 during transmission of the serial stream of cell data except for the concept of the "embedded TxClk" as previously described.

Figure 15:
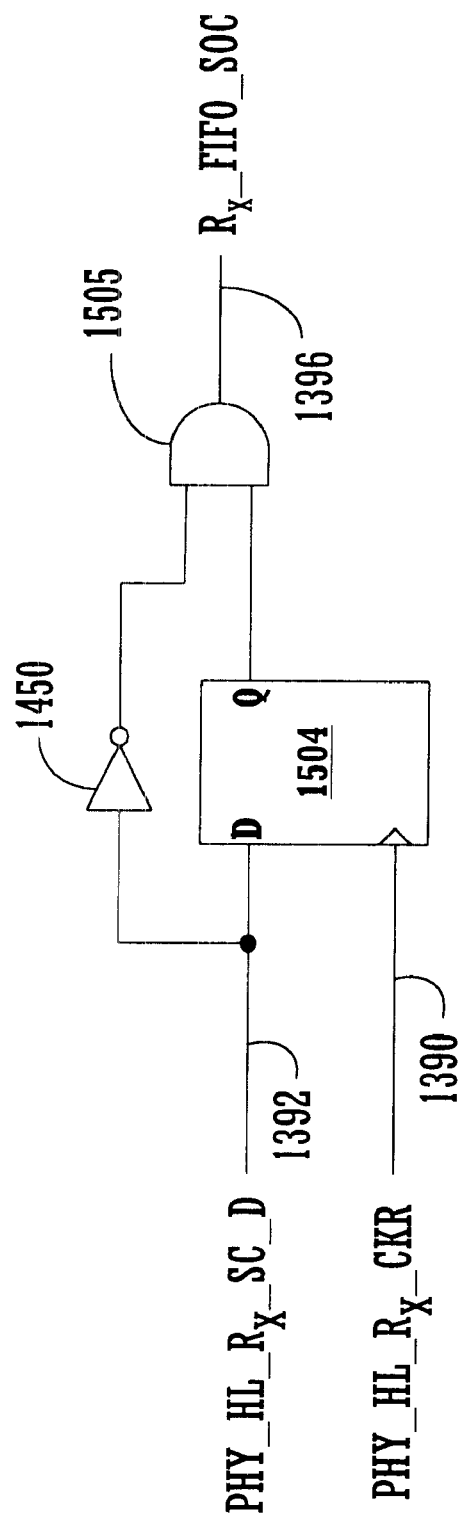
FIG. 15 illustrates one embodiment of the present invention for generating Rx_FIFO_SOC of FIG. 13b.

At step 414, deserializer 1318 receives the serial stream of data from serial link 1330 on input SI, and converts the serial stream of data back to parallel cell data. As previously described with reference to FIG. 3, a deserializer, such as deserializer 1318, regenerates TxClk on the output pin CKR The regenerated clock signal TxClk is provided at node 1428 to PHY layer 1304, to control logic 1316, and write clock input CKW and read dock input CKR of FIFO 1320 as PHY_HL_Rx_CKR at node 1390. At step 416, deserializer 1318, control logic 1316 and FIFO 1320 regenerate start of cell signal TxSOC. FIG. 15 illustrates one embodiment of the control logic employed by control logic 1316, together with deserializer 1318 and FIFO 1320 to regenerate TxSOC. FIG. 15 shows a D-type flip-flop 1504 having its D input coupled to PHY HL_Rx_SC_D at node 1392, its cock input coupled to PHY_HL_Rx_CKR at node 1390, and its Q output coupled to Rx_FIFO_SOC at node 1396. It will be appreciated that D-type flip-flop 1504 corresponds to, and functions in accordance with D-type flip-flop 658 described in FIG. 6. The regeneration of TxSOC at node 1430 will be described with reference to FIG. 7 below.

Figure 16:
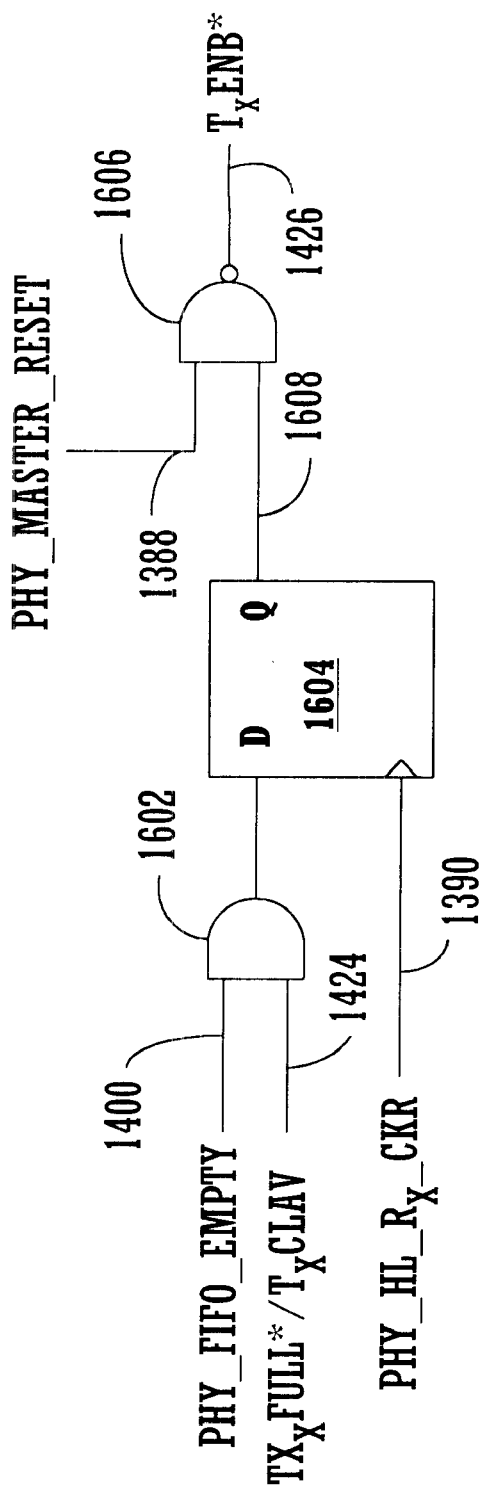
FIG. 16 illustrates one embodiment of the present invention for generating TxEnb* at a PHY layer in accordance with FIG. 13b.

At step 418, the regenerated parallel cell data is output from deserializer 1318 as PHY_HL_Rx_Data at node 1394 and provided to inputs D0–D7 of FIFO 1320. Output SC/D* is driven to a low logic level while data is output from deserializer 1318 enabling write enable input ENW* of FIFO 1320, and PHY_HL_Rx_CKR clocks the parallel data into FIFO 1320. The cell data is queued in FIFO 1320 until PHY layer 1304 is ready to accept it. When PHY layer 1304 is ready to accept the cell data, it asserts TxFull*/TxClav to a high logic level. At step 422, TxEnb* is regenerated at PHY layer 1304 at node 1426 by control logic 1316. FIG. 16 illustrates one embodiment of the control logic employed by control logic 1316 in order regenerate the appropriate state on TxEnb*.

FIG. 16 shows AND gate 1602 receiving PHY_FIFO_Empty at node 1400 and TxFull*/TxClav at node 1424. FIG. 16 further shows D-type flip-flop 1604 having its D input coupled to the output of AND gate 1602, its clock input coupled to PHY_HL_Rx_CKR (TxClk) at node 1390, and it Q output providing PHY_Tx_Enb_Wait at node 1608. FIG. 16 further shows NAND gate having receiving PHY_Master_Reset at node 1388, PHY_Tx_Enb_Wait at node 1608, and providing TxEnb* at node 1426. When FIFO 1320 stores no cell data and PHY_Master_Reset is inactive (high) PHY_FIFO_Empty will comprise a low logic level causing the output of AND gate 1602 and D-type flip-flop 1604 to comprise a low logic level, and TxEnb* to comprise a high logic level. Once cell data is queued in FIFO 1320, PHY_FIFO_Empty will be asserted to a high logic level. When PHY layer 1304 is ready to read receive cell data from ATM layer 1302, it asserts TxFull*/TxClav at node 1424, thus causing the output of AND gate 1602 and D-type flip-flop 1604 to comprise a high logic level, and TxEnb* to comprise a low logic level. Cell data is then provided to PHY layer 1304 from FIFO 1320.

Figure 17:
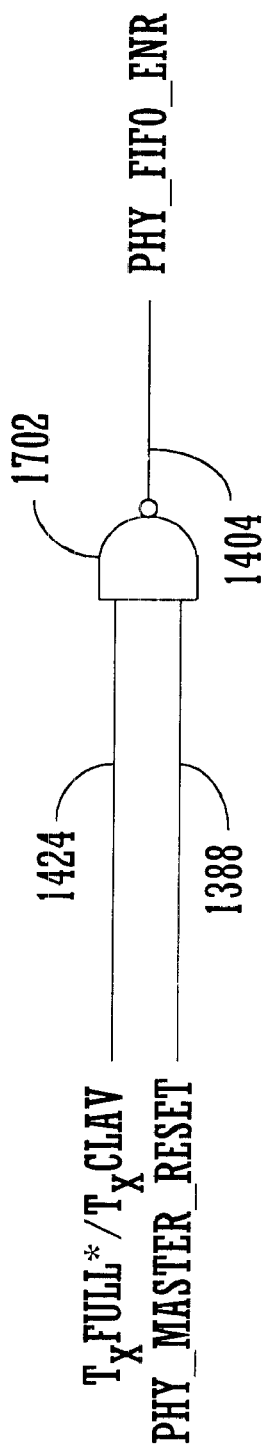
FIG. 17 illustrates one embodiment of the present invention for generating PHY_FIFO_ENR of FIG. 13b.

Reading the cell data from FIFO 1320 is accomplished by control logic 1316 asserting read enable ENR* to a low logic level, as illustrated in one embodiment of control logic 1316 in FIG. 17, and clocking read dock input CKR of FIFO 1320. FIG. 17 shows NAND gate 1702 receiving TxFull*/TxClav at node 1424 and PHY_Master_Reset at node 1388, and providing PHY_FIFO_ENR at node 1404. As long as PHY_Master_Reset is inactive (high), when TxFull*/TxClav is set to a high logic level, PHY_FIFO_ENR will comprise a low logic level enabling cell data to be read from FIFO 1320.

Deserializer 1318 operates in conjunction with control logic 1316 and FIFO 1320 to regenerate TxSOC and provide the regenerated TxSOC to PHY layer 1304 together with the first byte of cell data output from FIFO 1320. The regeneration of TxSOC by PHY interface 1305 will be described with reference to FIG. 7.

At step 702 of FIG. 7, and prior to receiving the serial stream of cell data, deserializer 1318 receives the idle characters being transmitted from serializer 1312. In response to receiving the idle characters at step 704, deserializer 1318 outputs a high logic level on SC/D* at node 1392 to indicate that an idle character has been received and is being output on outputs Q0–Q7 at node 1394. Given that SC/D* is coupled to the write enable ENW* of FIFO 1320, FIFO 1320 is disabled so that the idle characters will not be written into FIFO 1320. At step 706, ATM layer 1302 indicates that it has a cell of data to send and asserts TxSOC at node 1342 to a high logic level coincident only with the first byte of cell data. TxSOC at node 1342 is not transmitted to PHY interface 1305. The cell data is serialized by serializer 1312 and sent to deserializer 1318 via serial link 1330 as described above. At step 708, deserializer 1318 detects that the idle characters are no longer being transmitted by serializer 1312. At step 710, deserializer 1318 causes output SC/D* to transition to a low logic level during the same dock cycle that the first byte of cell data is provided at outputs Q0–Q7 at node 1394. Therefore, deserializer 1318 transitions SC/D* from a high logic level to a low logic level when it detects its receipt of valid cell data following idle characters.

At step 712, the low logic level on SC/D* is provided to the D-input of D-type flip-flop 1504 illustrated in FIG. 15, and enables write enable input ENW* of FIFO 1320 at node 1392. Before the next rising edge of read clock CKR at node 1390 is provided to the dock input of D-type flip-flop 1504, the Q output of D-type flip-flop 1504 will still have a high logic level coupled to input D8 of FIFO 1320 at node 1396. The Q output of D-type flip-flop 1504 comprises an intermediate TxSOC control signal. On the rising edge of the CKR at step 714, the intermediate TxSOC comprises a high logic level which will be written into input D8 of FIFO 1320 along with the first byte of cell data on inputs D0–D7. After the rising clock edge of CKR, the Q output of D-type flip-flop 1504 will transition to a low logic level causing the Q output of D-type flip-flop 1504 to comprise a low logic level. As a result, the remaining 52 bytes of cell data written into FIFO 1320 for the active cell of data will have a corresponding D8 bit having a low logic level. Therefore, only the first byte of cell data will have D8 comprising a high logic level. At step 716, the first byte of cell data is read from FIFO 1320 on outputs Q0–Q at node 1432, and the regenerated TxSOC is read from FIFO 1320 on output Q8 at node 1430.

Again with reference to FIG. 12, the extender circuit transitions from steady state mode to FIFO state update when FIFO 1320 asserts a particular flag output to valid logic level. The appropriate flag output can be judiciously elected based on the transfer rate of the system components and the ATM layer and the PHY layer. In the embodiment illustrated in FIGS. 13a and 13b, the half-full flag HY* determines the transition between steady state mode and FIFO state update mode. Thus, when FIFO 1320 queues enough cell data to cause the half-full flag HF* to be asserted to a low logic level, control logic 1316 transitions the extender circuit illustrated in FIGS. 13a and 13b from steady state mode to FIFO state update mode 1206.

Figure 18:
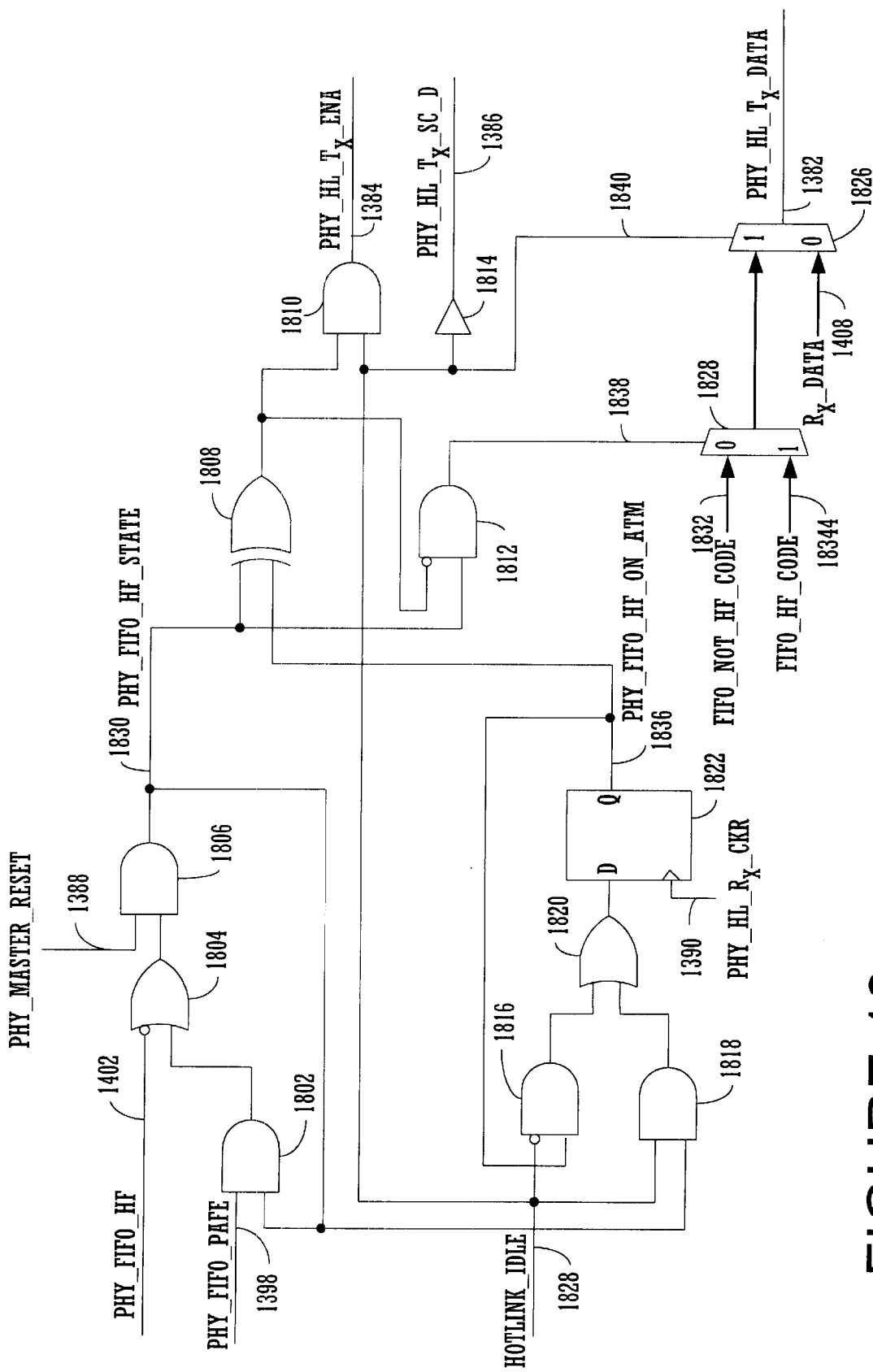
FIG. 18 illustrates one embodiment of the present invention for generating PHY_HL_Tx_ENA, PHY_HL_Tx_SC_D and PHY_HL_Tx_Data of FIG. 13b.

At step 1208, control logic 1316 waits for a cell gap in the transmission of cell data from PHY layer 1304 to ATM layer 1302. A cell gap is generated by control logic 1316 as illustrated in FIG. 20. FIG. 20 will be described in detail below. When a cell gap is detected at step 1210, control logic 1316 provides serializer 1314 with a first control code which is sent in place of the idle character across serial link 1328 to ATM interface 1303. FIG. 18 illustrates one embodiment of the logic employed by control logic 1316 in order to implement step 1210.

FIG. 18 shows a hysteresis circuit comprising AND gates 1802 and 1806 and OR gate 1804. The hysteresis circuit outputs PHY_FIFO_HF_STATE at node 1830 which when asserted to a high logic level indicates that the half-full flag HF* has been asserted by FIFO 1320. PHY_FIFO_HF_STATE also maintains a high logic level when PHY_FIFO_HF_STATE comprises a high logic level and so long as the PHY_FIFO_PAFE remains at a high logic level indicating the hysteresis level for reenabling writes to FIFO 1320 has not yet been reached. The hysteresis circuit performs a hysteresis function by setting PHY_FIFO_HF_STATE to a high logic level when FIFO 1320 fills to the half-full point, and by asserting PHY_FIFO_HF_STATE to a low logic level when FIFO 1320 is read down to the PHY_FIFO_PAFE state. When OR gate 1804 receives PHY_FIFO_HF from FIFO 1320 indicating that the half-full flag HF* has been asserted to a low logic level, OR gate 1804 provides a low logic level to AND gate 1806. With PHY_Master_Reset at node 1388 inactive (high), PHY_FIFO_HF_STATE will comprise a high logic level and be fed back to the input of AND gate 1802. The programmable flag PAFE* of FIFO 1320 can then be used to determine when a sufficient amount of cell data has been read (past the half-full) from FIFO 1320 by PHY layer 1304 in order to send a second control code to ATM interface 1303 and reenable transmission of cell data from ATM layer 1302 to PHY layer 1304. When a sufficient amount of cell data has been read from FIFO 1320, PHY_FIFO_PAFE at node 1398 will be asserted to a low logic level causing PHY_FIFO_HF_STATE to comprise a low logic level.

FIG. 18 further generates PHY_FIFO_HF_On_ATM at node 1836 which indicates whether FIFO 1320 has its half-full flag HF* asserted to low logic level (as known by ATM interface 1303). The circuitry for generating PHY_FIFO_HF_On_ATM comprises AND gates 1816 and 1818, OR gate 1820 and D-type flip-flop 1822. AND gate 1816 receives the inverse of HOTLINK_IDLE at node 1828 and PHY_FIFO_HF_On_ATM at node 1836. AND gate 1818 receives PHY_FIFO_HF_STATE and HOTLINK_IDLE. OR gate 1820 receives the outputs of AND gates 1816 and 1818 and provides an input signal to the D input of D-type flip-flop 1822. D-type flip-flop 1822 further receives PHY_HL_Rx_CKR (TxClk) at node 1390, and outputs PHY_FIFO_HF_On_ATM at node 1836. HOTLINK_IDLE at node 1828 comprises a high logic level when deserializer 1314 is not transmitting valid cell data to ATM interface 1303. D-type flip-flop 1822 will provide a high logic level on PHY_FIFO_HF_On_ATM (indicating HF* is asserted to a low logic level) when PHY_FIFO_HF_STATE and HOTLINK_IDLE comprise a high logic level, or when PHY_FIFO_HF_On_ATM comprised a high logic level and HOTLINK_IDLE comprises a low logic level.

FIG. 18 further includes XNOR gate 1808, AND gate 1812, AND gate 1810, buffer 1814, and 2-to-1 multiplexers 1824 and 1826. XNOR gate 1808 receives PHY_FIFO_HF_STATE at node 1830 and PHY_FIFO_HF_On_ATM at node 1836. AND gate 1812 receives the inverse of the output of XNOR gate 1808 and PHY_FIFO_HF_STATE at node 1830, and provides a select signal for 2-to-1 multiplexer 1824 at node 1838. AND gate 1810 receives the output of XNOR gate 1808 and HOTLINK_IDLE at node 1828 and provides PHY_HL_Tx_ENA at node 1384. Buffer 1814 receives HOTLINK_IDLE at node 1828 and provides PHY_HL_Tx_SC_D at node 1386. 2-to-1 multiplexer 1824 receives FIFO_NOT_HF_Code at node 1832 and, FIFO_HF_Code at node 1834, and selectively provides one of these groups of signals to 2-to-1 multiplexer 1826. FIFO_HF_Code and FIFO_NOT_HF_Code are predefined constants stored in control logic 1316 and also in control logic 1310. 2-to-1 multiplexer 1826 also receives RxData at node 1408 and selectively outputs PHY_HL_Tx_Data in response to a select signal at node 1840 provided by HOTLINK_IDLE. When in the steady state mode, PHY_FIFO_HF_STATE and PHY_FIFO_HF_On_ATM each comprise low logic levels indicating that half-full flag HF* is asserted low on FIFO 1320 and deserializer 1314 is transmitting valid cell data to ATM interface 1303. When HOTLINK_IDLE is low, XNOR gate 1808 and AND gate 1810 will generate a low logic level on PHY_HL_Tx_ENA enabling serializer 1314 and buffer 1814 will provide a low logic level on PHY_HL_Tx_SC_D indicating to serializer 1314 that valid cell is being written into serializer 1314, and 2-to-1 multiplexer 1826 will provide RxData to PHY_HL_Tx_Data at node 1382.

Again with reference to step 1210 described in FIG. 12. When PHY_FIFO_HF is asserted to a low logic level PHY_FIFO_HF_STATE transitions to a high logic level. As a result, XNOR gate 1808 will output a low logic level and AND gate 1810 will provide a low logic level to PHY_HL_Tx_ENA enabling the D0–D7 inputs of serializer 1314. Additionally, buffer 1814 will provide PHY_HL_Tx_SC_D with a high logic level (when HOTLINK_IDLE is high) indicating to serializer 1314 that the data provided to deserializer 1314 is special character data and not cell data. HOTLINK_IDLE further provides a select signal comprising a high logic level at node 1840 to 2-to-1 multiplexer 1826 causing 2-to-1 multiplexer 1826 to provide the output from 2-to-1 multiplexer 1824 to PHY_HL_Tx_Data at node 1382. Additionally, AND gate 1812 will provide a select signal having a high logic level at node 1838 to 2-to-1 multiplexer 1824 causing FIFO_HF_Code at node 1832 to be provided to PHY_HL_Tx_Data at node 1382. FIFO_HF_Code comprises 8-bits of information, such as, HOTLink™ K28.0. It will be appreciated that FIFO_HF_Code may comprise any unique data information of any width predetermined to signify that the half-full flag HF* has been asserted by FIFO 1320. FIFO_HF_Code is sent to serializer 1314, converted to serial data and transmitted to deserializer 1308 via serial link 1328.

Figure 19:
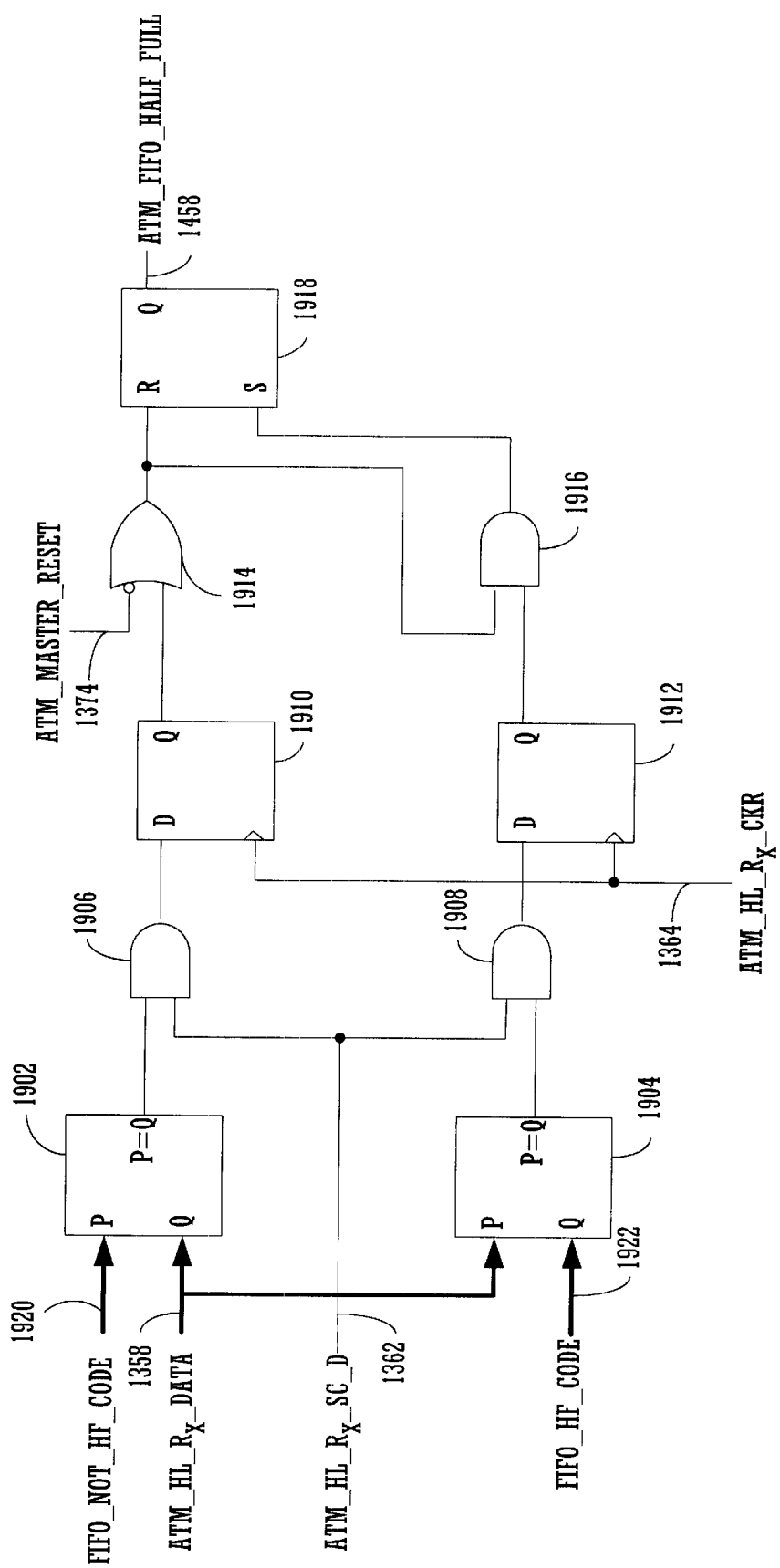

At step 1212, deserializer 1308 receives and decodes serialized FIFO_HF_Code. Deserializer 1308 asserts output SC/D* to a high logic level indicating that the data provided as ATM_HL_Rx_Data comprises the special character FIFO_HF_Code and not valid cell data. Additionally, SC/D* comprising a high logic level will disable the write function of FIFO 1306 thus avoiding writing FIFO_HF_Code into FIFO 1306 and corrupting the cell data. At step 1214, the transmission of cell data from ATM layer 1302 to PHY layer 1304 is disabled by control logic 1310 is response to receiving FIFO_HF_Code from PHY interface 1305. FIG. 19 illustrates one embodiment of control logic 1310 which disables the transmission of cell data from ATM layer 1302 to PHY layer 1304.

FIG. 19 shows comparator 1902 which receives FIFO_NOT_HF_Code at node 1920 on input P, and ATM_HL_Rx_Data from deserializer 1308 at node 1358 on input Q. The output of comparator 1902 is coupled to one input of AND gate 1906. AND gate 1906 also receives ATM_HL_Rx_SC_D at node 1362. D-type flip-flop 1910 has a D input coupled to the output of AND gate 1906, a clock input coupled to ATM_HL_Rx_CKR at node 1364, and has its Q output coupled to one input of OR gate 1914. OR gate 1914 also receives the inverse of ATM_Master_Reset at node 1374 and couples its output to the reset input R of RS flip-flop 1918. The output of RS flip-flop 1918 provides PHY_FIFO_Half_Full at node 1458 which indicates whether the half-full flag HF* has been asserted to a low logic level on FIFO 1320. FIG. 19 also shows comparator 1904 which receives FIFO_HF_Code at node 1922 on input Q, and ATM_HL_Rx_Data from deserializer 1308 at node 1358 on input P. The output of comparator 1904 is coupled to one input of AND gate 1908. AND gate 1908 also receives ATM_HL_Rx_SC_D at node 1362. D-type flip-flop 1912 has a D input coupled to the output of AND gate 1908, a dock input coupled to ATM_HL_Rx_CKR at node 1364, and has its Q output coupled to one input of AND gate 1916. AND gate 1916 also receives the inverse of the output of OR gate 1914 and couples its output to the set input S of RS flip-flop 1918.

When deserializer 1308 provides FIFO_HF_Code as ATM_HL_Rx_Data at node 1358, comparator 1904 outputs a high logic level to AND gate 1908, which causes D-type flip-flop to clock the high logic level to one input of AND gate 1916 on the next rising edge of ATM_HL_Rx_CKR. Given that comparator 1902 will output a low logic level under these circumstances, OR gate 1914 will provide a high logic level to the other input of AND gate 1916. AND gate 1916 will thus provide a high logic level to the set input of RS flip-flop 1918 causing PHY_FIFO_Half_Full to comprise a high logic level. This signal is then utilized by control logic 1310 as illustrated in FIG. 14, to provide TxFull*/TxClav with a low logic level at node 1346. Thus, the transmission of cell data from ATM layer 1302 to PHY layer 1304 will be disabled at the end of the current cell. Transmission of cell data from ATM layer 1302 to PHY layer 1304 will remain disabled so long as the half-full flag HF* is asserted to a low logic level by FIFO 1320.

When PHY layer 1304 has read a sufficient amount of data from FIFO 1320, the appropriate memory flag of FIFO 1320 is deasserted. The appropriate memory flag could comprise the half-full flag HF* of FIFO 1320 asserted to a high logic level indicating FIFO 1320 is less that half full with cell data. The embodiment illustrated in FIG. 18 utilizes the hysteresis function previously described, and uses the programmable flag PAFE* to indicate when control logic 1316 will recognize that the appropriate flag has been deasserted. For example, programmable flag PAFE* may be programmed to comprise a low logic level when FIFO 1320 contains only one cell of data information (53 bytes). Control logic 1316 will then wait for a gap in the transmission of data from PHY layer 1304 to ATM layer 1302 at step 1216. This is indicated by the state of the signal HOTLINK_IDLE which will be described in detail with reference to FIG. 20.

At step 1218, control logic 1316 transmits a second control code to serializer 1314 indicating that a sufficient amount of cell data has been read from FIFO 1320. Serializer 1314, serializes the second control code and serially transmits it to deserializer 1308 via serial link 1328. One embodiment of the control logic for providing the second control code to serializer 1314 is illustrated in FIG. 18. When a sufficient amount of cell data has been read from FIFO 1320, PHY_FIFO_HF comprises a high logic level, PHY_FIFO_PAFE comprise a low logic level, and PHY_FIFO_HF_STATE comprises low logic level. When a cell gap has been detected by control logic 1316, HOTLINK_IDLE is set to a high logic level, thus causing XNOR gate 1808 and AND gate 1810 will provide a low logic level to PHY_HL_Tx_ENA at node 1384. HOTLINK_IDLE will provide PHY_HL_Tx_SC_D with a high logic level via buffer 1814 and will cause the select signal at node 1840 to enable 2-to-1 multiplexer 1826 to provide the output of 2-to-1 multiplexer 1824 to PHY_HL_Tx_Data at node 1382. Additionally, AND gate 1812 will provide a select signal having a low logic level at node 1838 to 2-to-1 multiplexer 1824 causing FIFO_NOT_HF_Code at node 1832 to be provided to PHY_HL_Tx_Data at node 1382. FIFO_NOT_HF_Code comprises 8-bits of information, such as HOTLink™ K28.2. It will be appreciated that FIFO_NOT_HF_Code may comprise any unique data information of any width predetermined to signify that a sufficient amount of data has been read from FIFO 1320. FIFO_NOT_HF_Code is sent to serializer 1314, converted to serial data and transmitted to deserializer 1308 via serial link 1328.

At step 1220, deserializer 1308 receives and decodes serialized FIFO_NOT_HF_Code. Deserializer 1308 asserts output SC/D* to a high logic level indicating that the data provided as ATM_HL_Rx_Data comprises the special character FIFO_NOT_HF_Code and not valid cell data. Additionally, SC/D* comprising a high logic level will disable the write function of FIFO 1306 thus avoiding writing FIFO_NOT_HF_Code into FIFO 1306 and corrupting the cell data. At step 1222, the transmission of cell data from ATM layer 1302 to PHY layer 1304 is enabled by control logic 1310 is response to receiving FIFO_NOT_HF_Code from PHY interface 1305 as illustrated in one embodiment of control logic 1310 in FIG. 19. When deserializer 1308 provides FIFO_NOT_HF_Code as ATM_HL_Rx_Data at node 1358, comparator 1902 outputs a high logic level to AND gate 1906, which causes D-type flip-flop 1910 to dock the high logic level to one input of OR gate 1914 on the next rising edge of ATM_HL_Rx_CKR. Given that ATM_Master_Reset will be inactive at this time (high), OR gate 1914 will provide a high logic level to the reset input of RS flip-flop 1918 causing PHY_FIFO_Half_Full to comprise a low logic level. This signal is then utilized by control logic 1310 as illustrated in FIG. 14, to provide TxFull*/TxClav with a high logic level at node 1346. Thus, the transmission of cell data from ATM layer 1302 to PHY layer 1304 will be enabled.

The operation of FIGS. 13a and 13b will now be described for transmitting a cell of data in CLH mode from PHY layer 1304 to ATM layer 1302 in reference to FIG. 12 and FIG. 5. At step 1202 of FIG. 12, the extender circuit comprising ATM interface 1302, PHY interface 1304 and serial links 1328 and 1330 receives power or a reset function applied from ATM_Master_Reset at node 1374 and/or PHY_Master_Reset at node 1388. Both ATM_Master_Reset and PHY_Master_Reset are active low signals. At step 1204, the extender circuit enters the steady state mode of operation, and will stay there so long as a memory flag is not asserted to a valid state by FIFO 1306. The steady state mode of operation will now be described with reference to FIG. 5 with step 502 already completed. At step 504, parallel cell data (RxData) becomes available at PHY layer 1304 to be sent to ATM layer 1302. At step 506, PHY layer 1304 asserts RxEmpty*/RxClav to a high logic level which is provided to control logic 1316 at node 1420. At step 508, control logic 1316 asserts RxEnb* at node 1410 to a low logic level indicating that PHY layer 1304 may provide RxData at node 1408 to control logic 1316. FIG. 20 illustrates a state diagram of one embodiment for generating the appropriate logical state on RxEnb* at node 1410, as well as, generating a cell gap between cells of data.

FIG. 20 shows a state diagram 2000 comprising four states, namely: WAIT_HERE 2002, START_DELAY 2004, CELL_GAP 2006 and COUNT 2008. State diagram 2000 generates RxEnb* at node 1410 and HOTLINK_IDLE. As previously described, HOTLINK_IDLE comprises a high logic level when serializer 1314 is not transmitting valid cell data, and a low logic level when serializer 1314 is transmitting valid cell data. Additionally, control logic 1316 maintains an internal counter which is used to establish the length of the packet of cell data sent from PHY layer 1304, and to assure that there are a sufficient number of clock cycles in between cells to generate the cell gap.

The operation of state diagram 2000 is as follows. When cell data is not being transmitted, nor is available to transmit (RxEmpty*/RxClav at node 1420 comprising a low logic level), from PHY layer 1304 to ATM layer 1302, control logic 1316 is in WAIT_HERE state 2002. In WAIT_HERE state 2002, control logic 1316 provides a high logic level to RxEnb* at node 1410 and sets HOTLINK_IDLE to a high logic level. The internal counter is also initialized or set to zero in WAIT_HERE state 2002. Condition 2010 indicates that so long as RxEmpty*/RxClav at node 1420 remains at a low logic level, ATM_Master_Reset at node 1388 comprises a low logic level (active), or ATM_FIFO_Half_Full comprises a high logic level, then control logic 1316 will remain in WAIT_HERE state 2002. ATM_FIFO_Half_Full indicates if FIFO 1306 has asserted its half-full flag HF* at node 1352. Therefore, if FIFO 1306 has asserted HF* at node 1352 indicating that PHY layer 1304 should not send cell data to ATM layer 1302, control logic 1316 will remain in WAIT_HERE state 2002 even if a. cell of data becomes available at PHY layer 1304. ATM_FIFO_Half_Full will be described in greater detail with reference to FIG. 26. The description of conditions 2012 through 2036 will assume that ATM_FIFO_Half_Full comprises a low logic level (FIFO 1306 not half full) and that ATM_$_{Master}$_Reset comprises a high logic level (inactive).

As indicated by condition 2014, when RxEmpty*/RxClav at node 1420 indicates that a cell of data is available to be sent to ATM layer 1302, state machine 2000 will transition to START_DELAY state 2004 so long as at least one clock cycle has occurred since RxEnb* has been asserted. This is due to the UTOPIA specification which requires that after RxEnb* has been received by PHY layer 1304, RxData and RxSOC may be asserted on the next clock cycle. In START_DELAY state 2004, control logic 1316 sets RxEnb* to a low logic level at node 1410 and sets HOTLINK_IDLE to a high logic level. Condition 2026 indicates that control logic 1316 will remain in START_DELAY state 2004 until one dock cycle has occurred since RxEnb* has been driven to a low logic level. If ATM_Master_Reset becomes active while control logic 1316 is in START_DELAY state 2004, control logic 1316 will transition back to WAIT_HERE state 2002 as indicated by condition 2016.

When one clock cycle has occurred since RxEnb* has been asserted to a low logic level, control logic 1316 transitions to COUNT state 2008 as indicated by condition 2008. In COUNT state 2008, RxEnb* at node 1410 remains at a low logic level and HOTLINK_IDLE is set to a low logic level. Cell data is now transferred from PHY layer 1304 to serializer 1314. The internal counter will count the number of bytes sent in the cell packet. As indicated by condition 2036, control logic 1316 will remain in COUNT state 2008 so long as the internal counter has not reached the predetermined packet size of the cell data (i.e. 53 bytes). If ATM_Master_Reset becomes active while control logic 1316 is in COUNT state 2008, control logic 1316 will transition back to WAIT_HERE state 2002 as indicated by condition 2022.

When the internal counter counts up to the packet size of the cell packet, control logic 1316 will transition to CELL_GAP state 2006 as indicated by condition 2032. CELL_GAP state 2032 forces a cell gap in between cells of data. The cell gap is utilized, as previously described to regenerate RxSOC at ATM layer and to pass control codes from PHY layer 1304 to ATM layer 1302. CELL_GAP state 2006 sets RxEnb* at node 1410 to a high logic level and HOTLINK_IDLE to a high logic level, thus not allowing transmission of cell data to ATM layer 1302. CELL_GAP state 2006 forces a cell gap for a predetermined number of clock cycles. Control logic 1316 forces a cell gap of only two clock cycles, however, the cell gap may comprise any number of clock cycles. Control logic 1316 will remain in CELL_GAP state 2006 for the duration of the cell gap as indicated by condition 2034. Once the appropriate cell gap has been generated, control logic 1316 will transition to START_DELAY state 2004 at condition 2024 if RxEmpty*/RxClav at node 1420 remains in a high logic state indicating that PHY layer has another cell of data to transmit to ATM layer 1302. If, however, PHY layer 1304 does not have another cell of data to transmit to ATM layer 1302 (indicated by RxEmpty*/RxClav at node 1420 comprising a low logic level) then control logic 1316 will transition WAIT_HERE state 2002 as indicated by condition 2020.

With reference again to FIG. 5, after RxEnb* has been driven to a low logic level at node 1410 by control logic 1316, at step 510 PHY layer 1304 provides to control logic 1316 parallel cell data (RxData) at node 1408 and RxSOC at node 1422. RxSOC comprises a high logic level together with the first byte of cell data only. RxSOC is not processed by PHY interface 1305. The parallel cell data on RxData at node 1408 is passed by control logic 1316 to serializer 1314 at node 1382 as PHY_HL_Tx_Data. Control logic 1316 also provides serializer 1314 with the appropriate states on PHY_HL_Tx_ENA and PHY_HL_Tx_SC_D as previously described with reference to FIG. 18. That is, with PHY_FIFO_HF_STATE comprising a low logic level, HOTLINK_IDLE comprising a low logic level and PHY_FIFO_HF_On_ATM comprising a low logic level, PHY_HL_Tx_ENA comprises a low logic level, PHY_HL_Tx_SC_D comprises a low logic level and RxData at node 1408 is provided to PHY_HL_Tx_Data at node 1382. At step 512, serializer 1314 converts the parallel cell data into a serial stream of data. At step 514, serializer 1314 transmits the serial stream of data to deserializer 1308 via serial link 1328. The control signals RxSOC, RxEnb*, and RxEmpty*/RxClav are not serialized and transmitted between PHY interface 1305 and ATM interface 1303.

Figure 21:
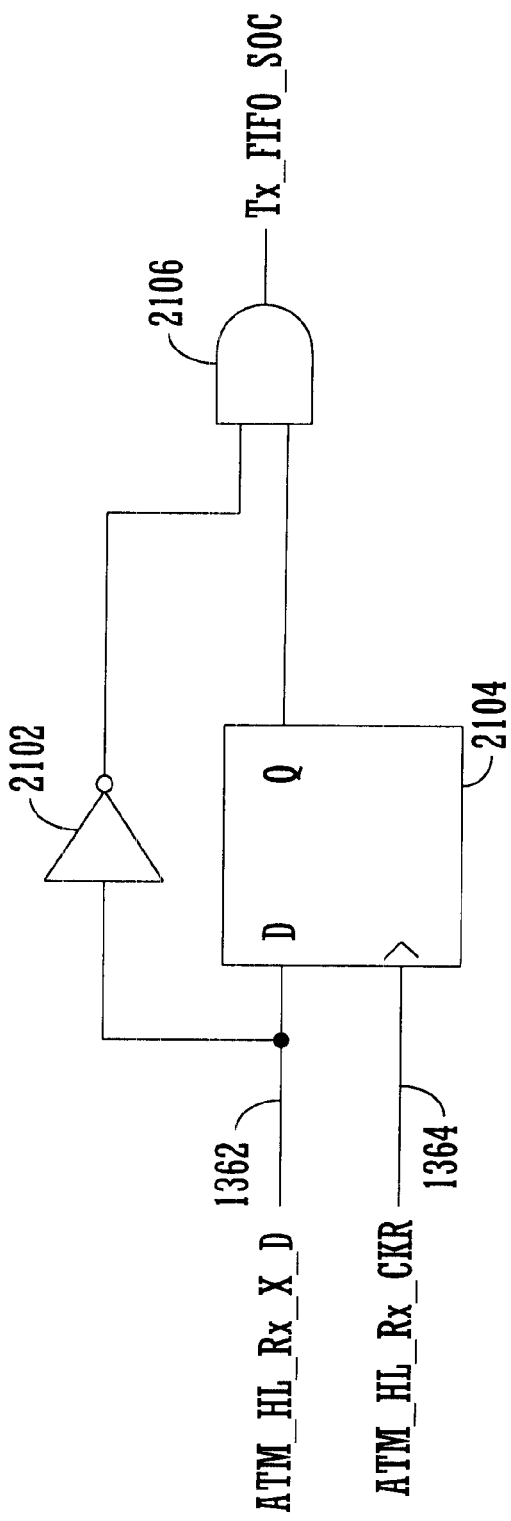

At step 516, deserializer 1308 converts the serial stream of data back into a parallel format. At step 518, the receive start of cell signal is regenerated by deserializer 1308, FIFO 1306 and control logic 1310. FIG. 21 illustrates one embodiment of the control logic employed by control logic 1310, together with deserializer 1308 and FIFO 1306 to regenerate RxSOC at ATM layer 1304. FIG. 21 shows a D-type flip-flop 2104 having its D input coupled to ATM_HL_Rx_SC_D at node 1362, its cock input coupled to ATM_HL_Rx_CKR at node 1364, and its Q output coupled to Tx_FIFO_SOC at node 1360. It will be appreciated that D-type flip-flop 2104 corresponds to and functions in accordance with D-type flip-flop 924 described in FIG. 9. The regeneration of RxSOC at node 1342 will be described with reference to FIG. 10 below.

Figure 22:
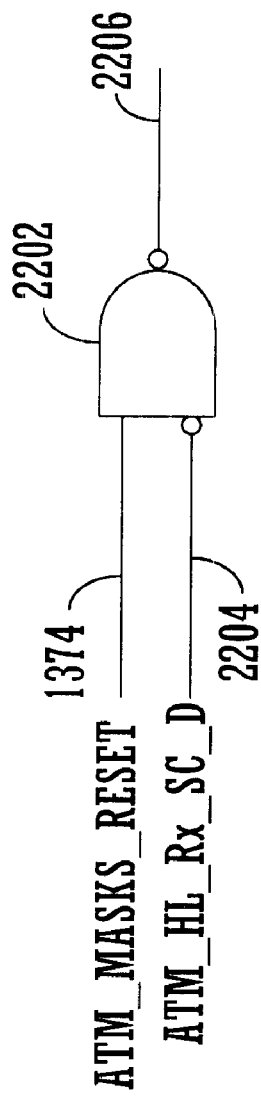

At step 520, the regenerated parallel cell data is output from deserializer 1308 as ATM_HL_Rx_Data at node 1358 and provided to inputs D0–D7 of FIFO 1306. Output ATM_HL_Rx_CKR at node 1364 is coupled to the write clock input CKW of FIFO 1306 and clocks the parallel data into FIFO 1306. Output SC/D* of deserializer 1308 drives a low logic level onto node 1362 enabling write enable input ENW* of FIFO 1306. Alternatively, output SC/D* may couple a low logic level to write enable input ENW* as illustrated in FIG. 22. FIG. 22 shows NAND gate 2202 receiving ATM_Master_Reset at node 1374, and receiving the inverse of ATM_HL_Rx_SC_D at node 2204. The output of NAND gate 2202 is provided to the write enable input ENW* of FIFO 1306. Write enable input ENW* will be driven low when ATM_Master_Reset is inactive (high) and ATM_HL_Rx_SC_D comprises a low logic level. At step 520 the parallel data is queued into FIFO 1306 until ATM layer 1302 is ready to accept it.

Figure 23:
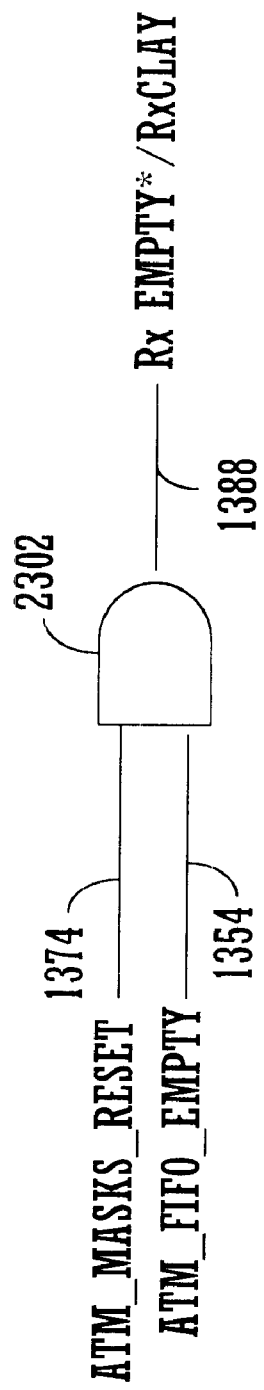

At step 522, control logic 1310 regenerates RxEmpty*/RxClav at node 1338. As previously described, PHY layer 1304 asserts RxEmpty*/RxClav at node 1420 when it has a cell of data to transmit to ATM layer 1302. Control logic 1310 regenerates the high logic level on RxEmpty*/RxClav at node 1338 with the aide of FIFO 1306. FIG. 23 illustrates one embodiment of control logic 1310 which regenerates RxEmpty*/RxClav at node 1338. FIG. 23 shows AND gate 2302 receiving ATM_Master_Reset at node 1374 and ATM_FIFO_Empty at node 1354. The output of AND gate 2302 is provided at node 1338 as RxEmpty*/RxClav. RxEmpty*/RxClav will be driven to a high logic level when ATM_Master_Reset is inactive (high) and ATM_FIFO_Empty comprises a high logic level indicating that FIFO 1306 has cell data to be read by ATM layer 1302. It will be appreciated that an alternative embodiment of FIG. 23 comprises ATM_FIFO_Empty at node 1354 coupled directly to RxEmpty*/RxClav at node 1338.

Figure 24:
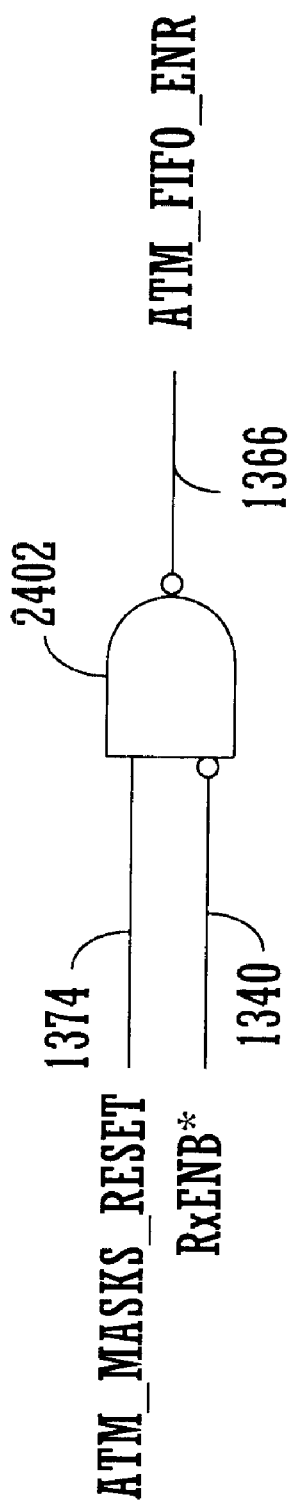

When ATM layer 1302 is ready to read the parallel cell data stored in FIFO 1306, ATM layer 1302 asserts RxEnb* at node 1340 to a low logic level. Control logic 1310 receives RxEnb* at node 1340 and generates ATM_FIFO_ENR at node 1366 which comprises the read enable input for FIFO 1306. FIG. 24 illustrates one embodiment of control logic 1310 which generates ATM_FIFO_ENR at node 1366. FIG. 24 shows NAND gate 2402 receiving ATM_Master_Reset at node 1374 and RxEnb* at node 1340. The output of NAND gate 2402 is provided as ATM_FIFO_ENR at node 1366. ATM_FIFO_ENR at node 1366 will comprise a low logic level enabling cell data to be read from FIFO 1306 when ATM_Master_Reset is inactive and RxEnb* comprises a low logic level. At step 524, cell data and regenerated RxSOC may then be output from FIFO 1306 at nodes 1332 and 1334, respectively. One byte of cell data is read from FIFO 1306 on each dock pulse of RxClk at node 1336 coupled to read dock input CKR of FIFO 1306.

Deserializer 1308 operates in conjunction with control logic 1310 and FIFO 1306 to regenerate RxSOC and provide the regenerated RxSOC to ATM layer 1302 together with the first byte of cell data output from FIFO 1306. The regeneration of RxSOC by ATM interface 1303 will be described with reference to FIG. 10.

At step 1002 of FIG. 10, and prior to receiving the serial stream of cell data, deserializer 1308 receives the idle characters being transmitted from serializer 1314. In response to receiving the idle characters at step 1004, deserializer 1308 outputs a high logic level on SC/D* at node 1362 to indicate that an idle character has been received and is being output on outputs Q0–Q7 at node 1358. Given that SC/D* is coupled to the write enable ENW* of FIFO 1306, FIFO 1306 is disabled so that the idle characters will not be written into FIFO 1306. At step 1006, PHY layer 1304 indicates that it has a cell of data to send and asserts RxSOC to a high logic level coincident only with the first byte of cell data. RxSOC is not processed by PHY interface 1305. The cell data is serialized by serializer 1314 and sent to deserializer 1308 via serial link 1328 as described above. At step 1008, deserializer 1308 detects that the idle characters are no longer being transmitted by serializer 1314. At step 1010, deserializer 1308 causes output SC/D* to transition to a low logic level during the same clock cycle that the first byte of cell data is provided at outputs Q0–Q7 at node 1358. Therefore, deserializer 1308 transitions SC/D* from high logic level to a low logic level when it detects its receipt of valid cell data following idle characters.

At step 1012, the low logic level on SC/D* is provided to the D-input of D-type flip-flop 2104 illustrated in FIG. 21, and enables write enable input ENW* of FIFO 1306 at node 1362. Before the next rising edge of read clock CKR at node 1364 is provided to the clock input of D-type flip-flop 2104, the Q output of D-type flip-flop 2104 outputs a high logic level to input D8 of FIFO 1306 at node 2106 (also node 1360). The Q output of D-type flip-flop 2104 comprises an intermediate RxSOC control signal. On the rising edge of the CKR at step 1014, the intermediate RxSOC comprises a high logic level which will be written into input D8 of FIFO 1306 along with the first byte of cell data on inputs D0–D7. After the rising dock edge of CKR, the Q output of D-type flip-flop 2104 will transition to a low logic level causing intermediate RxSOC to comprise a low logic level. As a result, the remaining 52 bytes of cell data written into FIFO 1306 for the active cell of data will have a corresponding D8 bit having a low logic level. Therefore, only the first byte of cell data will have D8 comprising a high logic level. At step 1016, the first byte of cell data is read from FIFO 1306 on outputs Q0–Q7 at node 1332, and the regenerated RxSOC is read from FIFO 1306 on output Q8 at node 1334.

Again with reference to FIG. 12, the extender circuit transitions from steady state mode to FIFO state update mode when FIFO 1306 asserts a particular flag output to a valid logic level. The appropriate flag output can be judiciously elected based on the transfer rate of the system components and the ATM layer and the PHY layer. In the embodiment illustrated in FIGS. 13a and 13b, the half-full flag HF* determines the transition between steady state mode and FIFO state update mode. Thus, when FIFO 1306 queues enough cell data to cause the half-full flag HF* to be asserted to a low logic level, control logic 1310 transitions the extender circuit illustrated in FIGS. 13a and 13b from steady state mode to FIFO state update mode 1206.

Figure 25:
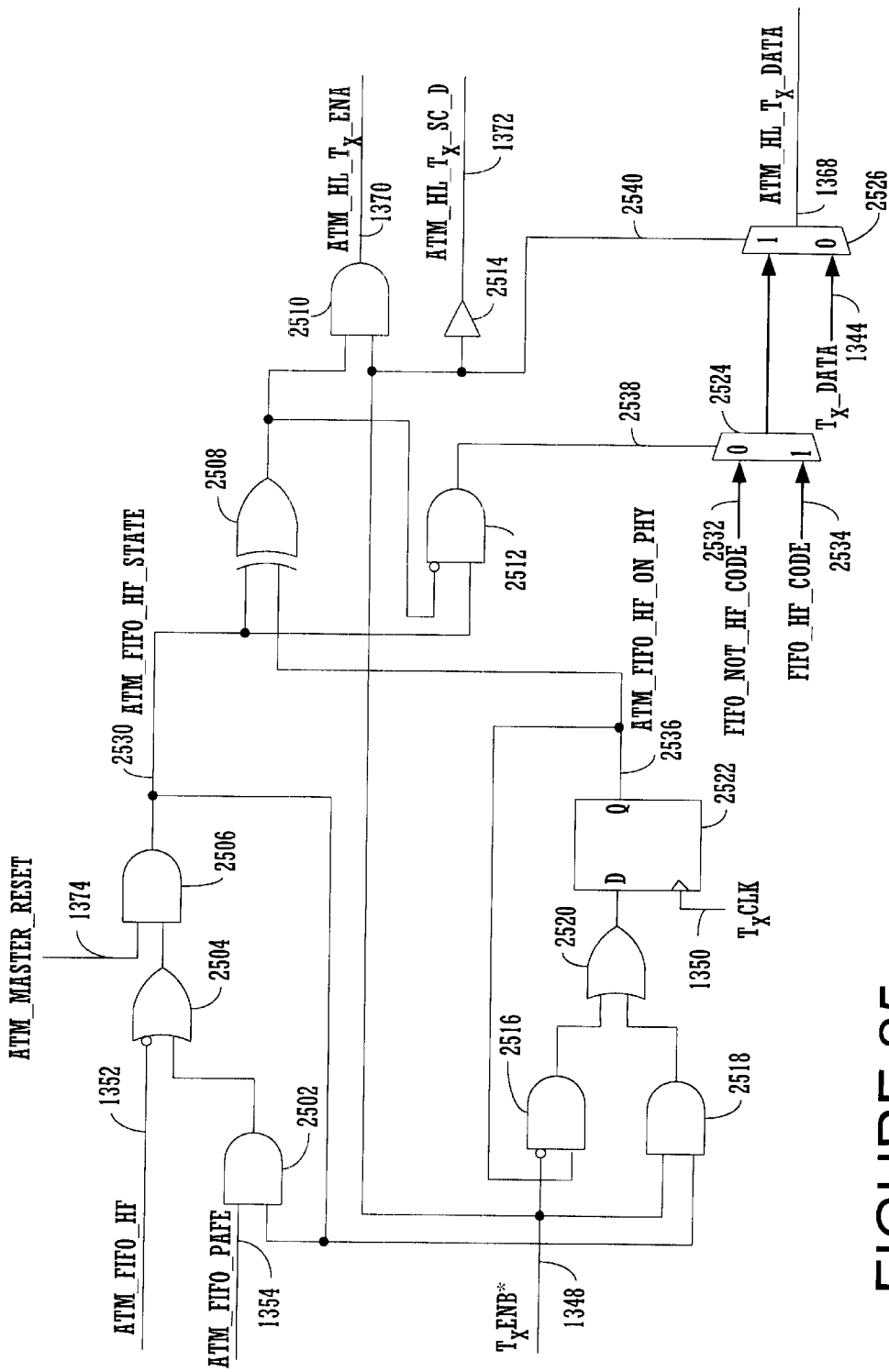

At step 1208, control logic 1310 waits for a cell gap in the transmission of cell data from ATM layer 1302 to PHY layer 1304. A cell gap is generated by control logic 1310 as illustrated in FIG. 14. When a cell gap is detected at step 1210, control logic 1310 provides serializer 1312 with a first control code which is sent in place of the idle character across serial link 1330 to PHY interface 1305. FIG. 25 illustrates one embodiment of the logic employed by control logic 1310 in order to implement step 1210.

FIG. 25 shows AND gate 2502, OR gate 2504, AND gate 2506, AND gate 2516, AND gate 2518, OR gate 2520, D-type flip-flop 2522, XNOR gate 2508, AND gate 2510, AND gate 2512, buffer 2514, and 2-to-1 multiplexers 2524 and 2526. These components are coupled in a analogous manner and operate in a analogous fashion as the like components describe in FIG. 18. Additionally, FIG. 25 further generates ATM_FIFO_HF_STATE at node 2530 and ATM_FIFO_HF_On_PHY at node 2536 which are analogous to PHY_FIFO_HF_STATE and PHY_FIFO_HF_On_ATM illustrated in FIG. 18. It will be appreciated that the control logic embodiment of FIG. 25 further provides ATM_HL_Tx_ENA, ATM_HL_Tx_SC_D and ATM_HL_Tx_Data to serializer 1312 in an analogous fashion that PHY_HL_Tx_ENA, PHY_HL_Tx_SC_D and PHY_HL_Tx_Data were provided to serializer 1314 by the control logic of FIG. 18. The control logic of FIG. 25 does not include the HOTLINK_IDLE a signal as in FIG. 18, rather, TxEnb* at node 1348 may be utilized in an analogous manner.

The control logic illustrated in FIG. 25 generates a control code on ATM_HL_Tx_Data node 1368 as follows. When ATM_FIFO_HF is asserted to a low logic level ATM_FIFO_HF_STATE transitions to a high logic level and TxEnb* comprises a high logic level. NOR gate 2508 and AND gate 2510 will provide a high logic level to ATM_HL_Tx_ENA enabling the D0–D7 inputs of serializer 1312, and buffer 1814 provides ATM_HL_Tx_SC_D with a high logic level indicating to serializer 1312 that the data provided to serializer 1312 is special character data and not cell data. On the next rising edge of TxClk, ATM_FIFO_HF_On_PHY comprises ATM_FIFO_HF_STATE. TxEnb* further provides a select signal comprising a high logic level at node 2540 to 2-to-1 multiplexer 2526 causing 2-to-1 multiplexer 2526 to provide the output from 2-to-1 multiplexer 2524 to ATM_HL_Tx_Data at node 1368. Additionally, AND gate 2512 will provide a select signal having a high logic level at node 2538 to 2-to-1 multiplexer 2524 causing FIFO_HF_Code at node 2534 to be provided to ATM_HL_Tx_Data at node 1368. FIFO_HF_Code comprises 8-bits of information, such as, HOTLink™ K28.0. It will be appreciated that FIFO_HF_Code may comprise any unique data information of any width predetermined to signify that the half-full flag HF* has been asserted by FIFO 1320. FIFO_HF_Code is sent to serializer 1312, converted to serial data and transmitted to deserializer 1318 via serial link 1330.

Figure 26:
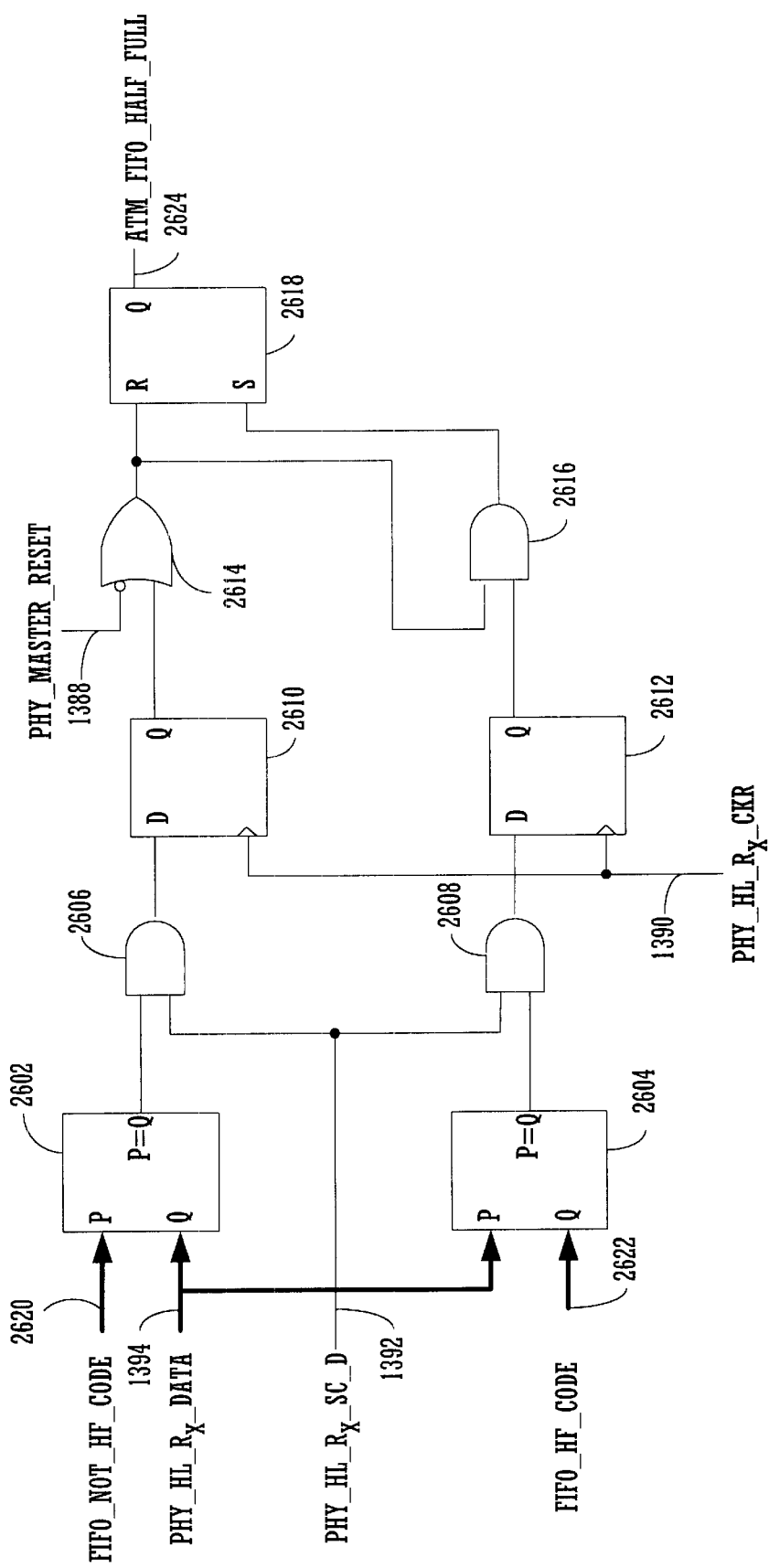
FIG. 26 illustrates one embodiment of the present invention for generating ATM_FIFO_Half_Full of FIG. 13b.

At step 1212, deserializer 1318 receives and decodes serialized FIFO_HF_Code. Deserializer 1318 asserts output SC/D* to a high logic level indicating that the data provided as PHY_HL_Rx_Data comprises the special character FIFO_HF_Code and not valid cell data. Additionally, SC/D* comprising a high logic level will disable the write function of FIFO 1320 thus avoiding writing FIFO_HF_Code into FIFO 1320 and corrupting the cell data. At step 1214, the transmission of cell data from PHY layer 1304 to ATM layer 1302 is disabled by control logic 1316 is response to receiving FIFO_HF_Code from ATM interface 1303. FIG. 26 illustrates one embodiment of control logic 1316 which disables the transmission of cell data from PHY layer 1304 to ATM layer 1302. FIG. 26 shows comparator 2602, comparator 2604, AND gate 2606, AND gate 2608, D-type flip-flop 2610, D-type flip-flop 2612, OR gate 2614, AND gate 2616 and RS flip-flop 2618. These components are coupled in an analogous manner and operate in a analogous fashion as like components described in FIG. 19. Additionally, FIG. 26 further generates ATM_FIFO_Half_Full at node 2618 which is analogous to PHY_FIFO_Half_Full illustrated in FIG. 19, and which indicates whether the half-full flag HF* has been asserted by FIFO 1320.

When deserializer 1318 provides FIFO_HF_Code as PHY_HL_Rx_Data at node 2622, comparator 2604 outputs a high logic level to AND gate 2608, which causes D-type flip-flop 2612 to clock the high logic level to one input of AND gate 2616 on the next rising edge of PHY_HL_Rx_CKR. Given that comparator 2602 will output a low logic level under these circumstances, OR gate 2614 will provide a high logic level to the other input of AND gate 2616. AND gate 2616 will thus provides a high logic level to the S input of RS flip-flop 2618 causing ATM_FIFO_Half_Full to comprise a high logic level. This signal is then utilized by control logic 1316, as illustrated in FIG. 20, to provide RxEnb* with a high logic level at node 1410. Thus, the transmission of cell data from PHY layer 1304 to ATM layer 1302 will be disabled. Transmission of cell data from PHY layer 1304 to ATM layer 1302 will remain disabled so long as the half-full flag HF* is asserted to a low logic level by FIFO 1306.

When ATM layer 1302 has read a sufficient amount of data from FIFO 1306, the appropriate memory flag of FIFO 1306 is deasserted. The appropriate memory flag could comprise the half-full flag HF* of FIFO 1306 asserted to a high logic level indicating FIFO 1306 is less than half full with cell data. The embodiment illustrated in FIG. 25 utilizes the hysteresis function previously described, and uses the programmable flag PAFE* to indicate when control logic 1310 will recognize that the appropriate flag has been deasserted. For example, programmable flag PAFE* may be programmed to comprise a low logic level when FIFO 1306 contains only one cell of data information (53 bytes). Control logic 1310 will then wait for a gap in the transmission of data from ATM layer 1302 to PHY layer 1304 at step 1216.

At step 1218, control logic 1310 transmits a second control code to serializer 1312 indicating that a sufficient amount of cell data has been read from FIFO 1306. Serializer 1312, serializes the second control code and serially transmits it to deserializer 1318 via serial link 1330. One embodiment of the control logic for providing the second control code to serializer 1312 is illustrated in FIG. 25. When a sufficient amount of cell data has been read from FIFO 1306, ATM_FIFO_HF comprises a high logic level, ATM_FIFO_PAFE comprise a low logic level, and ATM_FIFO_HF_STATE comprises low logic level. When a complete cell has finished transmitting, TxEnb* is set to a high logic level. XNOR gate 2508 and AND gate 2510 will provide a low logic level to ATM_HL_Tx_ENA at node 1370. TxEnb* will provide ATM_HL_Tx_SC_D with a high logic level via buffer 2514 and will cause the select signal at node 2540 to enable 2-to-1 multiplexer 2526 to provide the output of 2-to-1 multiplexer 2524 to ATM_HL_Tx_Data at node 1368. Additionally, AND gate 2512 will provide a select signal having a low logic level at node 2538 to 2-to-1 multiplexer 2524 causing FIFO_NOT_HF_Code at node 2532 to be provided to ATM_HL_Tx_Data at node 1368. FIFO_NOT_HF_Code comprises 8-bits of information, such as, HOTLink™ K28.2. It will be appreciated that FIFO_NOT_HF_Code may comprise any unique data information of any width predetermined to signify that a sufficient amount of data has been read from FIFO 1306. FIFO_NOT_HF_Code is sent to serializer 1312, converted to serial data and transmitted to deserializer 1318 via serial link 1330.

At step 1220, deserializer 1318 receives and decodes serialized FIFO_NOT_HF_Code. Deserializer 1318 asserts output SC/D* to a high logic level indicating that the data provided as PHY_HL_Rx_Data comprises the special character FIFO_NOT_HF_Code and not valid cell data. Additionally, SC/D* comprising a high logic level will disable the write function of FIFO 1320 thus avoiding writing FIFO_NOT_HF_Code into FIFO 1320 and corrupting the cell data. At step 1222, the transmission of cell data from PHY layer 1304 to ATM layer 1302 is enabled by control logic 1316 is response to receiving FIFO_NOT_HF_Code from ATM interface 1303 as illustrated in one embodiment of control logic 1316 in FIG. 26. When deserializer 1318 provides FIFO_NOT_HF_Code as PHY_HL_Rx_Data at node 1394, comparator 2602 outputs a high logic level to AND gate 2606, which causes D-type flip-flop 2610 to clock the high logic level to one input of OR gate 2614 on the next rising edge of PHY_HL_Rx_CKR. Given that PHY_Master_Reset will be inactive at this time (high), OR gate 2614 will provide a high logic level to the reset input of RS flip-flop 2618 causing ATM_FIFO_Half_Full to comprise a low logic level. This signal is then utilized by control logic 1316 as illustrated in FIG. 20, to allow RxEnb* to transition to a low logic level if data is available at node 1410. Thus, the transmission of cell data from PHY layer 1304 to ATM layer 1302 will be enabled.

Figure 27:
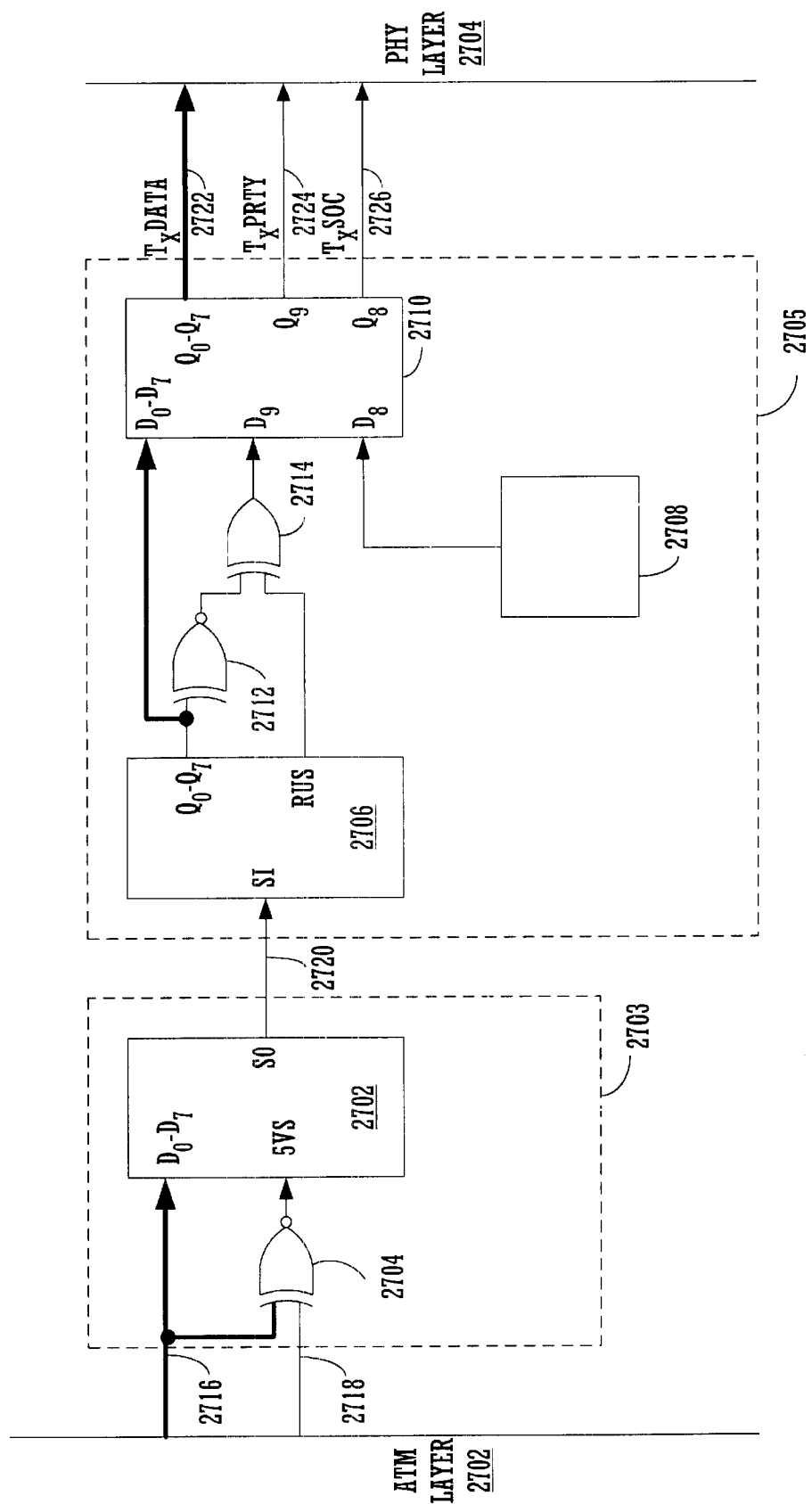
FIG. 27 illustrates one embodiment of the present invention for regenerating the parity signal TxPrty at a PHY layer.

The previous embodiments of the present invention described in FIGS. 2–26 may also incorporate the UTOPIA optional signals TxPrty, TxRef*, RxPrty and RxRef*. TxRef* and RxRef* are reference signals provided to the PHY layer and ATM layer respectively, and are utilized for synchronization purposes. They may be incorporated into the present invention by providing any means for providing synchronization, including providing 8 kHz oscillators in the extender circuits described above. Additionally, the optional parity signals TxPrty and RxPrty may be incorporated into the embodiment of the present invention described above. A simplified embodiment of providing TxPrty from an ATM layer and regenerating the TxPrty signal at the PHY layer in accordance with the present invention is illustrated in FIG. 27. RxPrty may also be implemented in an analogous embodiment.

FIG. 27 shows an extender circuit comprising ATM interface 2703, PHY interface 2705 and serial link 2720. The extender circuit provides a serial communication link between ATM layer 2702 and PHY layer 2704. Only the signals required to receive the parity signal TxPrty at ATM interface 2703 and regenerate TxPrty at PHY layer 207 are shown in order not to obscure the operation of the embodiment of FIG. 27. ATM interface 2703 includes XNOR gate 2704 and serializer 2702 having data inputs D0–D7 and send violation symbol input SVS. Serializer 2702 may comprise a HOTLink™ Transmitter. PHY interface 2705 includes deserializer 2706 having outputs Q0–Q7 and received violation symbol output RVS, FIFO 2710, control logic 2708, XNOR gate 2712, XOR gate 2714, and AND gate 2728. Control logic 2708 generates TxSOC at input D8 of FIFO 2710 as previously illustrated in FIGS. 6 and 7. NOR gate 2712 receives the data output from outputs Q0–Q7 and has its output coupled to one input of XOR gate 2714. XOR gate 2714 has its other input coupled to RVS and its output coupled to the D9 input of FIFO 2710. Inputs D0–D7 of FIFO 2710 receive data output from deserializer 2706. The write enable input ENW* of FIFO 2710 is coupled to the output of AND gate 2728. One input of AND gate 2728 is coupled to SC/D* of deserializer 2706, and the other input of AND gate 2728 is coupled to the inverse of RVS of deserializer 2706. FIFO 2710 outputs TxData at node 2722 from outputs Q0–Q7, the regenerated TxPrty at node 2724 from output Q9, and the regenerated TxSOC from output Q8.

ATM layer 2702 provides TxData at node 2716 to data inputs DO D7 and to the input of NOR gate 2704. ATM layer 2702 also provides TxPrty to the input of XNOR gate 2704. The output of XNOR gate 2704 is coupled to SVS of serializer 2702. The UTOPIA specification requires that TxPrty (and RxPrty) comprise the odd parity bit over TxData, therefore NOR gate 2704 functions as a parity checker in which the output of XNOR gate comprises the XNOR or each of the bits of TxData and TxPrty. When the output of XNOR gate 2704 comprises a high logic level indicating a parity error, the SVS input is driven high causing serializer 2702 to transmit a violation symbol on output SO instead of valid cell data. Deserializer 2706 receives the violation symbol on input SI, decodes the violation symbol, and outputs a high logic level on RVS indicating that a violation symbol has been received at that the data output of Q0–Q7 of deserializer 2706 is corrupted. NOR gate 2712 and XOR gate 2714 comprise an odd parity generate circuit which will generate a high logic level to input D9 of FIFO 2710 when RVS is high. Thus, when the corrupted data is read from FIFO 2710 by PHY layer 2704 at node 2722, the regenerated TxPrty will be read at the same time and provided at node 2724.

Although the present invention has been described in terms of specific embodiments, it will be appreciated that various modifications and alterations might be made by those skilled in the art without departing from the spirit and scope of the invention. The invention should therefore be measured in terms of the claims which follow.

What is claimed is:

1. A communication system comprising:
   an asynchronous transfer mode (ATM) layer;
   a physical (PHY) layer; and
   an extender circuit coupled to the ATM layer and the PHY layer, the extender circuit providing a serial communication interface between the ATM layer and the PHY layer, the extender circuit emulating an ATM layer interface at the PHY layer and a PHY layer interface at the ATM layer, wherein the extender circuit communicates in parallel with the ATM layer and with the PHY layer.

2. The communication system of claim 1, wherein the extender circuit comprises:
   a first circuit coupled to the ATM layer and communicating in parallel with the ATM layer; and
   a second circuit coupled to the PHY layer and communicating in parallel with the PHY layer, the second circuit coupled serially with the first circuit.

3. The communication system of claim 2, wherein the extender circuit further comprises a serial link, the serial link serially transmitting signals between the first and second circuit.

4. The communication system of claim 2, wherein the first circuit comprises:
   a parallel interface circuit communicating in parallel with the ATM layer; and
   a serial interface circuit coupled to the parallel interface circuit and serially communicating with the second circuit.

5. The communication system of claim 4, wherein the parallel interface circuit comprises:
   control circuitry coupled to the ATM layer and the serial interface circuit; and
   memory circuitry coupled to the ATM layer, the control circuitry and the serial interface circuit, the memory circuitry transmitting a plurality of signals to the ATM layer.

6. The communication system of claim 5, wherein the control circuitry comprises a programmable logic device.

7. The communication system of claim 5, wherein the memory circuitry comprises a first-in-first-out (FIFO) memory device.

8. An interface circuit comprising:
   a parallel interface circuit configured to communicate in parallel with an asynchronous transfer mode (ATM) layer, the parallel interface circuit emulating a physical (PHY) layer interface at the ATM layer; and
   a serial interface circuit coupled to the parallel interface circuit and configured to serially communicate with a serial bus.

9. The interface circuit of claim 8, wherein the parallel interface circuit comprises:
   control circuitry coupled to the ATM layer and the serial interface circuit; and
   memory circuitry coupled to the ATM layer, the control circuitry and the serial interface circuit, the memory circuitry transmitting a plurality of signals to the ATM layer.

10. The interface circuit of claim 9, wherein the control circuitry comprises a programmable logic device.

11. The interface circuit of claim 9, wherein the memory circuitry comprises a first-in-first-out (FIFO) memory device.

12. The interface circuit of claim 8, wherein the serial interface circuit comprises:
   serializing/deserializing circuitry coupled to the parallel interface circuit and coupled serially with the serial bus, the serializing/deserializing circuitry serializing a plurality of parallel signals received from the parallel interface circuit and outputting a plurality of serial output signals, the serializing/deserializing circuitry further deserializing a plurality of serial input signals to form a plurality of deserialized signals and providing the plurality of deserialized signals to the parallel interface circuit.

13. The interface circuit of claim 12, wherein the serializing/deserializing circuitry comprises:
   serializing circuitry serializing the plurality of parallel signals received from the parallel interface circuit and outputting a plurality of serial output signals; and
   deserializing circuitry deserializing the plurality of serial input signals to form the plurality of deserialized signals and providing the plurality of deserialized signals to the parallel interface circuit.

14. An interface circuit comprising:
   a parallel interface circuit configured to communicate in parallel with a physical (PHY) layer, the parallel interface circuit emulating an asynchronous transfer mode (ATM) layer interface at the PHY layer; and
   a serial interface circuit coupled to the parallel interface circuit and configured to serially communicate with a serial bus.

15. The interface circuit of claim 14, wherein the parallel interface circuit comprises:
   control circuitry coupled to the PHY layer and the serial interface circuit; and
   memory circuitry coupled to the PHY layer, the control circuitry and the serial interface circuit, the memory circuitry transmitting a plurality of signals to the PHY layer,.

16. The interface circuit of claim 15, wherein the control circuitry comprises a programmable logic device.

17. The interface circuit of claim 15, wherein the memory circuitry comprises a first-in-first-out (FIFO) memory device.

18. The interface circuit of claim 14, wherein the serial interface circuit comprises:

serializing/deserializing circuitry coupled to the parallel interface circuit and coupled serially with the serial bus, the serializing/deserializing circuitry serializing a plurality of parallel signals received from the parallel interface circuit and outputting a plurality of serial output signals, the serializing/deserializing circuitry further deserializing a plurality of serial input signals to form a plurality of deserialized signals and providing the plurality of deserialized signals to the parallel interface circuit.

19. The interface circuit of claim 18, wherein the serializing/deserializing circuitry comprises:

serializing circuitry serializing a plurality of parallel signals received from the parallel interface circuit and outputting a plurality of serial output signals; and deserializing circuitry deserializing a plurality of serial input signals to form a plurality of deserialized signals and providing the plurality of deserialized signals to the parallel interface circuit.

20. An extender circuit configured to provide a serial communication interface between an asynchronous transfer mode (ATM) layer and a physical (PHY) layer, the extender circuit comprising:

a first circuit configured to communicate in parallel with the ATM layer, the first circuit emulating a PHY layer interface at the ATM layer; and a second circuit coupled serially to the first circuit, the second circuit configured to communicate in parallel with the PHY layer, the second circuit emulating an ATM layer interface at the PHY layer.

21. The extender circuit of claim 20, wherein the extender circuit further comprises a serial link, the serial link serially transmitting signals between the first and second circuit.

22. The extender circuit of claim 20, wherein the first circuit comprises:

a parallel interface circuit for communicating in parallel with the ATM layer; and a serial interface circuit coupled to the parallel interface circuit and serially communicating with the second circuit.

23. The extender circuit of claim 22, wherein the parallel interface circuit comprises:

control circuitry coupled to the serial interface circuit; and memory circuitry coupled to the control circuitry and the serial interface circuit, the memory circuitry for transmitting a plurality of signals to the ATM layer.

24. The extender circuit of claim 23, wherein the control circuitry comprises a programmable logic device.

25. The communication system of claim 23, wherein the memory circuitry comprises a first-in-first-out (FIFO) memory device.

26. In a communication system having an extender circuit providing a serial communication interface between an asynchronous transfer mode (ATM) and a physical (PHY) layer, a method for transmitting a plurality of signals between the ATM layer and the PHY layer, the method comprising the steps of:

serializing a first plurality of parallel signals to form a first plurality of serial signals;

transmitting the first plurality of serial signals between the ATM layer and the PHY layer; and deserializing the first plurality of serial signals to form a second plurality of parallel signals, wherein the extender circuit emulates an ATM layer interface at the PHY layer and a PHY layer interface at the ATM layer, and wherein the extender circuit communicates in parallel with the ATM layer and with the PHY layer while serially communicating between the ATM layer and the PHY layer.

27. The method of claim 26, wherein the extender circuit includes a memory circuit for storing the second plurality of parallel signals, further comprising the steps of:

providing the second plurality of parallel signals to the memory circuit;

outputting the second plurality of parallel signals from the memory circuit; and signaling a first flag condition when the memory circuit contains a first predetermined number of the second plurality of parallel signals.

28. The method of claim 27, further comprising the steps of:

generating a first control code in response to the memory circuit signaling the first flag condition;

serializing the first control code to form a first serialized control code; and transmitting the first serialized control code between the ATM layer and the PHY layer, wherein the first control signal disables the transmission of the first plurality of signals between the ATM layer and the PHY layer.

29. The method of claim 22, further comprising the step of:

signaling a second flag condition when the memory circuit contains a second predetermined number of the second plurality of parallel signals.

30. The method of claim 29, further comprising the step of:

generating a second control code in response to the memory circuit signaling the second flag condition;

serializing the second control code to form a second serialized control code; and transmitting the second serialized control code between the ATM layer and the PHY layer, wherein the second control signal enables the transmission of the first plurality of data signals between the ATM layer and the PHY layer.

* * * * *